(12) United States Patent
Cink et al.

(10) Patent No.: US 8,387,305 B2
(45) Date of Patent: Mar. 5, 2013

(54) RODENT MANAGEMENT SYSTEM HAVING A HOUSING WITH AN ENTRY OPENING

(75) Inventors: James H. Cink, Ballwin, MO (US); Jonathan D. Berger, St. Louis, MO (US); Brian James Mann, Wildwood, MO (US); Edward Francis Marshall, Lansing, MI (US); Henry Wayne Moran, Ballwin, MO (US); James David Poling, Clarkson Valley, MO (US)

(73) Assignee: BASF Corporation, Florham Park, NJ (US)

( * ) Notice: Subject to any disclaimer, the term of this patent is extended or adjusted under 35 U.S.C. 154(b) by 334 days.

(21) Appl. No.: 12/697,885

(22) Filed: Feb. 1, 2010

(65) Prior Publication Data

US 2010/0170141 A1 Jul. 8, 2010

Related U.S. Application Data

(62) Division of application No. 12/671,172, filed as application No. PCT/US2009/057673 on Sep. 21, 2009.

(60) Provisional application No. 61/099,111, filed on Sep. 22, 2008, provisional application No. 61/162,336, filed on Mar. 23, 2009, provisional application No. 61/231,552, filed on Aug. 5, 2009.

(51) Int. Cl.
*A01M 25/00* (2006.01)
(52) U.S. Cl. ........................................ 43/131
(58) Field of Classification Search ............. 43/131, 43/60
See application file for complete search history.

(56) References Cited

U.S. PATENT DOCUMENTS

| 147,899 | A | 2/1874 | Carnahan |
| 202,971 | A | 4/1878 | Wigginton |
| 218,175 | A | 8/1879 | Hollingshead |
| 224,960 | A | 2/1880 | Simpson |
| 527,044 | A | 10/1894 | Brown |

(Continued)

FOREIGN PATENT DOCUMENTS

| CN | 200994368 | 12/2007 |
| GB | 2023987 A | 1/1980 |

(Continued)

OTHER PUBLICATIONS

Pest Notes, Feb. 2001, 17 pages, vol. 3, Issue 2, Defense Supply Center Philadelphia West Coast Support Office, Philadelphia, US.

(Continued)

*Primary Examiner* — Christopher P Ellis
(74) *Attorney, Agent, or Firm* — Armstrong Teasdale LLP

(57) ABSTRACT

A rodent management station includes a housing having a base and a lid together at least in part defining an interior space. The housing has an entry opening and an internal partition structure configured to partition the interior space of the housing into a bait chamber having an entryway spaced from the entry opening. A pathway is defined at least in part by the partition structure and extends away from the at least one entry opening to the entryway of the bait chamber. The partition structure has at least one through-opening therein other than at the bait chamber entryway to provide open communication between the pathway and the bait chamber other than at the bait chamber entryway. The at least one through-opening is sized substantially smaller than the housing entry opening and the bait chamber entryway to inhibit rodents against entering the bait chamber at the at least one through-opening.

22 Claims, 85 Drawing Sheets

U.S. PATENT DOCUMENTS

| | | | |
|---|---|---|---|
| 741,935 A | 10/1903 | Schickerling |
| 942,069 A | 12/1909 | Hess |
| 1,016,405 A | 2/1912 | Ferguson |
| 1,040,329 A | 10/1912 | Holt |
| 1,063,347 A | 6/1913 | Hall |
| 1,074,916 A | 10/1913 | Wiesen |
| 1,085,970 A | 2/1914 | Butcher |
| 1,138,132 A | 5/1915 | Marsh |
| 1,142,781 A | 6/1915 | Cameron |
| 1,213,876 A | 1/1917 | Hovis |
| 1,218,406 A | 3/1917 | Jackson |
| 1,321,360 A | 11/1919 | Bright |
| 1,349,177 A | 8/1920 | Wiemer |
| 1,388,786 A | 8/1921 | Albrecht et al. |
| 1,415,801 A | 5/1922 | Corle |
| 1,422,894 A | 7/1922 | Skubinski |
| 1,461,681 A | 7/1923 | Schuckman |
| 1,488,503 A | 4/1924 | Karda |
| 1,505,996 A | 8/1924 | Drought |
| 1,511,123 A | 10/1924 | Hart |
| 1,516,312 A | 11/1924 | Scott |
| 1,525,401 A | 2/1925 | King |
| 1,668,726 A | 10/1925 | Mueller |
| 1,586,630 A | 6/1926 | Lee et al. |
| 1,618,513 A | 2/1927 | Coghill |
| 1,638,767 A | 8/1927 | Harmon |
| 1,723,208 A | 8/1929 | Raj |
| 1,860,599 A | 5/1932 | Schiltz |
| 1,868,847 A | 7/1932 | Pearson |
| 1,911,919 A | 5/1933 | Molls |
| 1,964,611 A | 6/1934 | Watson |
| 1,982,389 A | 11/1934 | Johnson |
| 2,193,937 A | 3/1940 | Pirani et al. |
| 2,231,191 A | 2/1941 | Martino |
| 2,490,180 A | 12/1949 | Varnedoe, Jr. |
| 2,532,681 A | 12/1950 | Stover |
| 2,568,168 A | 9/1951 | Query |
| 2,589,360 A | 3/1952 | Ferguson |
| 2,643,480 A | 6/1953 | Jones |
| 2,651,138 A * | 9/1953 | Malloy | 43/131 |
| 2,664,663 A | 1/1954 | Mullen |
| 2,683,326 A | 7/1954 | Gardner et al. |
| 2,710,485 A | 6/1955 | Starr |
| 2,752,722 A | 7/1956 | Gardner |
| 2,787,082 A | 4/1957 | Paschen |
| 2,944,364 A | 7/1960 | Kelly |
| 3,025,630 A | 3/1962 | Silvey |
| 3,320,692 A | 5/1967 | Hellen |
| 3,585,750 A | 6/1971 | Routt |
| 3,699,927 A | 10/1972 | Van Dongen |
| 3,733,735 A | 5/1973 | Hirsch |
| 3,786,591 A | 1/1974 | Morford |
| 3,940,876 A | 3/1976 | Zaccaira |
| 3,992,803 A | 11/1976 | Kaiser |
| 4,026,064 A | 5/1977 | Baker |
| 4,030,230 A | 6/1977 | Souza |
| 4,035,946 A * | 7/1977 | Rapp et al. | 43/131 |
| 4,062,142 A | 12/1977 | Marotti |
| D246,854 S | 1/1978 | Baker |
| 4,103,448 A | 8/1978 | Souza |
| 4,132,026 A | 1/1979 | Dodds |
| 4,138,796 A | 2/1979 | Souza |
| 4,151,673 A | 5/1979 | Campbell |
| 4,157,628 A | 6/1979 | Saslove |
| 4,216,606 A | 8/1980 | Kaiser et al. |
| 4,238,903 A | 12/1980 | Mazzei |
| 4,251,946 A | 2/1981 | Lindley |
| D258,751 S | 3/1981 | Lindley |
| 4,349,982 A | 9/1982 | Sherman |
| 4,363,184 A | 12/1982 | Marcolina |
| 4,403,438 A | 9/1983 | West-Harron |
| 4,418,493 A | 12/1983 | Jordan |
| 4,453,337 A | 6/1984 | Williams |
| 4,541,198 A | 9/1985 | Sherman |
| 4,550,523 A | 11/1985 | Spiller |
| 4,550,525 A | 11/1985 | Baker et al. |
| D282,390 S | 1/1986 | Ford et al. |
| 4,607,450 A | 8/1986 | Kaiser et al. |
| 4,619,071 A | 10/1986 | Willis |
| 4,637,162 A | 1/1987 | Sherman |
| 4,658,536 A | 4/1987 | Baker |
| 4,660,320 A | 4/1987 | Baker et al. |
| 4,719,718 A | 1/1988 | Kon |
| 4,741,121 A | 5/1988 | Pratscher et al. |
| 4,787,170 A | 11/1988 | Kingsbury et al. |
| 4,793,093 A | 12/1988 | Gentile |
| 4,825,581 A | 5/1989 | Dailey |
| 4,835,902 A | 6/1989 | Sherman |
| 4,837,969 A | 6/1989 | Demarest |
| 4,887,381 A | 12/1989 | Tieben |
| 4,905,407 A | 3/1990 | Sherman |
| 5,011,018 A * | 4/1991 | Keffeler | 206/532 |
| 5,040,327 A | 8/1991 | Stack et al. |
| 5,067,271 A | 11/1991 | Henning |
| 5,148,624 A | 9/1992 | Schmidt |
| 5,272,832 A | 12/1993 | Marshall et al. |
| 5,299,380 A | 4/1994 | Fornal, Sr. |
| D362,045 S | 9/1995 | Demarest |
| 5,446,992 A | 9/1995 | Stewart |
| 5,448,852 A | 9/1995 | Spragins et al. |
| 5,471,781 A | 12/1995 | Vine |
| 5,628,143 A | 5/1997 | Doucette |
| D385,611 S | 10/1997 | Prince et al. |
| 5,682,705 A | 11/1997 | Stahl |
| 5,806,237 A | 9/1998 | Nelson et al. |
| 5,857,286 A | 1/1999 | Doucette |
| 5,930,944 A | 8/1999 | Knuppel |
| 5,943,813 A | 8/1999 | Wang |
| 5,943,817 A | 8/1999 | Miller |
| 5,953,853 A | 9/1999 | Kim |
| 5,966,863 A | 10/1999 | Payton et al. |
| 5,979,105 A | 11/1999 | Marks |
| 6,016,623 A | 1/2000 | Celestine |
| 6,082,042 A | 7/2000 | Issitt |
| 6,085,691 A * | 7/2000 | Loehndorf | 119/51.01 |
| 6,145,242 A | 11/2000 | Simpson |
| 6,164,010 A | 12/2000 | Snell et al. |
| 6,202,339 B1 | 3/2001 | Knuppel |
| 6,202,340 B1 | 3/2001 | Nieves |
| 6,212,819 B1 | 4/2001 | Edwards |
| 6,263,612 B1 | 7/2001 | Shultz |
| 6,266,917 B1 | 7/2001 | Hight |
| 6,272,789 B1 | 8/2001 | Huang |
| 6,272,791 B1 | 8/2001 | Pleasants |
| 6,370,813 B1 | 4/2002 | Nelson et al. |
| 6,389,738 B1 | 5/2002 | Denny et al. |
| D459,428 S | 6/2002 | Johnson et al. |
| 6,397,517 B1 | 6/2002 | Leyerle et al. |
| 6,470,622 B1 | 10/2002 | Braun |
| 6,481,151 B1 | 11/2002 | Johnson et al. |
| 6,493,988 B1 | 12/2002 | Johnson |
| 6,497,070 B1 | 12/2002 | Snell et al. |
| 6,513,283 B1 | 2/2003 | Crossen |
| 6,571,509 B2 | 6/2003 | Frasier |
| 6,594,947 B2 | 7/2003 | Lingren et al. |
| 6,618,983 B1 | 9/2003 | Spragins |
| 6,622,422 B2 | 9/2003 | Gehret et al. |
| 6,631,582 B2 | 10/2003 | Knuppel et al. |
| 6,651,378 B2 | 11/2003 | Baker |
| 6,671,999 B1 | 1/2004 | Doucette |
| 6,684,560 B2 | 2/2004 | Lafforthun |
| 6,694,669 B2 | 2/2004 | Gehret et al. |
| 6,789,352 B2 | 9/2004 | Price et al. |
| 6,792,713 B2 | 9/2004 | Snell |
| 6,807,768 B2 | 10/2004 | Johnson et al. |
| 6,860,060 B2 | 3/2005 | Hayes et al. |
| 6,874,274 B2 | 4/2005 | Townsend |
| 6,955,007 B2 | 10/2005 | Gehret et al. |
| 6,990,766 B2 | 1/2006 | Gehret et al. |
| 7,026,942 B2 | 4/2006 | Cristofori et al. |
| D529,571 S | 10/2006 | Hoyes |
| 7,363,744 B2 | 4/2008 | Kness et al. |
| 7,513,367 B2 * | 4/2009 | Wolpow | 206/528 |
| D619,673 S * | 7/2010 | Cink et al. | D22/119 |
| 7,874,098 B2 * | 1/2011 | Vickery et al. | 43/131 |
| 7,980,023 B2 * | 7/2011 | Nelson et al. | 43/67 |
| 7,987,629 B2 * | 8/2011 | Harper | 43/131 |

| | | |
|---|---|---|
| 2001/0001353 A1 | 5/2001 | Jones |
| 2001/0017001 A1 | 8/2001 | Leverton |
| 2001/0033230 A1 | 10/2001 | Barber et al. |
| 2001/0047613 A1 | 12/2001 | Caffagni |
| 2002/0043018 A1 | 4/2002 | Townsend |
| 2002/0046483 A1 | 4/2002 | Snell et al. |
| 2002/0046512 A1 | 4/2002 | Roberts |
| 2002/0178648 A1 | 12/2002 | Frasier |
| 2002/0184811 A1 | 12/2002 | Wright |
| 2002/0184813 A1 | 12/2002 | Johnson et al. |
| 2003/0014902 A1 | 1/2003 | Draper |
| 2003/0019148 A1 | 1/2003 | Kao et al. |
| 2003/0029076 A1 | 2/2003 | Snell et al. |
| 2003/0041504 A1 | 3/2003 | Knuppel et al. |
| 2003/0069697 A1 | 4/2003 | Mafra-Neto et al. |
| 2003/0074832 A1 | 4/2003 | Snell |
| 2003/0084603 A1 | 5/2003 | Lafforthun |
| 2003/0089025 A1 | 5/2003 | Maffo et al. |
| 2003/0126786 A1 | 7/2003 | Emond |
| 2003/0131522 A1 | 7/2003 | Swift et al. |
| 2003/0152604 A1 | 8/2003 | Sutherland et al. |
| 2003/0182846 A1 | 10/2003 | Nelson et al. |
| 2004/0025410 A1 | 2/2004 | Shapland |
| 2004/0181996 A1 | 9/2004 | Johnson et al. |
| 2004/0200133 A1 | 10/2004 | Townsend |
| 2004/0244274 A1 | 12/2004 | Dellevigne et al. |
| 2005/0102887 A1 | 5/2005 | Lang et al. |
| 2005/0198892 A1 | 9/2005 | Lin |
| 2006/0042153 A1 | 3/2006 | Bowerman |
| 2006/0053682 A1 | 3/2006 | Goldstein |
| 2006/0156615 A1 | 7/2006 | Hale |
| 2006/0156617 A1 | 7/2006 | Hale |
| 2006/0254122 A1 | 11/2006 | Murchison |
| 2006/0272197 A1 | 12/2006 | Wiesener et al. |
| 2007/0017148 A1 | 1/2007 | Blau |
| 2007/0289200 A1 | 12/2007 | Danielsson |
| 2008/0072475 A1 | 3/2008 | Nelson et al. |
| 2008/0083156 A1 | 4/2008 | Frisch |
| 2008/0184613 A1 | 8/2008 | Finnigan |
| 2009/0307963 A1* | 12/2009 | Abbas ............... 43/131 |
| 2010/0031557 A1 | 2/2010 | Vickery et al. |
| 2010/0050498 A1 | 3/2010 | Nelson et al. |
| 2011/0072709 A1* | 3/2011 | Patterson et al. ....... 43/81 |
| 2011/0179694 A1* | 7/2011 | Vickery et al. ....... 43/131 |

FOREIGN PATENT DOCUMENTS

| | | |
|---|---|---|
| GB | 2382515 | 6/2003 |
| WO | 82/03968 | 11/1982 |
| WO | 98/10645 | 3/1998 |
| WO | 9963812 A1 | 12/1999 |
| WO | 03009683 A1 | 2/2003 |
| WO | 03045138 A1 | 6/2003 |
| WO | 2004098281 A1 | 11/2004 |
| WO | 2005006857 A2 | 1/2005 |
| WO | 2007026123 A1 | 3/2007 |
| WO | 2007028416 A1 | 3/2007 |
| WO | 2008035304 A3 | 3/2008 |

OTHER PUBLICATIONS http://www.instawares.com/rat-bait-station.rii-jt904.0.7.htm printed Sep. 11, 2008, 3 pages.

http://doyourownpestcontrol.com/baitrod.htm, printed Sep. 11, 2008, 13 pages.

http://www.doyourownpestcontrol.com/SPEC/pick-protectalp.htm, printed Sep. 11, 2008, 9 pages.

http://www.pestcontrol-products.com/rodent/index.html, printed Sep. 11, 2008, 15 pages.

http://www.domyownpestcontrol.com/protecta-lp-rat-bait-station-case-stations-p-128.html, printed Sep. 11, 2008, 3 pages.

http://www.ecolab.com/businesses/pest/CheckPointRodent.asp?nav=home, printed Sep. 11, 2008, 2 pages.

http://www.domyownpestcontrol.com/ez-klean-rodent-bait-station-case-stations-p-324.htm, printed Sep. 11, 2008, 3 pages.

http://www.ecolab.com/businesses/pest/images/products/bait_lg.jpg, printed Sep. 11, 2008, 1 page.

Mallis, Arnold, The Behavior, Life History, and Control of Household Pests, Handbook of Pest Control, 2004, 3 pages, Ninth edition, GIE Media, Inc.

http://www.wisconsinhistory.org/whi/feature/skyhigh/fullRecord.asp?id=32357&qstring=h, printed Sep. 30, 2009, 1 page.

JT Eaton Products Catalog, 4 pages, J.T. Eaton & Co., Inc., Twinsburg, OH.

International Search Report & Written Opinion for PCT/US2009/057673 dated Feb. 3, 2010, 11 pages.

* cited by examiner

RODENT MANAGEMENT SYSTEM HAVING A HOUSING WITH AN ENTRY OPENING

CROSS-REFERENCE TO RELATED APPLICATION

This application is a divisional application of U.S. patent application Ser. No. 12/671,172, filed Jan. 28, 2010, which is hereby incorporated by reference in its entirety.

BACKGROUND

The embodiments described herein are generally related to rodent management systems, and more specifically to systems for trapping and/or killing rodents. Rodent bait stations typically include a housing having an internal chamber and toxic baits or other trapping devices disposed in the chamber for controlling rodents (e.g., rats and mice). The housing is designed to inhibit non-targeted animals (e.g., dogs, cats) and unauthorized individuals (e.g., children) from coming into contact with the baits or the devices (e.g., trap mechanisms, such as, but not limited to snap traps, live catch traps, or snares). Often, the housing has a generally low-profile. That is, the height of the housing is only slightly taller than an average-sized rodent in a prone (e.g., normal movement— i.e., not sitting or standing) position. The housing includes at least one opening for allowing the rodents access to the interior space of the housing and thereby access to the toxin and/or device. The housings often include two openings that create a straight passageway through which a rodent can pass through the housing. A bait area for placing the toxin and/or trap is partially separated from the passageway by a pair of spaced-apart divider walls. Rodents can access the bait area from the passageway through an opening between the divider walls. The bait stations are placed along a wall (interior or exterior), where rodents generally move and other places they are likely to frequent. The rodent management stations are serviced periodically by a technician to clean debris out of the housing, to replenish the bait supply, and to replace or reset any tripped traps.

Debris often accumulates within such rodent management stations in between servicing. Such debris includes, but is not limited to: rat droppings, unused bait, rodent carcasses, insects, dust, dirt, and plant leaves and stems. Removal of debris from prior systems is tedious and time-consuming due to their construction, i.e., having a base or floor and an upstanding perimeter wall. Thus, debris can only be removed in a piecemeal fashion, or by overturning the base, or by suctioning debris from the station. The placement of bait or traps within the housing is often fixed as well, rendering reconfiguration difficult or non-feasible.

A modular rodent management system is therefore needed which provides for efficient cleaning of the station, good weather resistance and easy reconfiguration of bait and traps housed therein.

BRIEF DESCRIPTION

In one aspect, a rodent management station generally comprises a housing having an interior space and including a base and a lid together at least in part defining the interior space of the housing. The lid is positionable relative to the base between a closed configuration of the station in which the interior space is substantially enclosed, and an opened configuration of the station in which the interior space is accessible for servicing. The housing has an entry opening through which rodents enter the interior space of the housing. The housing has internal partition structure configured to partition the interior space of the housing into a bait chamber having an entryway spaced from the entry opening of the housing, and a pathway defined at least in part by the partition structure and extending away from the at least one entry opening to the entryway of the bait chamber. The partition structure has at least one through-opening therein other than at the bait chamber entryway to provide open communication between the pathway and the bait chamber other than at the bait chamber entryway. The at least one through-opening is sized substantially smaller than the housing entry opening and the bait chamber entryway to inhibit rodents against entering the bait chamber at the at least one through-opening.

In another aspect, a rodent management station generally comprises a housing having an interior space and including a base and a lid together at least in part defining the interior space of the housing, the base comprising a floor panel having an inner surface. The lid is positionable relative to the base between a closed configuration of the station in which the interior space is substantially enclosed, and an opened configuration of the station in which the interior space is accessible for servicing. The housing has an entry opening through which rodents enter the interior space of the housing. The housing further has an internal partition structure configured to partition the interior space of the housing into a bait chamber having an entryway spaced from the entry opening of the housing, and a pathway defined at least in part by the partition structure and extending away from the at least one entry opening to the entryway of the bait chamber. The partition structure is connected to the lid of the housing for conjoint movement with the lid relative to the base upon movement of the lid to the opened configuration of the station. In the closed configuration of the station at least a portion of the partition structure is in closely spaced relationship with the inner surface of the floor panel to inhibit rodents from crawling under the portion of the partition structure.

In another aspect, a rodent management station generally comprises a housing having an interior space and including a base and a lid together at least in part defining the interior space of the housing. The lid is positionable relative to the base between a closed configuration of the station in which the interior space is substantially enclosed, and an opened configuration of the station in which the interior space is accessible for servicing. The housing has an entry opening through which rodents enter the interior space of the housing. In the closed configuration the entry opening has a bottom, a top, a height and a width, the width of the entry opening being substantially greater at the bottom of the opening than at the top thereof. The rodent management station further comprises at least one of a trap and a bait positionable within the interior space of the housing.

DETAILED DESCRIPTION

Figure 1A:
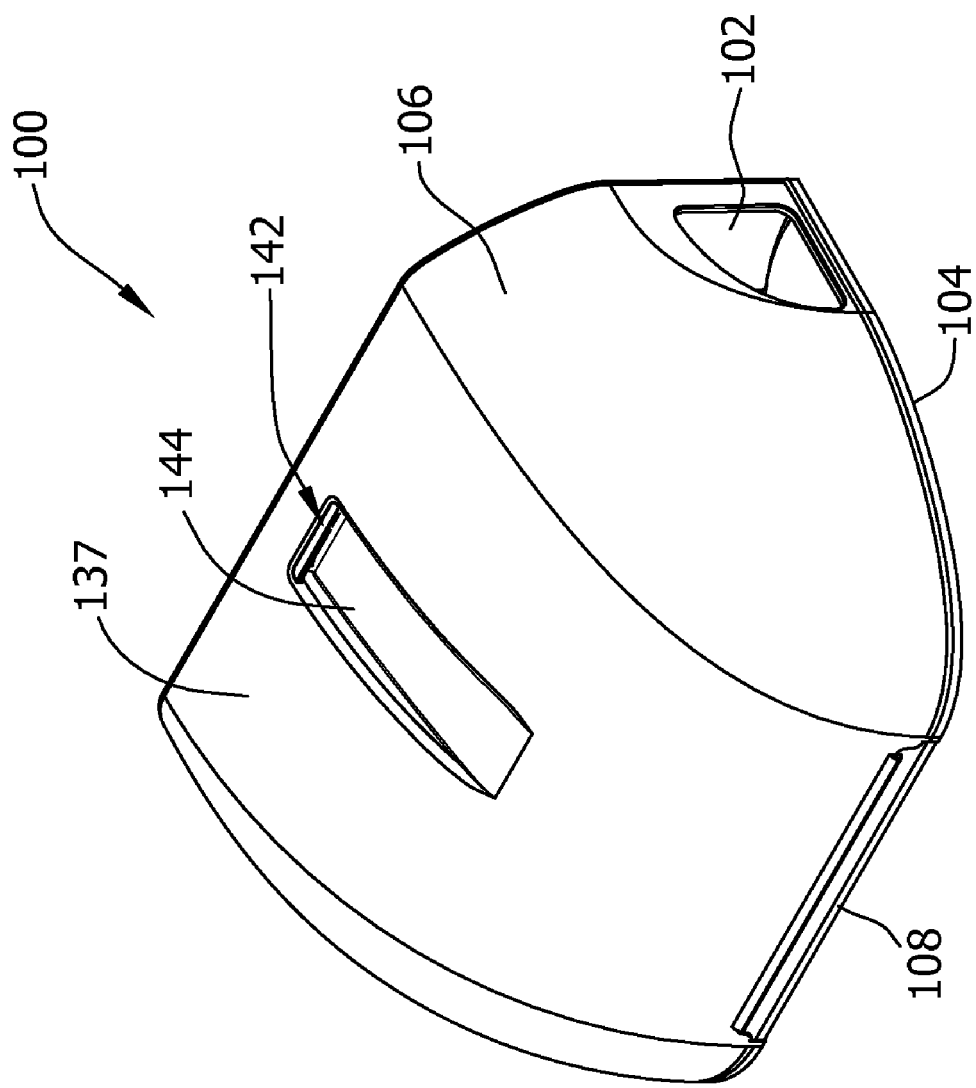
FIG. 1A is a perspective view of one embodiment of a rodent management station in a closed configuration.
Figure 1B:
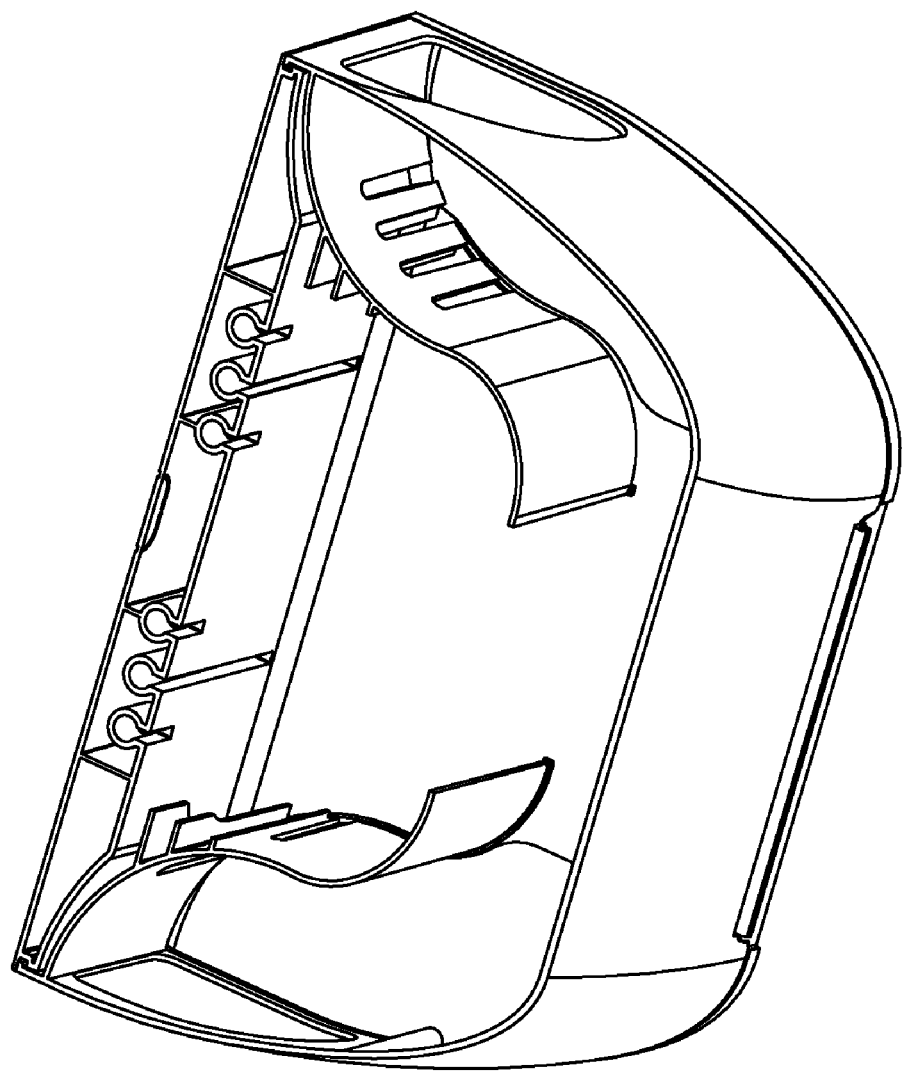
FIG. 1B is a cross-section taken in the plane of line 1B-1B of FIG. 1A.

Referring now to the drawings and in particular to FIG. 1, one embodiment of a rodent management system generally comprises a rodent management station, which is indicated generally at 100 and includes a housing having an interior space and at least one and more suitably two entry openings 102 formed therein through which rodents enter the interior space of the station. The rodent management station 100 is of a modular design, permitting a plurality of selective bait and/or trap configurations as will be described in further detail later herein.

The rodent management station 100 generally comprises a base 104 and a lid 106 (together broadly defining the station housing) that is releasably connectable to the base for positioning relative to the base between an opened configuration and a closed configuration of the station. In the closed configuration (FIG. 1), the lid 106 and base 104 together form a substantially enclosed interior space, with the entry openings 102 disposed in opposite sides of the station 100, and more particularly in opposite sides of the lid 106 in the illustrated embodiment of FIG. 1.

Figure 5A:
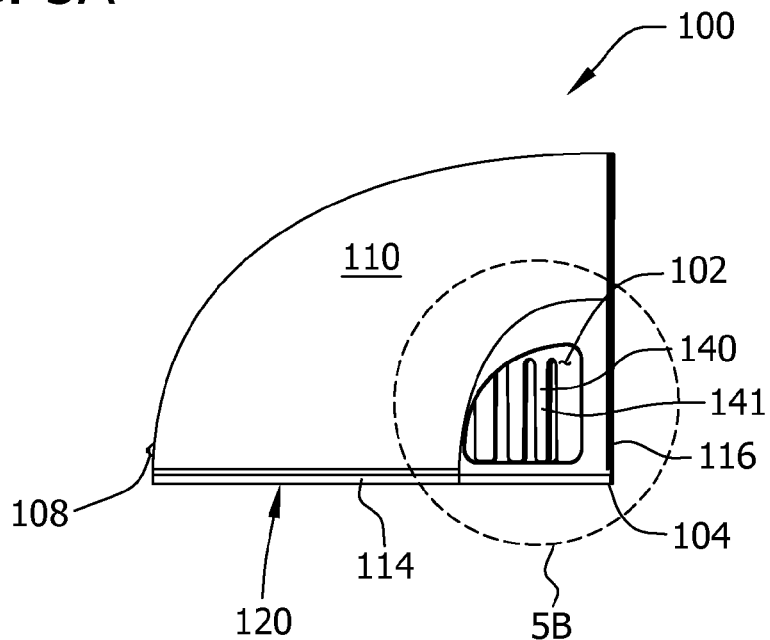
FIG. 5A is a right side elevation thereof.
Figure 5B:
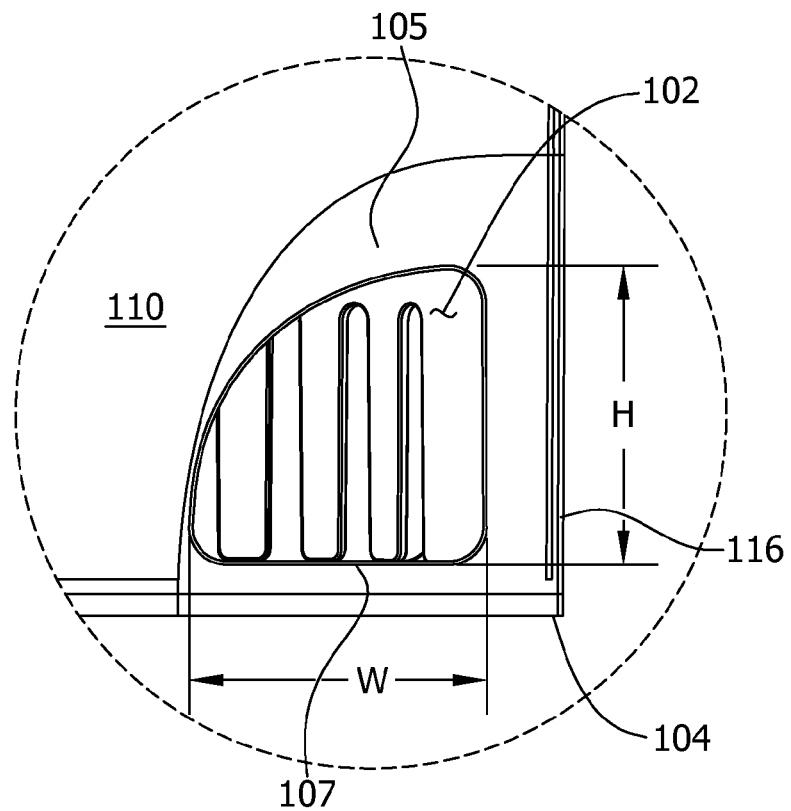
FIG. 5B is an enlarged view of a portion of FIG. 5A.

In accordance with one suitable embodiment, the entry openings 102 are suitably sized and configured to facilitate a feeling of comfort to rodents that approach and partially enter the station 100 housing to entice the rodent to further enter the station. Each entry opening 102 of the illustrated embodiment (with reference to FIGS. 5A and 5B) has a generally one-quarter circle shape or one-quarter circle ellipse. In particular, the entry opening 102 has a top 105, a bottom 107, a height H and a width W, with the width of the entry opening being substantially greater at the bottom of the opening than at the top thereof. In particular, the width W of the entry opening 102 decreases as the opening extends upward from the bottom 107 of the opening. Additionally, the entry opening 102 has a maximum width (e.g., where the width W of the opening is greatest along the height H thereof) and a maximum height (e.g., where the height of the opening is greatest along the width thereof) with the maximum width of the opening is greater than the maximum height of the opening.

In the opened configuration (FIG. 2), the lid 106 is generally positioned at least in part away from the base to provide access to the interior space of the rodent management station 100 for maintenance of the station such as, without limitation, replenishing bait supply, inspecting the rodent management station 100, placing and/or resetting traps, and clearing debris from the rodent management station 100. The base 104 and lid 106 may be suitably fabricated from any number of materials, most suitably plastic or other weather resistant material. For example, the base 104 and lid 106 may be formed in an injection molding process used for producing parts from thermoplastic or thermosetting plastic materials. It is understood, however, that the base 104 and lid 106 may be constructed of metal or other suitable materials, and that the base and the lid may be constructed of different materials from each other, without departing from the scope of this invention.

The lid 106 is suitably hinged to the base 104, such as by a living hinge 108 (or a plurality of living hinges) in which a continuous piece of material formed integrally with the lid and base (as in the illustrated embodiments) defines the hinge, a mechanical hinge or other suitable hinge configuration to permit hinged movement of the lid between the opened and closed configurations of the station while maintaining connection of the lid with the base to inhibit loss of the lid during servicing of the rodent management station 100. It is understood that the lid 106 may be attached to the base 104 other than by a hinge and remain within the scope of this invention. It also contemplated that the lid 106 may be entirely separable from the base 104 without departing from the scope of this invention. In the closed configuration of the station 100, the lid 106 and base 104 are further releasably held together by a suitable locking mechanism 142 described later herein to inhibit unauthorized or unintended opening of the rodent management station 100. Additionally, more than one locking mechanism may used to releasably hold together the lid 106 and base 104 in the closed configuration of the station 100.

The illustrated lid 106 suitably comprises laterally opposite side walls 110 that broadly define opposite sides of the rodent management station 100, a front wall 136 broadly defining a front of the rodent management station and a top wall 137 broadly defining a top of the rodent management station. In the illustrated embodiment the side walls 110, top wall 137 and front wall 136 of the lid 106 together define a generally quarter-dome shape although the top wall 137 is slightly flattened as it approaches the base 104. It is understood, however, that the lid 106 may be shaped other than as illustrated without departing from the scope of this invention, and that in alternative embodiments the base may instead, or additionally define one or more the sides of the rodent management station and/or the front of the station. The side walls 110, top wall 137 and front wall 136 of the lid are formed integrally in the illustrated embodiment, such as by being molded as a single piece. However one or more of these walls may be formed separate from the others and connected thereto such as by welding, fastening, adhering or other suitable connection technique. Additionally, the lid 106 may in some embodiments be configured to have only three sides (rather than the four-sided lid 106), and be of a generally wedge-like shape.

Figure 2:
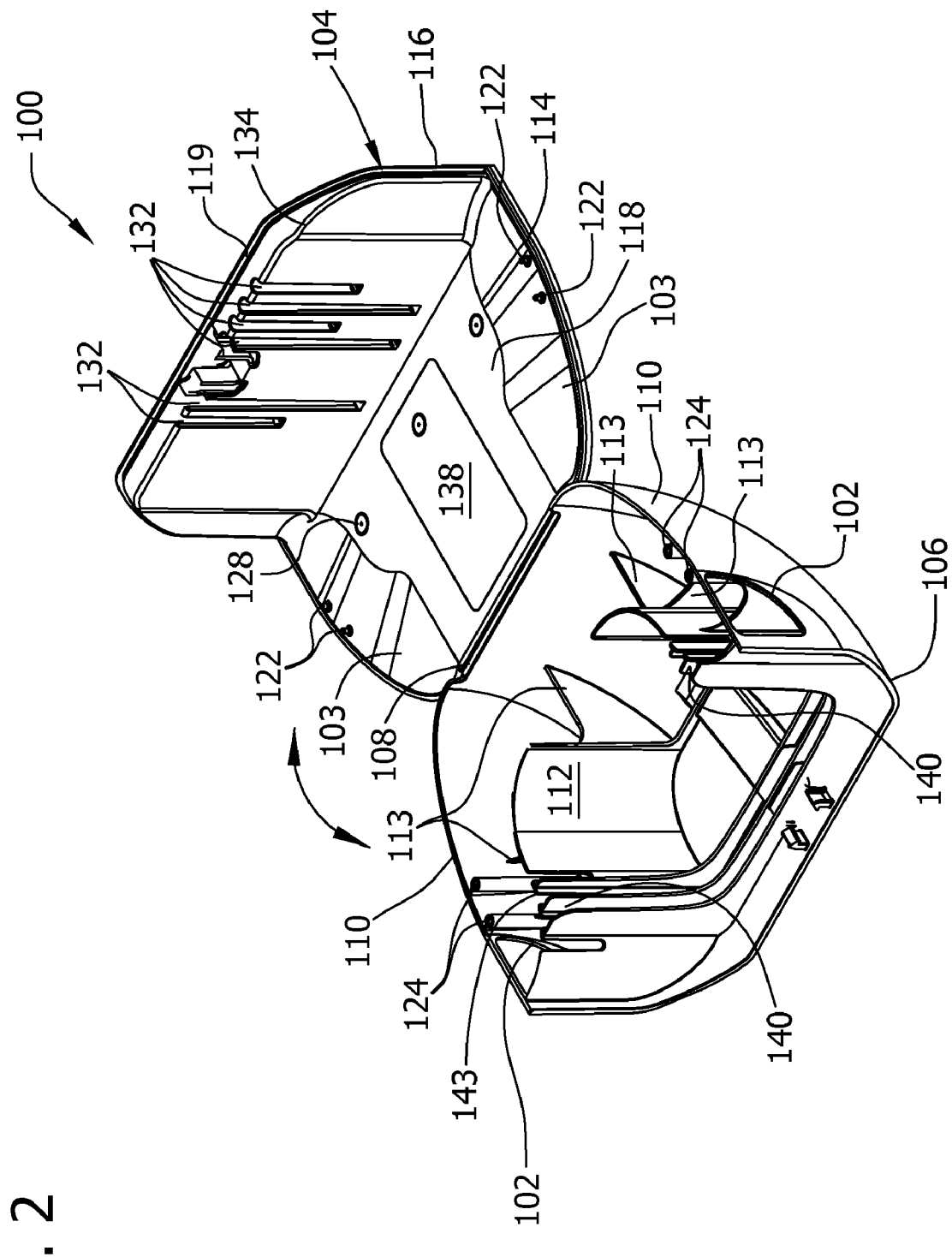
FIG. 2 is a perspective view of the rodent management station of FIG. 1 in an open configuration.

As illustrated in FIG. 2, the lid 106 further comprises interior panels 112 (broadly, partition structure) depending therefrom to partition the enclosed interior space of the rodent management station 100 into a suitable layout for rodent management. These interior panels 112 may be molded together with other lid components (e.g., the top wall 137, side walls 110, and/or front wall 136) or formed separate therefrom and connected thereto by adhesive, welding, fastening or other suitable attachment technique.

Figure 3:
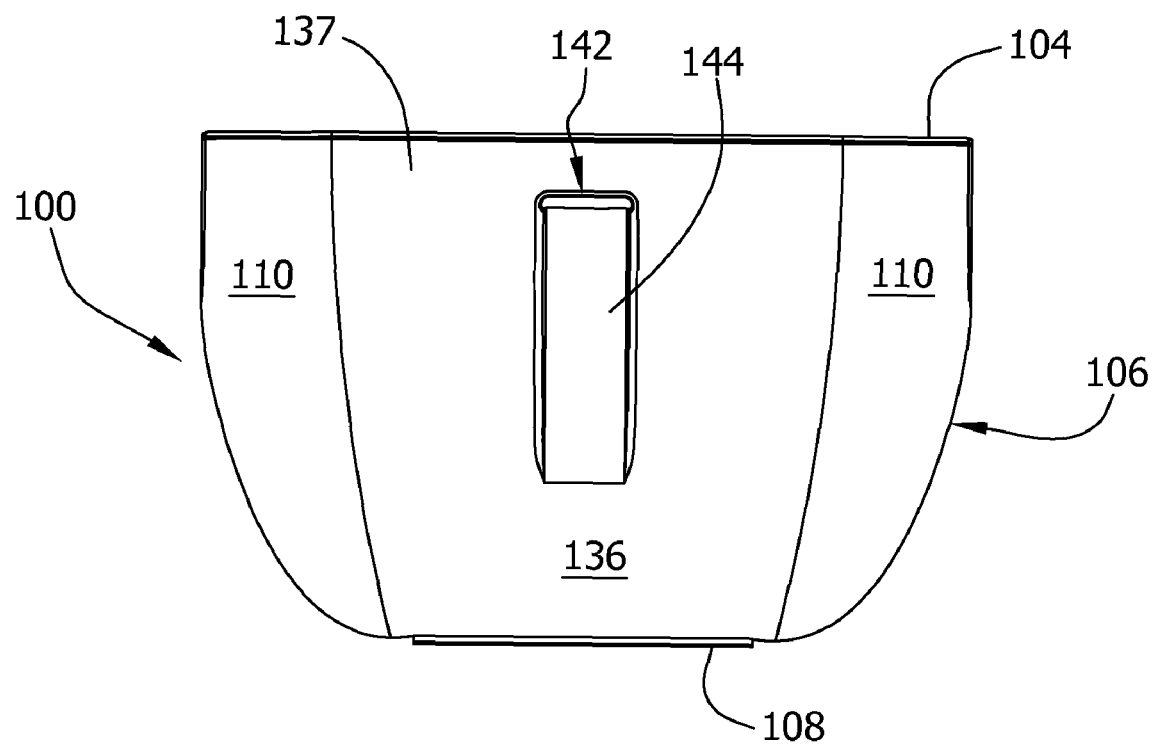
FIG. 3 is a top plan view of the rodent management station of FIG. 1.

As illustrated in the top plan view of FIG. 3, the base 104 and lid 106 are substantially similar in their length and width, although either the lid 106 or base 104 may have a slightly larger or smaller length or width without departing from the scope of the embodiments. As seen best in the front elevation view of FIG. 4 and the side elevation view of FIG. 5A, the height of the rodent management station 100 may suitably vary over its length and/or width with the height decreasing as the lid 106 transitions from the top wall thereof into the front wall and then extends down to the base 104, such as where the lid is hinged to the base. This sloping profile of the lid 106 facilitates drainage of water, ice, or snow from the outer surface of the lid 106, thus inhibiting stagnation of such elements on the rodent management station and/or entry of water into the station.

Figure 7:
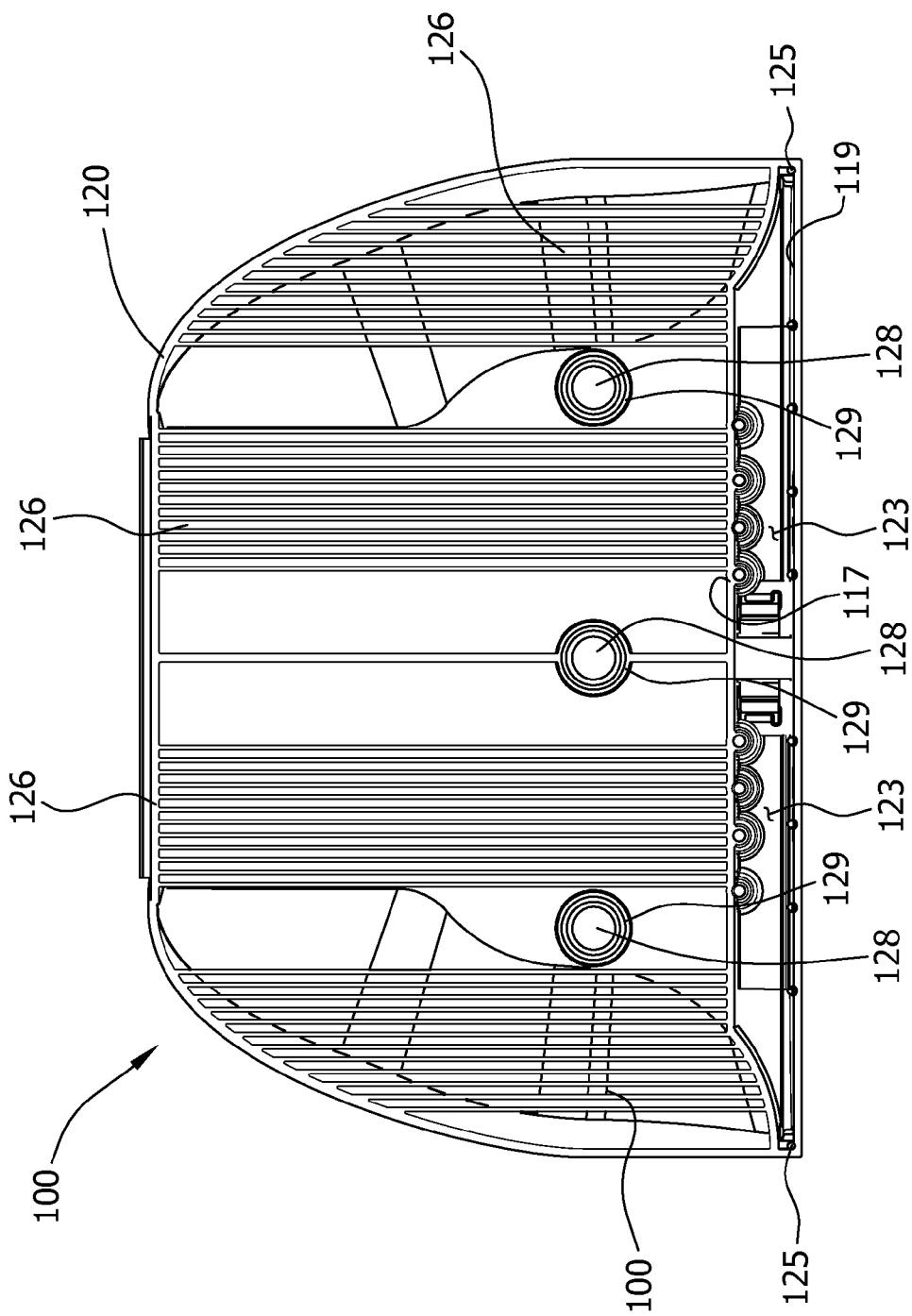
FIG. 7 is a bottom plan view thereof.
Figure 8:
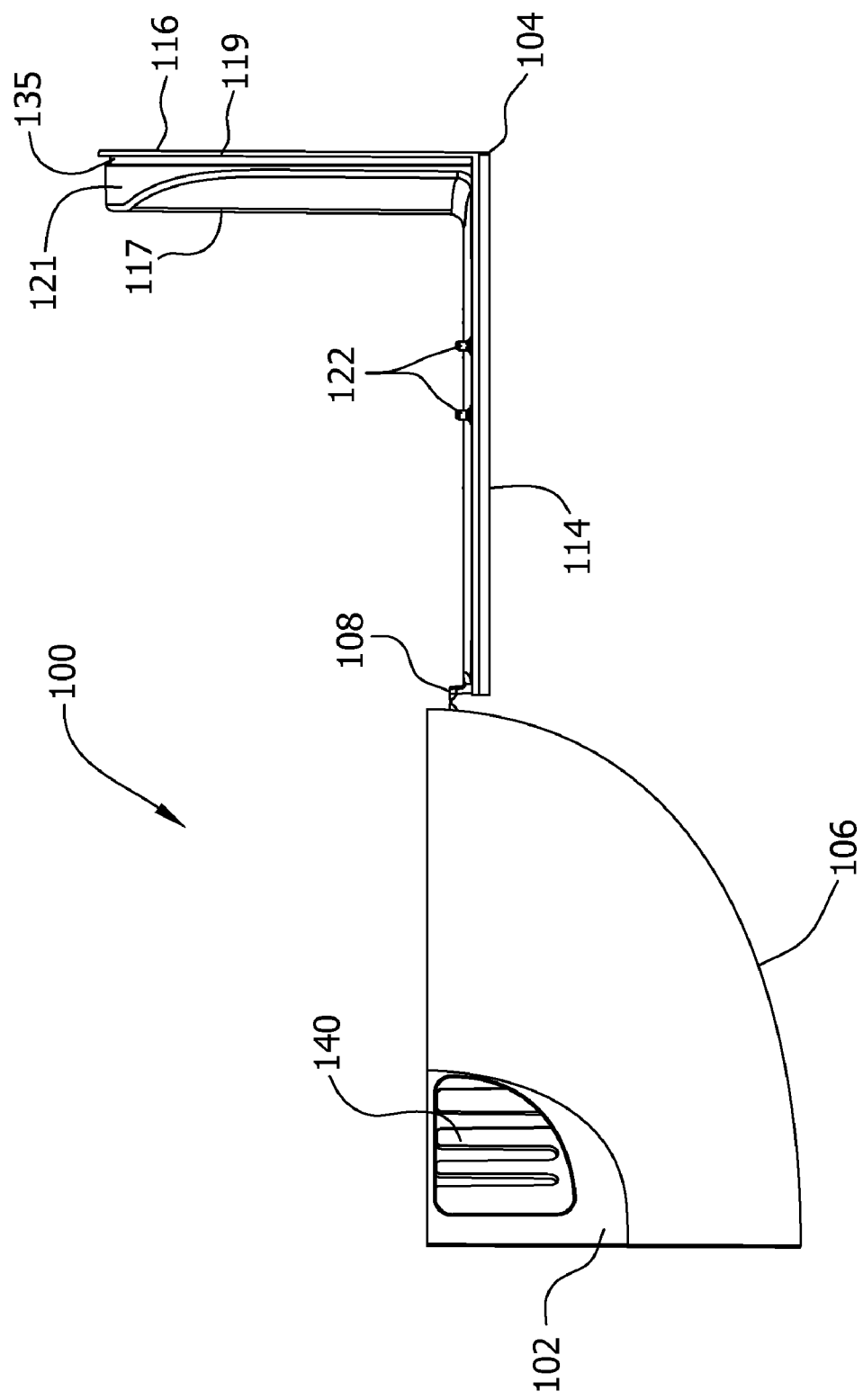
FIG. 8 is a right side elevation view of the rodent management station of FIG. 1 in an open configuration.
Figure 9:
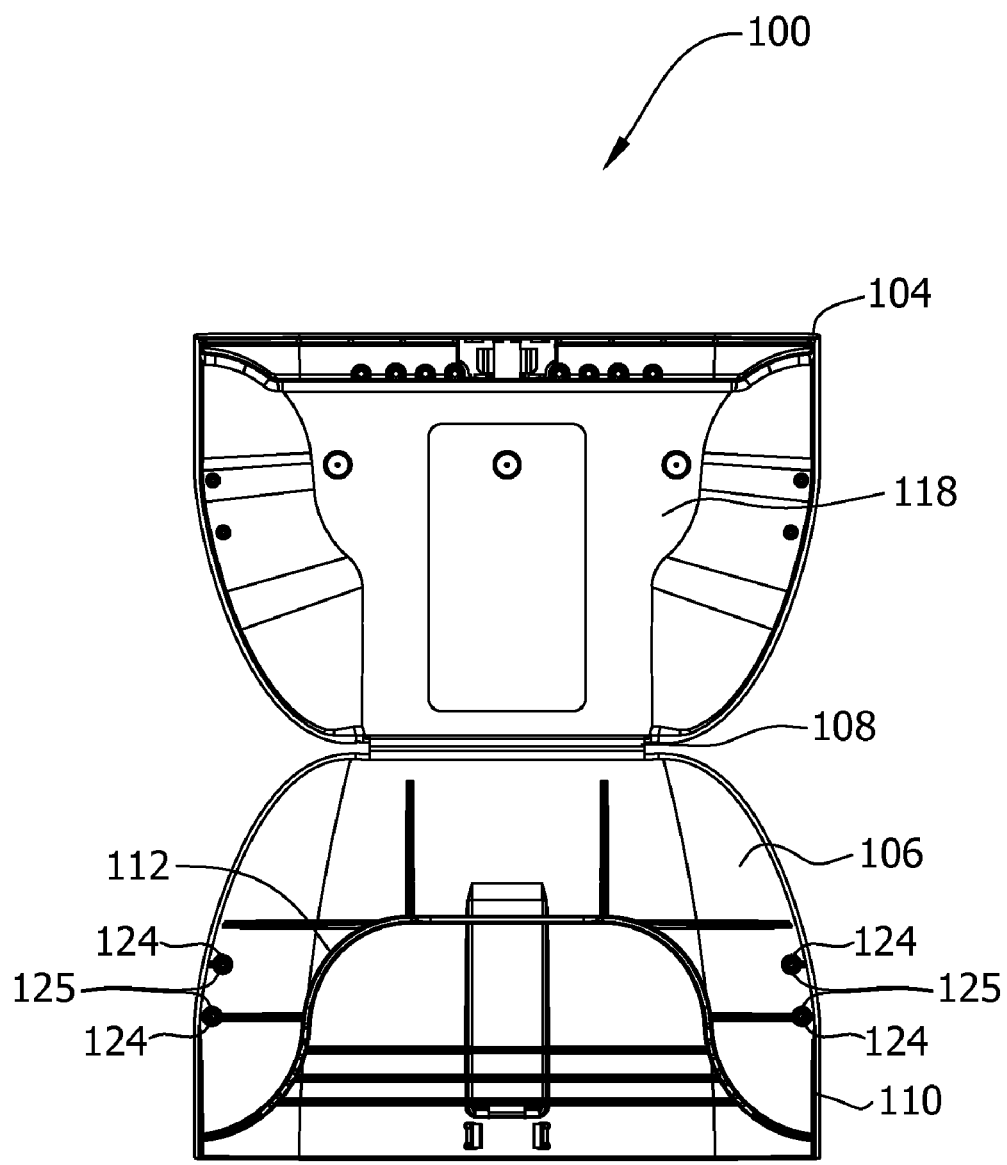
FIG. 9 is a top plan view thereof.

With particular reference to FIGS. 7 and 8, the base 104 comprises a floor panel, or bottom panel 114, having a circumference, an outer surface 120 which broadly (at least in part) defines a bottom of the housing and more particularly of the rodent management station 100, and an inner surface or floor on which rodents move within the interior space of the station. As used herein, the bottom of the housing (and hence the rodent management station 100) refers to the portion or portions of the housing that contact a planar surface when the station is set on such planar surface. Thus, it is understood that the entire outer surface 120 of the bottom panel 114 need not rest on such a planar surface.

In one embodiment, the base 104 also has at least one upstanding wall 116 (otherwise referred to herein as an upstanding sidewall or rear wall) extending upward relative to the bottom panel 114 about substantially less than the entire circumference of the bottom panel. Such an arrangement permits (with all internal traps removed from the housing) debris to be easily swept off of the floor of the housing when the lid 106 is opened for servicing, e.g., without having to reach into the station and remove debris or tilt or turn over the base 104 of the rodent management station. For example, the circumferential extent of the upstanding wall 116 according to one embodiment is such that a continuous circumferential segment of at least about 25 percent of the bottom panel 114 is free from enclosure by the at least one upstanding wall. In the illustrated embodiment of FIG. 8 the at least one upstanding wall comprises an upstanding rear wall 116 of the base (thereby also defining a rear of the housing and more particularly of the rodent management station 100) extending solely along the rear extent of the floor panel 114.

It is understood, however, that a greater extent of the circumference of the floor panel 114 may have one or more upstanding walls extending upward therefrom. For example, the floor panel 114 may be circumscribed on generally three sides thereof with one side remaining unenclosed by an upstanding wall, or a pair of upstanding walls may be disposed on opposite sides (e.g., front and rear, or laterally opposite sides) of the floor panel without departing from the scope of this invention. The floor panel 114 and upstanding or rear wall 116 of this embodiment are suitably formed integral, such as by molding them as a single piece, although these components may be formed separate and connected by any suitable connection technique.

In one suitable embodiment, the inner surface 118 of the bottom panel 114 (e.g., the floor of the housing) tapers, or slopes downward from a central region of the inner surface toward at least the laterally opposite sides of the housing (e.g., where the side walls of the lid generally abut the bottom panel). In the illustrated embodiment the inner surface 118 of the bottom panel 114 remains relatively planar as is extends from the central region thereof to the front of the station 100. However, it is also contemplated that additionally, or instead, at least a portion of the inner surface 118 of the bottom panel 114 may taper or slope downward from the central region thereof toward the front of the housing (e.g., where the front wall of the lid abuts or is hinged to the bottom panel). Providing such a slope or taper to the inner surface 118 of the bottom panel 114 facilitates water drainage off of the bottom panel and out of the rodent management station 100 should water enter the interior space of the housing. In one embodiment, the taper of the inner surface of the bottom panel 114 may be achieved by varying the thickness of the bottom panel, with the central region of the bottom panel having the greatest thickness and the thickness gradually tapering down toward the perimeter of the bottom panel. However the inner surface 118 taper may be achieved other than by varying the thickness of the bottom and remain within the scope of this invention. To further facilitate drainage of water out of the rodent management station 100, small gaps or notches (not shown) may formed in the lid and/or the bottom panel 114 where the lid 106 abuts the perimeter of the bottom panel 114.

While the inner surface 118 tapers and thus varies in elevation relative to the bottom of the station 100 housing, in one embodiment the entire inner surface of the bottom panel 114 suitably has a minimum height above the bottom of the station housing, such as at least about 0.1 inches, and more suitably at least about 0.2 inches, to inhibit water surrounding the station from entering the station. In the illustrated embodiment, the bottom panel 114 has a peripheral skirt 115 having a height according to the suitable minimum height of the inner surface 118 of the bottom panel above the bottom of the station 100 housing.

Figure 12:
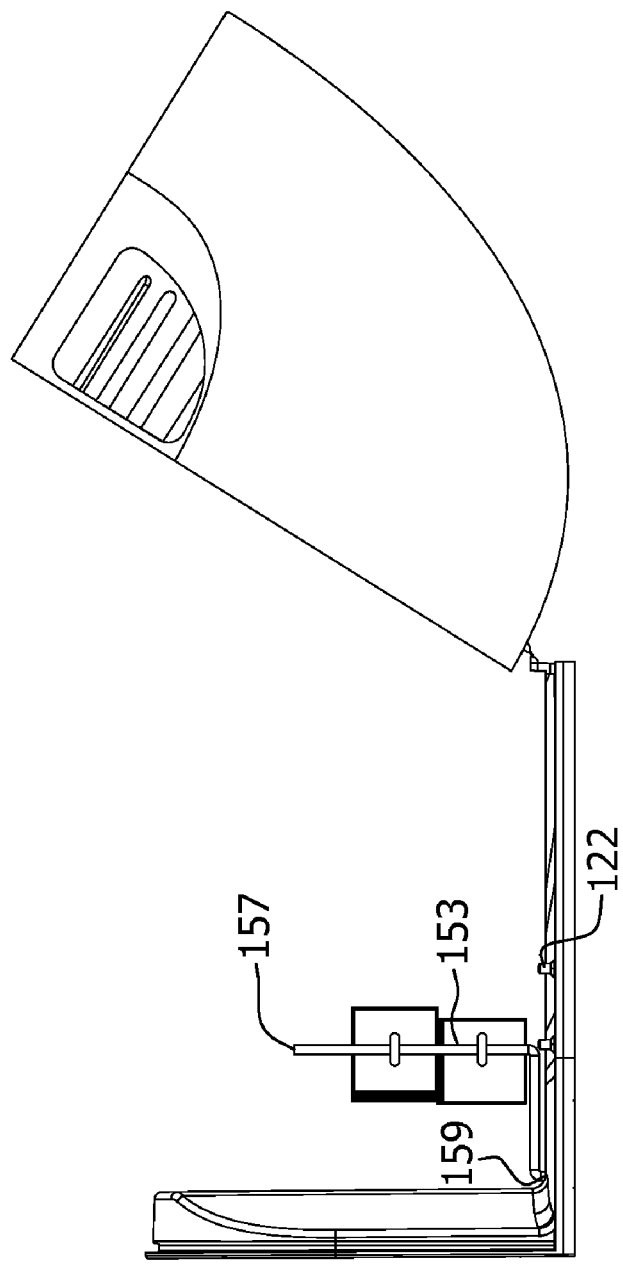
FIG. 12 is a left side elevation view of the rodent management station with bait positioned horizontally in the station.
Figure 14:
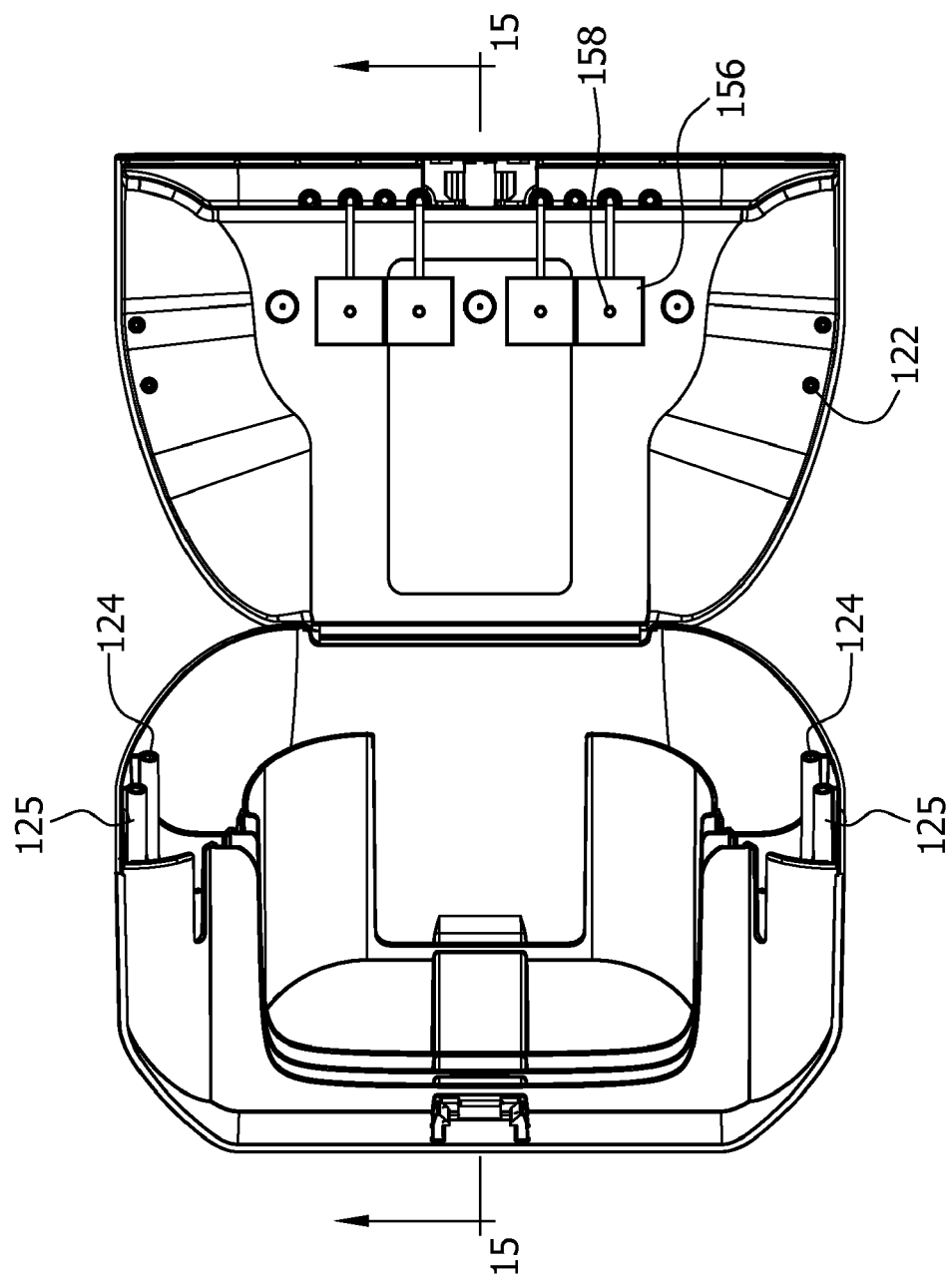
FIG. 14 is a top plan view thereof.
Figure 15:
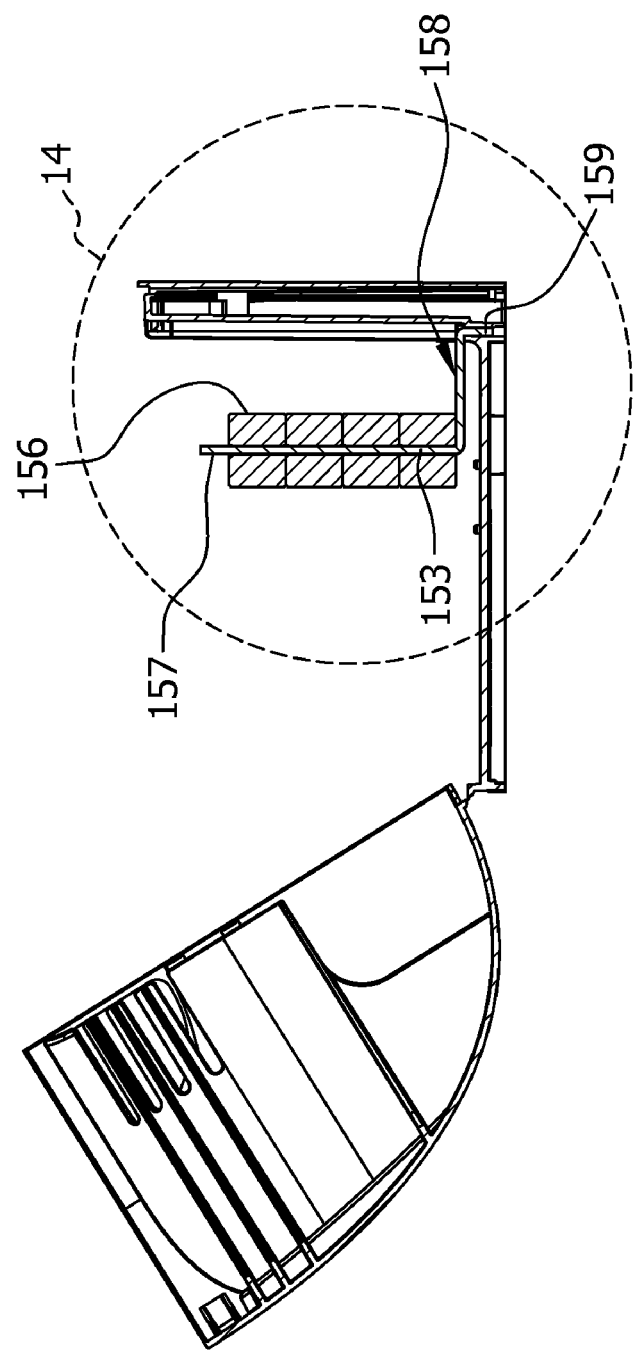
FIG. 15 is a cross-section taken in the place of line 15-15 of FIG. 14.

As seen best in FIGS. 8 and 12, the bottom panel 114 has a pair of low profile (e.g., low height) pins or nubs 122 (broadly, stabilizing members) extending upward therefrom generally adjacent the perimeter of the bottom panel at each of the laterally opposite sides thereof. For example, the nubs 122 may be less than or equal to 0.25 inches in height according to some embodiments. Corresponding locating members, such as in the general form of posts 125 (FIG. 14), are attached to (and are more suitably formed integral with) the inner surface of the lid 106, with each post having a bore 124 extending into the lower end thereof for receiving a respective one of the locating nubs 122 upon closing the lid. Thus, as the lid 106 is closed, the locating members (e.g., posts 125) are lowered down over the nubs 122. The nubs 122 seat within the bores 124 of the respective posts 125 when the lid 106 is fully closed. In this manner, the nubs stabilize the lid on the base, i.e., by providing increased resistance to the side walls 110 of the lid (and hence the rodent management station 100) flexing, bending, or otherwise being pushed inward relative to the bottom panel 114 of the base 104.

The nubs 122, in one embodiment, are suitably low enough to facilitate the sweeping of the housing floor (e.g., the inner surface 118 of the bottom panel 114) by a broom or other suitable cleaning device in a generally continuous movement—such as starting from the laterally off of one side of the bottom panel, across the inner surface thereof—and then off the opposite side of the bottom panel. Additionally, it should be understood that the nubs 122 may be reduced in number or altogether eliminated without departing from the scope of the embodiments. It is thus noted that the inner surface 118 of the bottom panel 114 is thus suitably free from surface discontinuities that would otherwise impede the movement of the broom, cleaning brush or other cleaning device. The term discontinuity as used in this manner refers to upstanding structure that extends up from the inner surface 118 of the bottom panel 114 a height greater than about 1 cm, and/or an abrupt (e.g., step) change in elevation (up or down) of the inner surface of the bottom panel of greater than about 1 cm. This facilitates sweeping or brushing debris from the bottom panel without the cleaning device being impeded by any such discontinuities and without debris getting caught or trapped by such discontinuities.

With reference now to FIG. 7, the outer (or under) surface 120 of the bottom panel 114 has a plurality of ribs 126 extending longitudinally (e.g., front-to-back) and defining inset grooves or channels (broadly, cavities) between the ribs as well as additional inset void space. Upon applying adhesive to the outer surface 120 for securing the rodent management station 100, and more particularly the base 104 to the ground or other mounting surface, adhesive more readily spreads up into the grooves and other voids spaces to enhance the bonding between the base and the mounting surface. The ribs 126 provide additional surface area for the adhesive and also provide structural rigidity to the bottom panel 114 of the base 104. In the illustrated embodiment, the cavities (i.e., the grooves and other void spaces between the ribs 126) are closed at their longitudinal ends near (but otherwise in spaced relationship with) the perimeter of the bottom panel 114 of the base 104, such as at the front and rear of the bottom panel, thus preventing the seepage of adhesive out from the base and inhibiting water and dirt from getting in underneath the bottom panel of the base.

In other embodiments, a variety of configurations of the ribs 126 may be utilized. For example, the ribs 126 may extend from the rear wall 116 inward and then curve and return to the rear wall 116, thus defining cavities that are at least in part arcuate. In other embodiments the ribs 126 may be configured in discrete blocks, thus allowing for greater dispersion of adhesives used to bond the rodent management station 100 to the ground or mounting surface. Furthermore, at least some of the ribs 126 may extend to or through (i.e., the ribs have open ends) the perimeter of the bottom panel 114. Moreover, the shapes of the cavities formed by the ribs 126 may vary (e.g., one cavity may be rectangular or elongate while another is semi-circular or circular. The ribs 126 may also be configured such that two or more cavities are of different sizes, e.g., with one cavity or channel having a size (e.g., a length, width and/or cross-section) and another cavity or channel having a greater size.

The bottom panel 114 of the base 104 is also suitably constructed to define predetermined bore locations 128 at which a bore is to be formed (if desired) in the bottom panel such as with a drill, a punch tool, or other suitable device to facilitate mounting the housing (e.g., and hence the rodent management station 100) on a mounting surface. In particular, suitable fasteners (not shown) may be inserted through such bores in the bottom panel 114 and into the underlying mounting surface to additionally, or alternatively, secure the base 104 to the mounting surface. In the illustrated embodiment, circular ribs 129 (broadly, "guide structure") are formed on the outer surface 120 of the bottom panel 114 to identify the predetermined bore locations 128 to at least substantially circumscribe each bore location and more suitably encircle each predetermined bore location. The circular ribs 129 also reinforce the bottom panel 114 at the bore locations 128 and define additional void space to retain adhesive used to mount the rodent management station 100 to the mounting surface. More than one circular rib 129 may be disposed at each predetermined bore location 128, such is concentric arrangement with each other. In this arrangement, a first circular rib having a first diameter is encircled by a second circular rib having a second diameter greater than the first diameter. The first circular rib and second circular rib are further in a spaced relationship.

Figure 16:
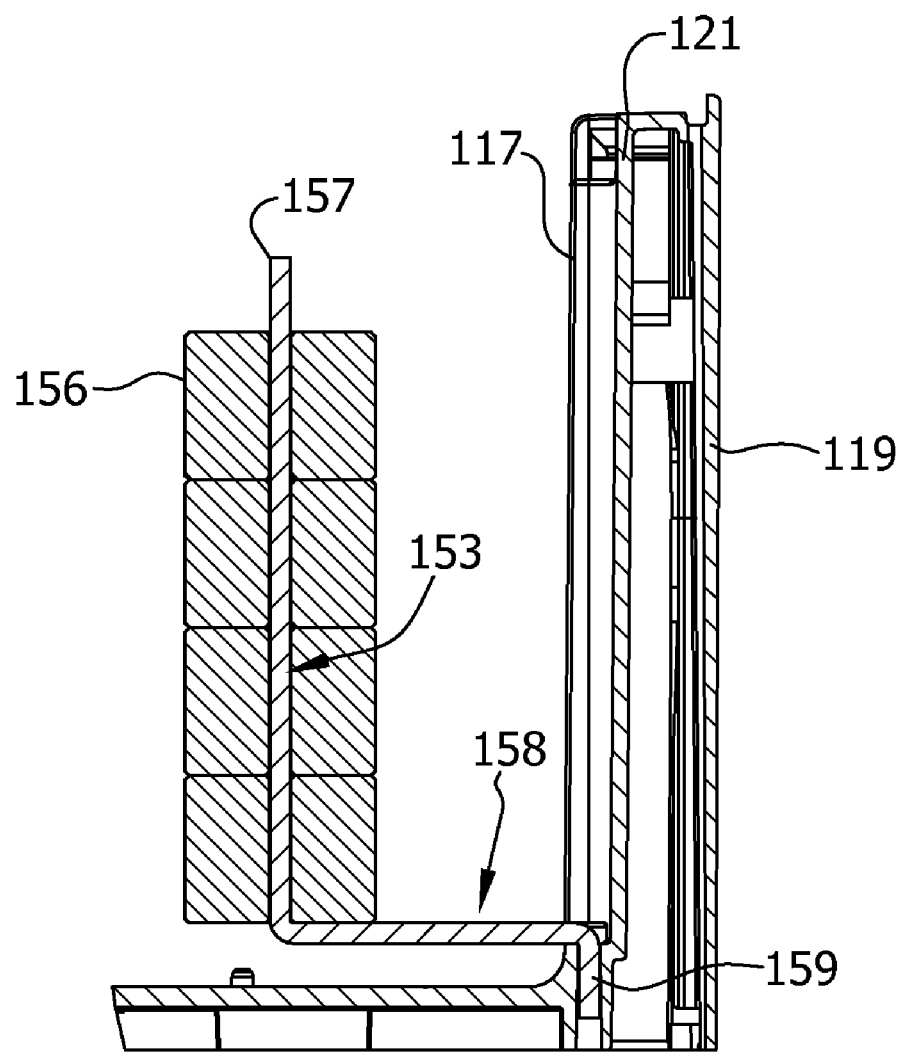
FIG. 16 is an enlarged area of FIG. 15.
Figure 17:
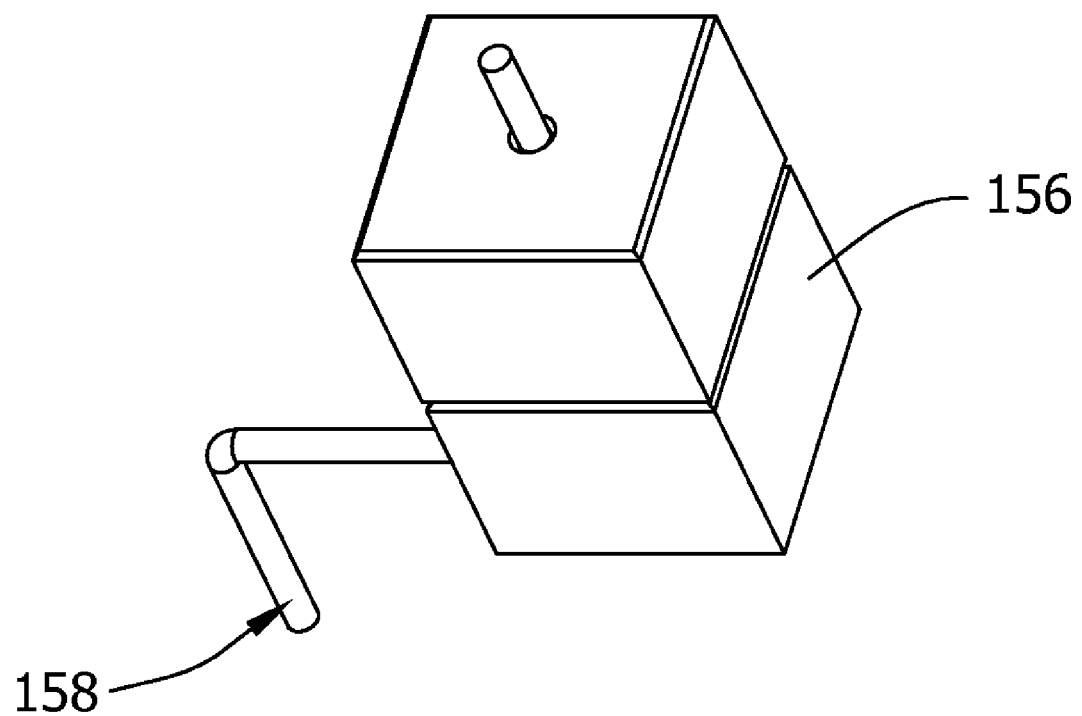
FIG. 17 is a perspective view of bait blocks positioned on a bait support device.

With particular reference now to FIGS. 7, 8 and 16, the upstanding rear wall 116 of the illustrated base 104 is suitably of a multiple wall construction and in this instance a double wall construction. In particular, the rear wall 116 comprises an inner panel 117 that in part defines the interior space of the station 100 housing and an outer panel 119 in generally opposed, spaced relationship with the inner panel to define a gap or open space 123 therebetween. A connecting panel 121, such as in the form of a top panel and opposite end panels in the illustrated embodiment, spans and more suitably connects the inner and outer panels 117, 119 to substantially enclose the gap or open space between the inner and outer panels. At least one of the inner and outer panels 117, 119, and more suitably each of the inner and outer panels, has a lower edge at least a portion of which and more suitably entirely is at the bottom of the housing 100 (e.g., the inner and outer panels may be co-terminal at the bottom of the housing).

The top panel of the rear wall 116 suitably defines a relatively planar or flat shelf (broadly, an upper edge) along the top of the rear wall. The lid 106 is suitably configured (e.g., relatively flat) along an edge margin where the lid overlays the top of the rear wall so the lid lays flat down against the shelf in the closed configuration of the rodent management station 100. Such an arrangement provides increased resistance to crushing of the lid 106 by a downward directed force, such as by someone inadvertently stepping on the rodent management station 100 or dropping a heavy object on the rodent management station. As one example, the flat shelf formed by the top panel of the rear wall 116 in suitable embodiment has a maximum width in the range of about 0.5 cm to about 5.0 cm. It is understood, however, that the width of the top panel, and hence of the shelf formed thereby, may vary along the length of the top panel. It is also understood that the maximum width of the top panel may be other than within the above range without departing from the scope of this invention.

In a particularly suitable embodiment as best seen in FIGS. 8 and 16, the outer panel 119 of the rear wall 116 includes an upper edge that is disposed slightly above the top panel thereof (as well as above an upper edge of the inner panel 117) so that in the closed configuration of the rodent management station 100 (see FIG. 5) the edge of the lid 106 abuts or is at least in closely spaced relationship with the portion of the outer panel that extends above the top panel thereof to inhibit a person's fingers or tools against insertion between the lid 106 and the base 104 to unintentionally open the station 100. As is also illustrated in FIG. 2, the outer panel 119 also extends slightly outward of each of the end panels of the rear wall 116 with the lid 106 being configured such that the edge of the lid abuts or is at least in closely spaced relationship with the outward extending portion of the outer panel.

The rear wall 116 (i.e., the upstanding wall of the base 104) and more suitably the top panel thereof, and even more suitably the top panel and end panels thereof in one embodiment, has at least one gutter (e.g., a channel) 135, disposed therein and extending along at least a portion of the upper edge defined by the top panel. In the illustrated embodiment, for example, a respective gutter 135 extends from generally adjacent each transverse side of the locking mechanism along the upper edge defined by the top panel and down along the end panels of the rear wall all the way to where the rear wall meets the bottom panel 114. This gutter 135 arrangement facilitates the run-off of water that gets into the station via the locking mechanism or between the lid 106 and the rear wall 116. Additionally, as illustrated best in FIG. 10, the corner at the juncture of the upstanding rear wall 116 (and more suitably the inner panel thereof) with the inner surface 118 of the bottom panel 114 is substantially rounded to further facilitate water entering the rodent management station to run along this corner to the sides of the station for exiting the station at the entry openings 102.

In one particularly suitable embodiment, one or more drain holes 127 disposed in the top panel of the rear wall 116 and more suitably along the gutter 135 in spaced relationship with each other to facilitate drainage of water from the rear wall down between the inner and outer panels of the rear wall (i.e., away from the interior space of the housing).

Figure 6:
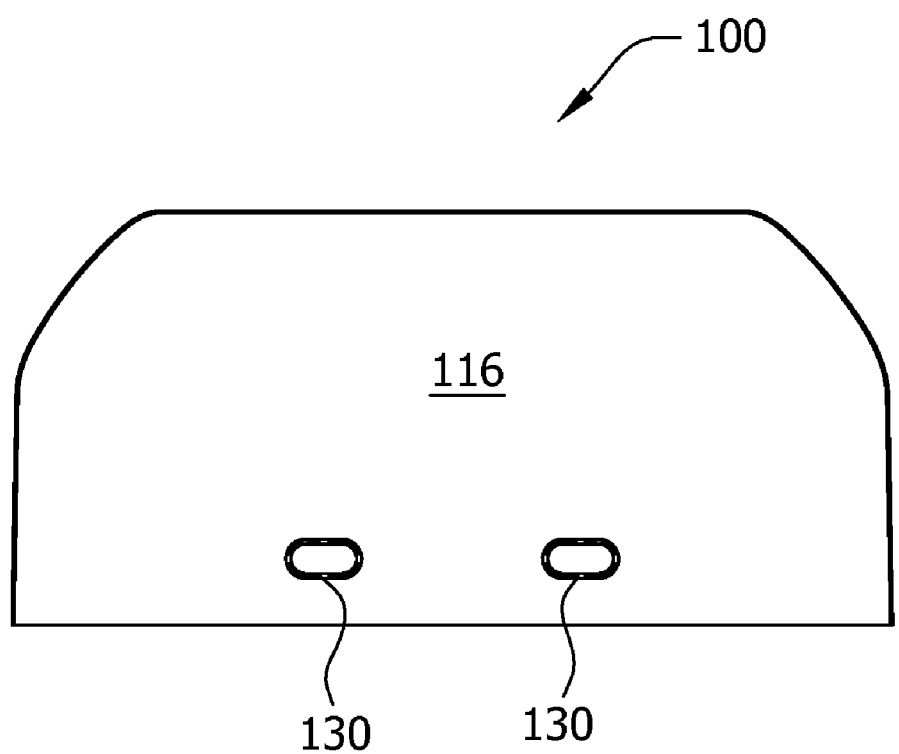
FIG. 6 is a rear elevation thereof.

With reference now to FIGS. 2, 6 and 8, the upstanding rear wall 116 of the base 104 and more suitably the outer panel 119 of the rear wall in the multiple construction of the illustrated embodiment, may include at least one and more suitably two or more mounting ports 130 separate from the rodent entry openings 102. As illustrated in FIG. 6, in one embodiment the outer panel 119 has a pair of mounting ports 130 disposed therein in spaced relationship with each other and in horizontal alignment with each other. It is understood, however, that the pair of mounting ports 130 may alternatively be in vertical (e.g., top above bottom) relationship with each other and remain within the scope of this invention. Providing at least a pair of mounting ports 130 permits strap or cable-type fasteners to be used to secure the base 104 to a mounting surface such as a post, slat or chain-link fence.

In one particularly suitable embodiment, a movable closure 131 is removably connected to the outer panel 119 of the rear wall 116 at each respective mounting port 130. For example, the movable closure 131 is removable from the outer panel 119 to expose a respective one of the mounting ports 130. More suitably, the movable closure 131 comprises a frangible closure such as a knock-out plate. It is understood, however, that the closures 131 may be omitted such that the mounting ports 130 are permanently open.

The rear wall 116 of the base 104 includes an inner panel 117 or surface having elongate, vertically extending slots 132 formed therein. The slots 132 are spaced laterally apart from each other along the inner surface of the rear wall 116, and may be of uniform length but more suitably are of varying lengths with some slots 132 being longer than others. Each of the slots 132 is open at the top of the rear wall 116 and extends down to a location generally intermediate the top and bottom of the rear wall (for the shorter slots) or to adjacent the bottom of the rear wall (e.g., just above the inner surface of the bottom panel, for the longer slots).

With reference back to FIG. 2, the interior panels 112 (i.e., the internal partition structure) depending from the lid 106 are suitably configured to depend into abutting or closely spaced relationship with the inner surface 118 of the bottom panel 114 of the base 104 when the lid is closed. These interior panels 112 thus provide additional crush resistance to the lid, such as upon a downward force being applied to the lid. The interior panels 112 also partition the interior space of the housing into a generally central bait chamber 138 (e.g., above the central region of the inner surface 118 of the bottom panel 114) and a pair of generally curved pathways 103 that are defined at least in part by the interior panels. These pathways 103 each extend away from the respective entry opening 102 and lead to the bait chamber 138. An entryway to the bait chamber 138 is also defined at least in part by the interior panels 112. More particularly, in the illustrated embodiment the pathways 103 are defined by the interior panels 112 and by the lid 106. The pathways 103 together form a single open passageway 109 that extends from one entry opening 102, around to adjacent the front of the station 100, past the entryway to the bait chamber 138 and back around to the opposite entry opening. The tortuous passageway 109 prevents rodents entering the rodent management station 100 at the entry openings 102 from traveling straight through the rodent management station 100 from one entry opening to the other.

The central bait chamber 138 is suitably defined in part by the interior panels 112 and in part by the inner panel 117 of the rear wall 116. A suitable trap mechanism and/or bait may be positioned within the central bait chamber 138, with the interior panels 112 restricting access to the bait chamber, i.e., by omitting direct access to the bait chamber from the entry openings 102 in the rodent management station. Thus, non-targeted animals (e.g., dogs or cats) and unauthorized individuals (e.g., children) cannot easily reach through the entry openings 102 into the bait chamber when the lid is closed.

The interior panels 112 in one suitable embodiment have one or more through-openings 141 formed therein, and more suitably disposed in directional alignment with each of the entry openings 102 as illustrated in FIG. 5. For example, in the illustrated embodiment the one or more through-openings 141 comprise a plurality of elongate, vertically extending slots 143 formed in the interior panels 112 to define a plurality of slats, or baffles 140 in directional alignment with the entry openings 102. As used herein, the term "directional alignment" is intended to mean the general direction of travel or viewing through the entry opening 102, such as a straight line through the center of the entry opening. The slots 143 are suitably sized large enough to permit light to enter the rodent management station 100 while still sized substantially smaller than the entry openings 102 so as to inhibit rodents from passing through the slots. In the illustrated embodiment in which the rodent management station 100 has two laterally opposite entry openings 102, the slots 143 also allow light to pass through the entire rodent management station 100 so that a rodent can see straight through the station through the entry openings.

These slots 143 also provide open communication between the pathways and the central bait chamber 138 so that the rodent is able to better smell (due to air flow through the rodent management station 100) bait in the bait chamber 138 from the exterior of the station and upon entry into the station as the rodent is routed along the pathway 103. It is understood that additional through-openings may be provided along a longer segment of the pathway 103 from the entry opening 102 to the entryway of the bait chamber 138, including along the entire pathway. It is also understood that the through-openings 141 may be other than in the form of slots, such as perforations, holes or other suitable openings that may or may not extend to the bottom edge of the interior panels 112. The interior panels 112 may also include a plurality of gussets 113 (FIG. 2) or webs where the interior panels 112 adjoin the lid 106 to provide additional strength and rigidity to the lid and to the interior panels.

Upon entering the rodent management station 100 through one of the openings 102 and traveling along the passageway 109, the rodent is able to enter the bait chamber 138 via the entryway defined by the interior panels 112. In one particularly suitable embodiment, the height of the bait chamber 138

(e.g., the vertical distance from the inner surface of the bottom panel 114 of the base 104 to the inner surface of the top wall 137 of the lid 106) is sufficient to permit the rodent to ingest bait while in a generally upright, seated position as is typically preferred by rodents. For example, while the height of the bait chamber 138 in one embodiment may be non-uniform due to the taper of the lid 106, the bait chamber 138 suitably has a maximum height of about 5.7 inches.

While not visible in the drawings, in some embodiments at least a portion of the inner surface 118 of the bottom panel 114 of the station 100 housing (i.e., the floor of the housing) may be textured to increase traction and thus facilitate the movement of rodents thereon. The texturing may be formed integral with the inner surface 118 of the bottom panel 114, or applied to the inner surface. For example, in one suitable embodiment the texturing may comprise a plurality of elongate grooves and/or a plurality of elongate bumps formed in or on the inner surface 118 of the bottom panel 114 of the base 104. More suitably, such grooves and/or bumps may extend across all or part of the inner surface 118 of the bottom panel 114 in directional alignment with the entry openings 102 of the station 100 housing, e.g., transversely or side-to-side in the illustrated embodiment. Because rodents entering the station 100 housing at one of the entry openings 102 will move along one of the pathways in a generally back to front direction, arranging the grooves and/or bumps in this manner results in these grooves and/or bumps extending generally cross-wise to the direction in which rodents move along the pathway, thus providing additional traction for such movement.

It is contemplated that the texturing need not be present over the entire inner surface 118 of the bottom panel 114 to remain within the scope of this invention. For example, in one embodiment the texturing may be disposed only along the pathways leading from the entry openings 102 to the entryway of the bait chamber 138, while the bottom panel inner surface 118 within the bait chamber is substantially untextured. It is also understood that texturing other than in the form of grooves and/or elongate bumps may be used, in addition to or as an alternative to such grooves and/or bumps. For example, texturing such as knurling, dimples and/or discrete bumps, particulate material molded into the bottom panel or adhered to the inner surface thereof, or other suitable texturing may be used within the scope of this invention.

With particular reference now to FIGS. 33-37, the locking mechanism 142 releasably secures (i.e., interlocks) the lid 106 and base 104 together in the closed configuration of the station 100, thereby inhibiting unauthorized or unintended opening of the rodent management station 100. In a particularly suitable embodiment, the locking mechanism 142, base 104 and lid 106 are further configured so that the locking mechanism is substantially inaccessible from exterior of the station 100 to inhibit rain and snow from entering the rodent management station 100 at the locking mechanism or otherwise inhibiting access to the locking mechanism. The locking mechanism 142 comprises a generally U-shaped lock member 148 having resilient, upstanding members 149 terminating in respective catches 151 (broadly, "catch members"). The lock member 148 may be coupled to either a portion of the lid 106 or a portion of the base 104. The catches 151 have at least one notch formed therein to receive the upstanding members 149. The upstanding members 149 are also outwardly biased.

The lock member 148 has depending support members 153 which are attached to the rear wall 116 of the base so that the lock member 148 extends vertically within the rodent management station 100. Corresponding latches 150 are formed on the underside of the lid 106 and depend therefrom for latching engagement with the catches of the lock member when the lid is closed to releasably secure the lid in its closed configuration. Alternatively, the lock member 148 may be attached to the lid 106 and the latches 150 mounted on the rear wall 116 without departing from the scope of this invention. The locking mechanism 142, in one embodiment, is positioned above an opening in the top panel of the rear wall 116 of the base 104. Water that reaches the locking mechanism 142 through the lid 106 is thus directed into the openings and down within the rear wall away from the locking mechanism (and hence other than into the housing and in particular into the bait chamber 138.

Figure 35:
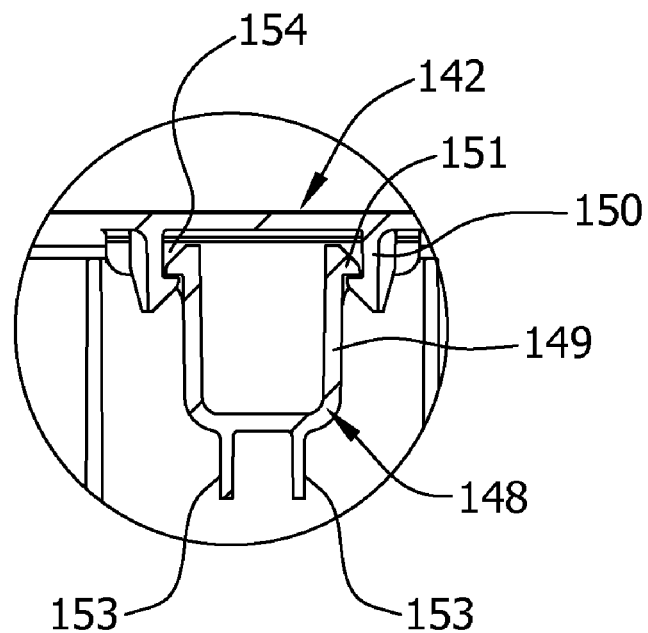
FIG. 35 is an enlarged view of the locking mechanism of FIG. 34.
Figure 36:
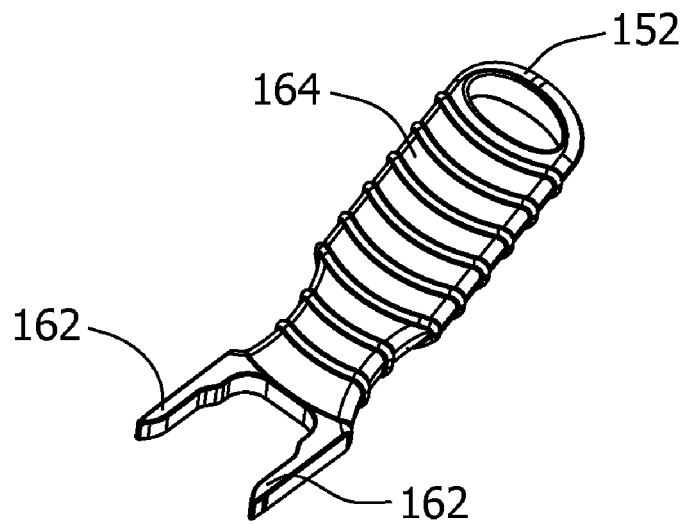
FIG. 36 is a perspective view of the key of FIG. 33.
Figure 37:
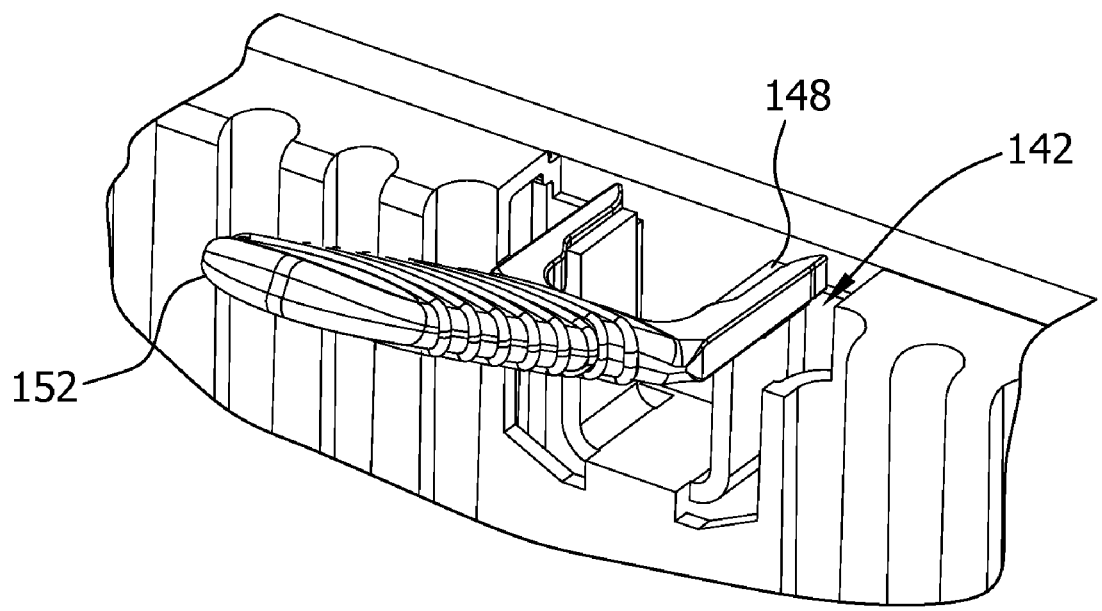
FIG. 37 is a perspective view of the key engaging the locking mechanism, with portions of the station broken away for illustrative purposes.

To unlock the locking mechanism 142 a key 152 (FIG. 36) (broadly, a "tool") having a pair of laterally spaced prongs 162 (broadly, an "insertion portion") is inserted through a pair of keyholes 154 (FIG. 4) (broadly, "openings") in the lid 106 into engagement with the upstanding members 149 of the lock member 148 as illustrated in FIG. 35. The keyholes 154 are in a generally vertical orientation (broadly, a "first orientation"). The spacing of the prongs applies a squeezing force to the laterally spaced upstanding members 149 to urge the catches 151 of the lock member 148 toward each other and away from the latches 150 to thereby allow the lid 106 to be opened. A handle 164 of the key 152 is suitably angled relative to the prongs so the handle does not lie against the lid (i.e., it angles up away from the lid at e.g., between 10 degrees and 60 degrees) when the prongs are inserted into the keyholes 154 as illustrated in FIG. 33 to facilitate gripping the handle during unlocking and opening of the lid.

Figure 4:
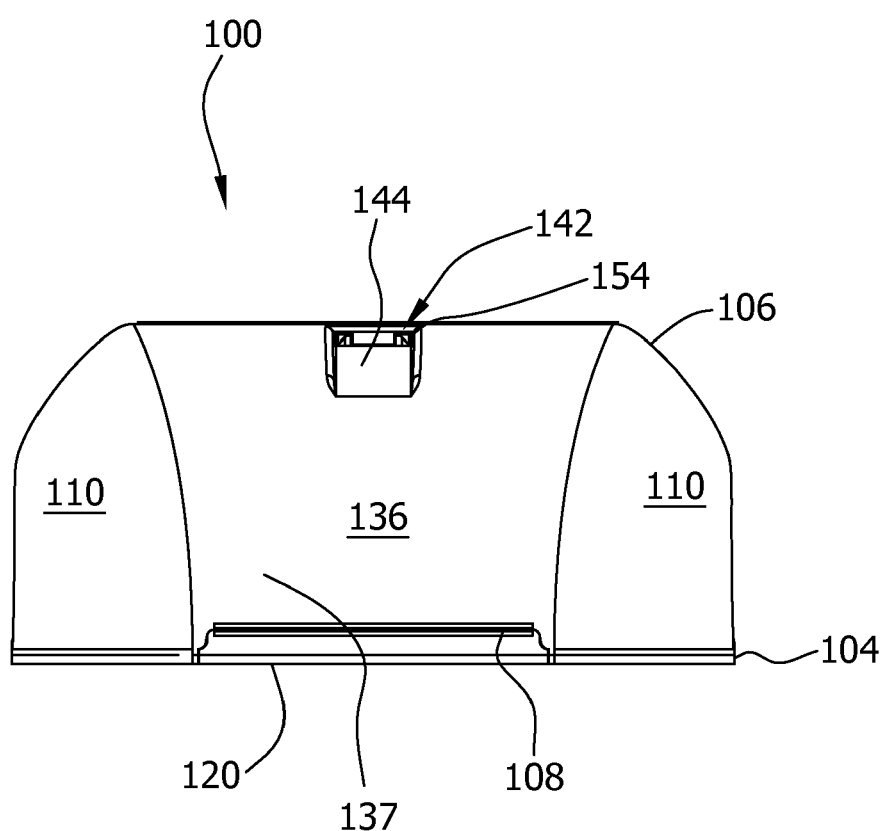
FIG. 4 is a front elevation thereof.
Figure 33:
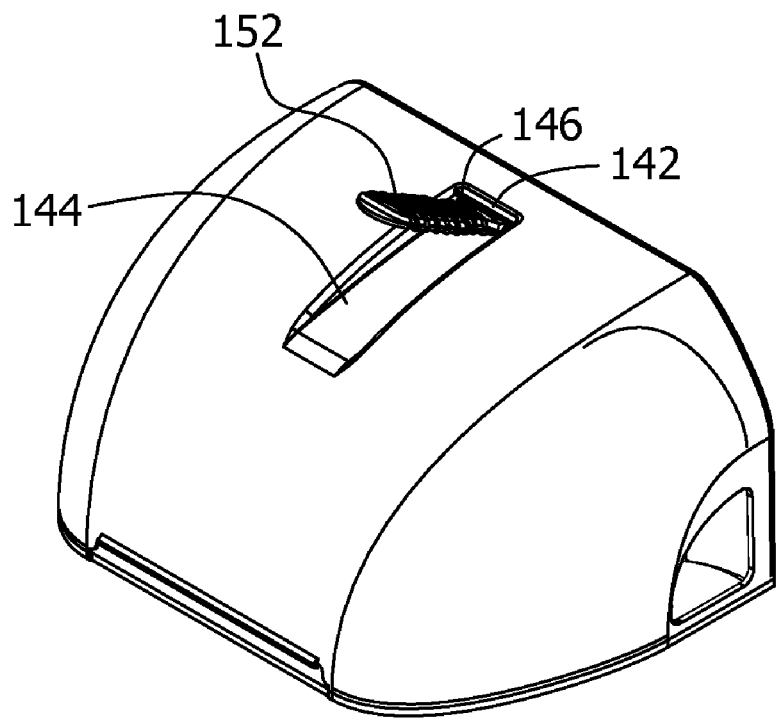
FIG. 33 is a perspective view of a key being used to unlock the lid from the base of the rodent management station of FIG. 1.
Figure 34:
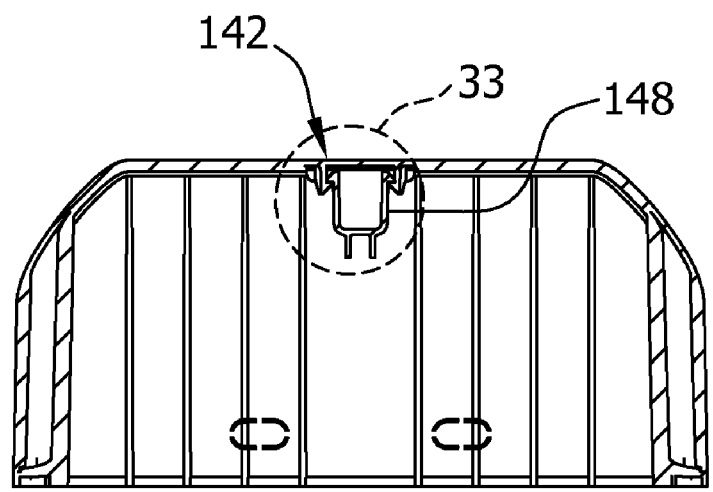
FIG. 34 is a cross-section taken in the plane of line 34-34 of FIG. 33 and illustrating a locking mechanism used to secure the base to the lid of the rodent management station of FIG. 1.

With reference to FIGS. 4 and 33, the lid 106 suitably has a guide channel 144 formed in its outer surface to facilitate guidance of the key 152 and more particularly the prongs thereof into the keyholes 154. The guide channel 144 in one embodiment has a width sized for a sliding fit of the prong portion of the key 152 therein, i.e., the guide channel 144 has a maximum width that is suitably no greater than and is more suitably less than a maximum width of the key 152. The relatively tight fit of the key 152 within the guide channel 144 and the locking mechanism 142 (along with the angled handle, allows the key 152 (i.e., the tool) to be used as a handle for lifting the lid 106 to the closed configuration of the station 100. The guide channel 144 also has a terminal end (broadly, a "proximal end") that is generally adjacent to at least one of the keyholes 154 and an entry end (a "distal end") spaced from the terminal end. The guide channel 144 has a first depth at the terminal (i.e., proximal) end and a second depth at the entry end that is substantially less than the first depth (e.g., the depth of the guide channel increases as it approaches the keyholes 154). In use, the prongs are set down against the lid within the channel 144, such as at or near the entry end of the guide channel, and then slid along the channel such that the sides of the channel properly align the prongs with the keyholes 154 for proper insertion of the prongs into the keyholes.

In a particularly suitable embodiment, the guide channel 144 is formed in the lid 106 to be at least in part horizontally oriented (e.g., whereas the keyholes 154 are generally vertically oriented) and more suitably to slope downward away from the keyholes 154 to direct water that lands on the lid away from the keyholes 154, and thus inhibit moisture from flowing into the keyholes. The lid 106 is further configured to have a cover panel 146 (broadly, a cover) disposed above the keyholes 154 and extending out over at least a portion of and more suitably the whole of each of the keyholes. The cover 146 in this embodiment is thus in generally opposed, spaced relationship with the guide channel 144 adjacent and at the terminal end of the guide channel 144, such as in a generally horizontal orientation. In this orientation, the cover panel 146 extends in an orientation different from the orientation of the keyholes so that the keyholes are substantially covered against direct contact by falling rain and snow and the cover panel 146 inhibits moisture on the lid 106 or base 104 from entering the housing. It is understood, however, that the cover panel 146 may be configured other than as illustrated and described herein without departing from the scope of this embodiment.

To further facilitate water (e.g., rain) management as well as to facilitate opening of the lid 106 while remaining hinged to the base 104, the hinge has a hinge axis that is located on the station 100 housing higher than the bottom of the station housing as seen for example in FIG. 8. More suitably, the hinge axis is located on the station 100 housing higher than the inner surface 118 of the bottom or floor panel 114 of the base 104. For example, in one suitable embodiment the hinge axis is located on the station 100 housing about 2.5 mm to about 25 mm above the inner surface 118 of the bottom or floor panel 114 of the base 104. As further illustrated in FIG. 8, the hinge axis is located substantially lower than the upper edge of the rear wall 116 of the base 104, such as nearer in height to the inner surface 118 of the bottom or floor panel 114 than to the upper edge of the rear wall of the base.

Figure 10:
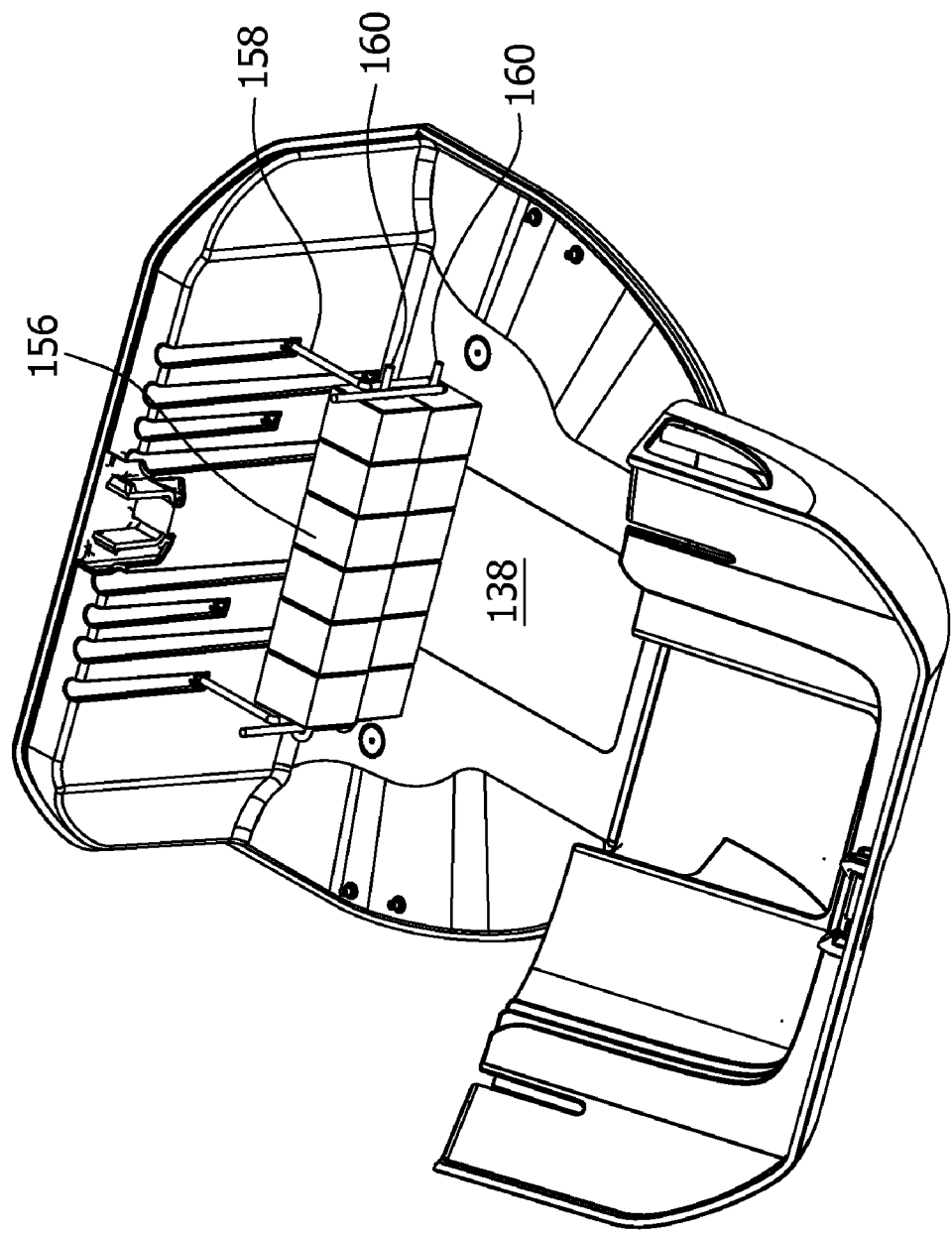
FIG. 10 is a perspective view thereof with bait positioned horizontally in the station.
Figure 13:
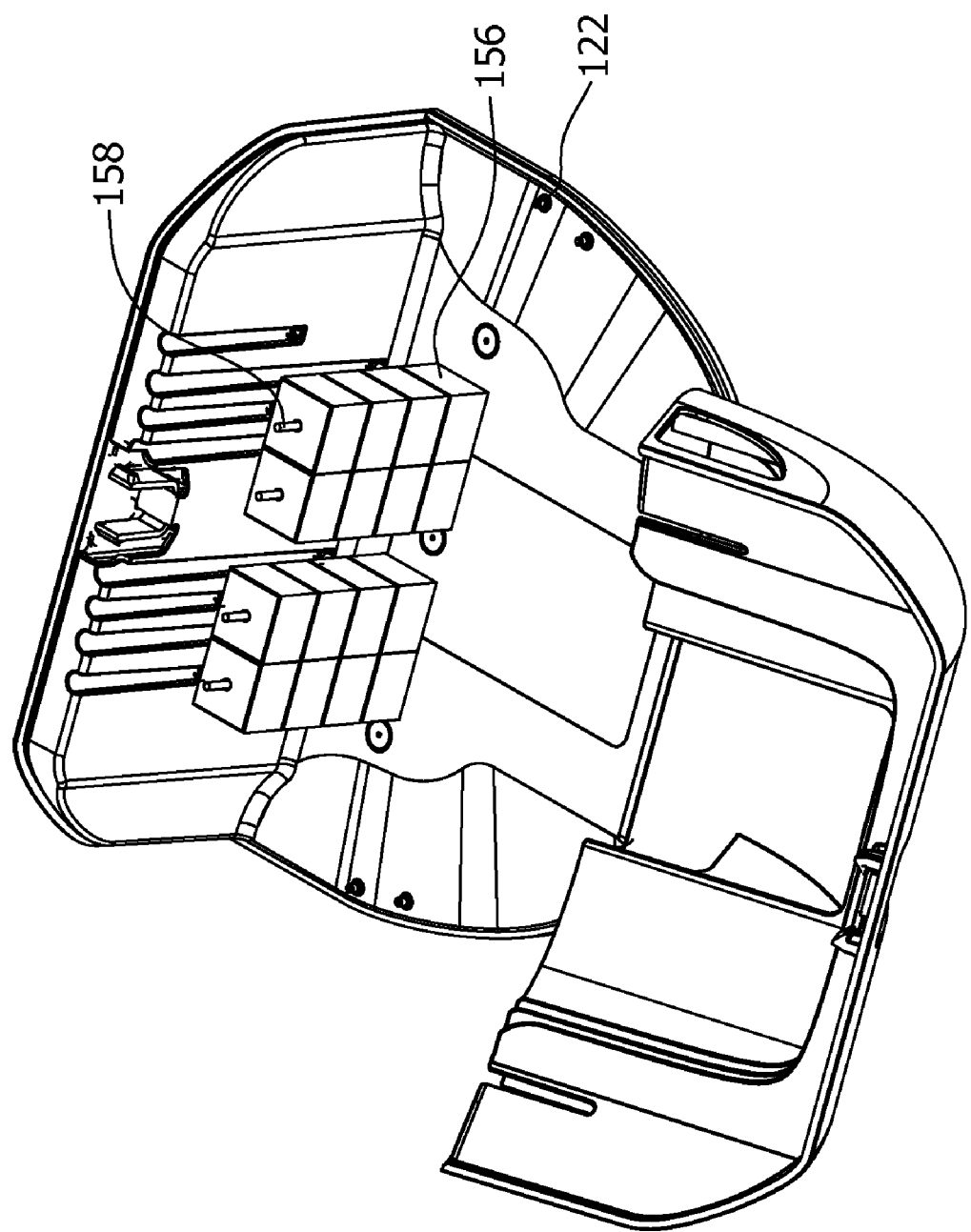
FIG. 13 is a perspective view similar to FIG. 10 but with a bait positioned vertically in the station.

With particular reference now to FIGS. 10 and 13, bait such as bait blocks 156 (FIGS. 10 and 13), is disposed within the bait chamber 138 and more suitably toward the back of the bait chamber generally adjacent the rear wall of the base 104. Many different types of bait are available, and their general compositions and principles of operation are well known in the art. Such baits may solely comprise a rodent attractant and others may additionally, or alternatively, comprise one or more toxins intended to kill the rodents.

Suitable bait supports 158 are used within the rodent management station 100 for positioning and retaining the bait within the bait chamber 138, and more suitably for supporting such bait in spaced relationship above the floor of the housing (e.g., above the inner surface 118 of the bottom panel 114). In the illustrated embodiment, a plurality of bait blocks 156 are mounted on a "skewer" 160, or wire support which in turn is supported by the bait supports in a horizontal orientation. The skewer 160 passes through a hole in each of the bait blocks 156—the hole being centrally located in the bait block although the hole need not be centrally located to remain with the scope of this invention. It is also understood that the bait may be other than in the shape of a block or cube without departing from the scope of this invention. The skewer 160 is sized to extend longitudinally outward beyond the opposite ends of a row of bait blocks 156. In particular, one end of the skewer 160 is formed in the manner of a loop or eyelet, the purpose of which will become apparent, while the opposite end of the skewer remains substantially straight.

Figure 11:
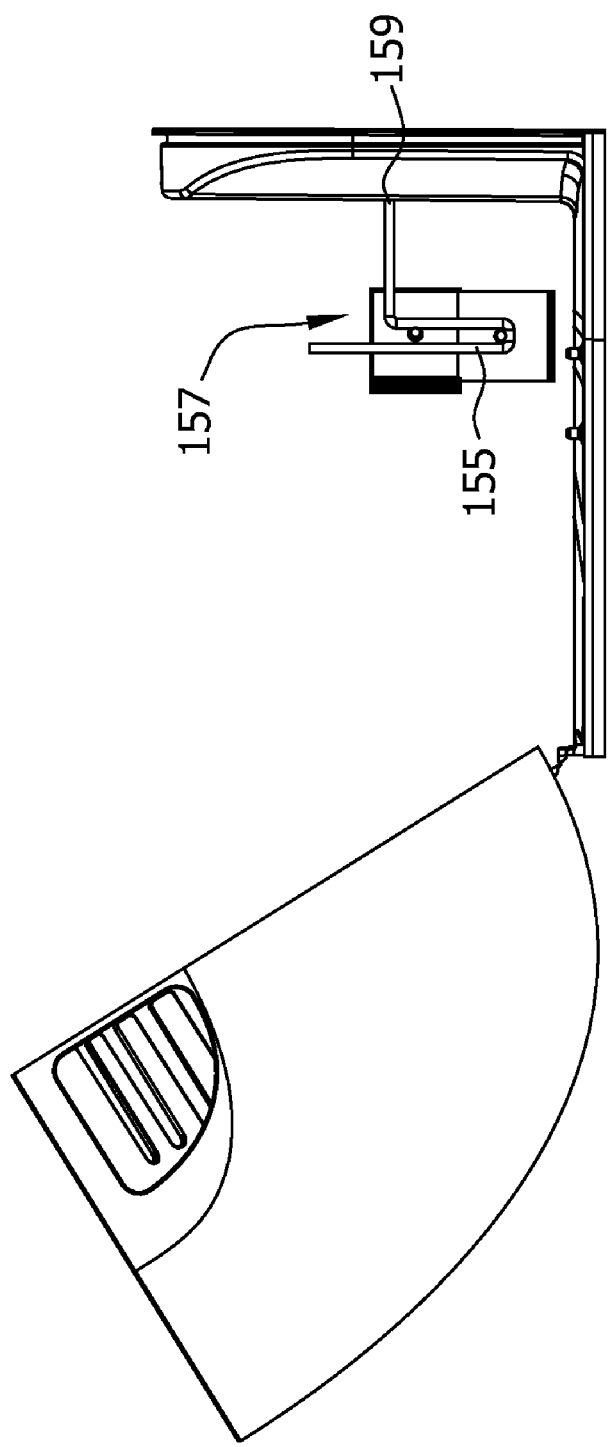
FIG. 11 is a right side elevation view of the rodent management station with bait positioned horizontally in the station.

As illustrated in FIG. 10, the rodent management station 100 and in particular the rear wall 116 and the bait supports 158 are configured such that multiple skewers may be supported by the bait supports in a horizontal orientation with the bait blocks "stacked" in horizontal rows of blocks. More particularly, in the illustrated embodiment the bait supports 158 for supporting the bait blocks in a horizontal orientation comprise a pair of frame members 153, 155 (FIGS. 10-12) each having a mounting end configured for generally vertical orientation within respective ones of the slots 132 formed in the rear wall 116 of the base 104. More suitably, receipt of the mounting end of a frame member 153, 155 within the slot 132 and sliding the mounting end (along with the rest of the frame member) down to the bottom of the slot releasably connects the frame member to the rear wall 116 of the base 104. In particular, for frame members 153, 155 used as bait supports 158 to support the bait blocks in a horizontal orientation, the shorter slots 132 in the rear wall are used. In the illustrated embodiment it is the outermost pair of shorter slots 132 that is used, but any combination of shorter slots 132 may be used for horizontal support of the bait blocks depending on the desired lengths of the bait block rows and the size of the skewers 160.

One frame member 155 (FIG. 11) is configured to extend outward from its mounting end (i.e., away from the rear wall of the base and into the bait chamber 138) and to have a generally U-shaped cradle open at its upper end 157 for receiving the straight ends of the skewers 160. The other frame member 153 (FIG. 12) is configured to extend outward from its mounting end 159 and terminate in a vertically oriented post configuration for receiving the eyelets of the skewers 160. In this manner, the frame members 153 and 155 cooperate to locate and retain the skewers 160 and hence the bait blocks 156 on the bait support in a horizontal orientation. It is contemplated that the skewers 160 may instead extend straight out from both ends of the row of bait blocks 156, and that the frame members 153 and 155 may both be formed to have the U-shaped cradle without departing from the scope of this invention. In a particularly suitable embodiment, the frame members 153 and 155 are configured to support the lowermost horizontal row of bait blocks up off of the inner surface of the bottom panel 114 of the base 104 (i.e., above the floor of the rodent management station) to inhibit water that drains along the inner surface of the bottom panel from contacting the bait blocks.

In other embodiments, the bait blocks 156 may be stacked vertically in one or more columns, as illustrated in FIGS. 13-17. Suitable bait support devices 158 for such embodiments each comprise a frame member 153 (e.g., a wire frame member in the illustrated embodiments) having a mounting end 159 that slides into (e.g., via the open upper ends of the slots) and down to the bottom of the slots 132 in the rear wall 116 of the base 104 to releasably connect the bait support 158 to the rear wall. Each frame member 153 further extends outward from the mounting end 159 (i.e., away from the rear wall 116 of the base panel 104) and is configured to terminate in a vertically oriented post on which bait blocks 156 are supported. That is, no skewer 160 (FIG. 10) is needed in these embodiments. When vertical bait block columns are used, each slot 132 supports a respective column of bait blocks. In the illustrated embodiment, where vertical columns of bait blocks are used, it is the longer slots 132 in the rear wall 116 that are utilized. It is understood that any number and combination of the longer slots 132 may be used to support bait block columns within the scope of this invention. In a particularly suitable embodiment, the frame members 153 are configured to support the vertical columns of bait blocks 156 up off of the inner surface 118 of the bottom panel 114 of the base 104 (i.e., above the floor of the rodent management station 100) to inhibit water that drains along the inner surface of the bottom panel from contacting the bait blocks.

It is also understood that the provision of multiple slots 132 (shorter and longer) along the rear wall of the base 104 allows for various combinations of horizontal rows of bait blocks and vertical columns of bait blocks. For example, one or more horizontal bait block rows may be supported by suitable frame members mounted 153 in the innermost pair of shorter slots, with additional vertical columns of bait blocks supported by the respective frame members 153 mounted in each of the outermost longer slots.

Figure 18:
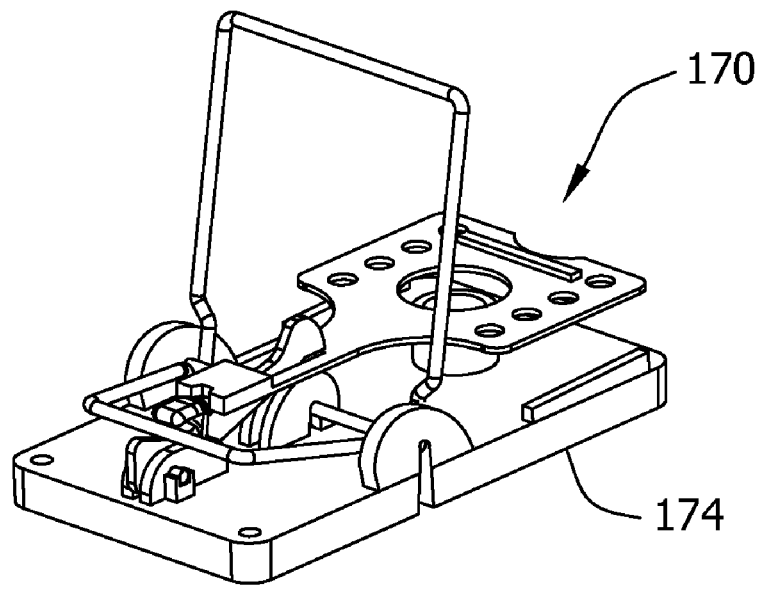
FIG. 18 is a perspective view of a snap trap for use in the rodent management station of FIG. 1.
Figure 19:
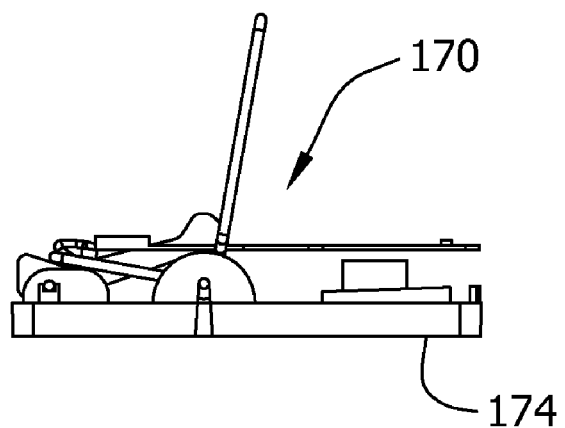
FIG. 19 is a side elevation thereof.
Figure 20:
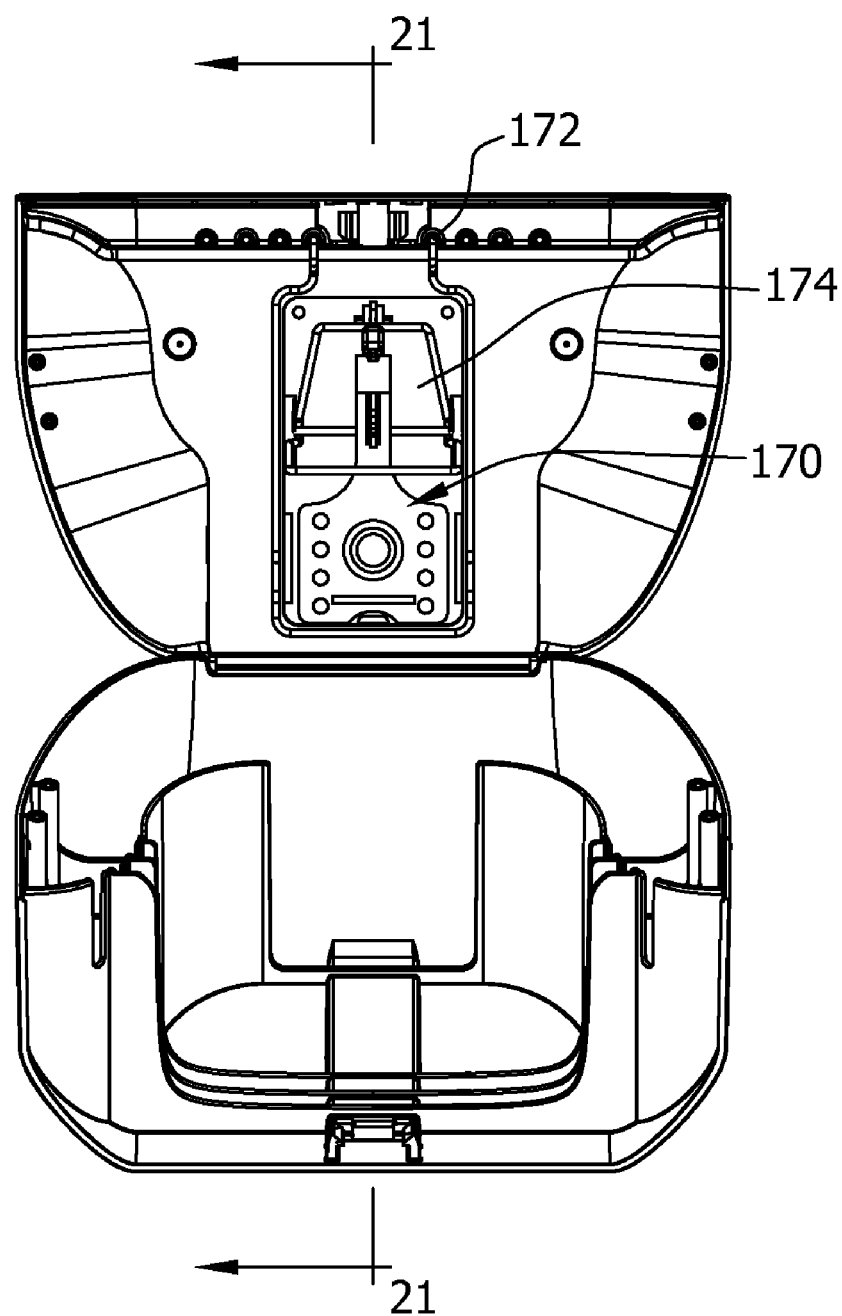
FIG. 20 is a top plan view of the rodent management station of FIG. 1 with the snap trap of FIG. 18 positioned therein.
Figure 21:
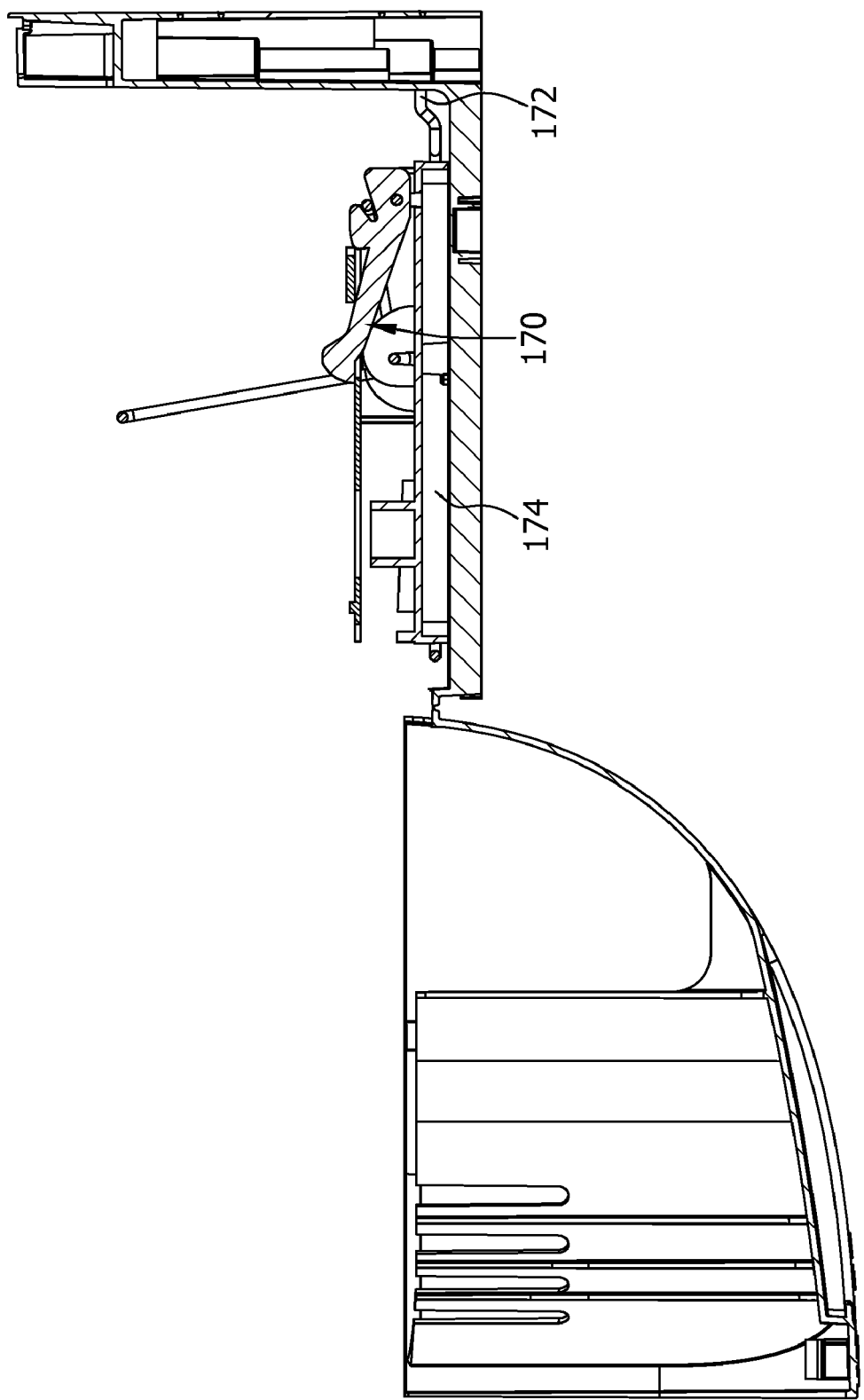
FIG. 21 is a cross-section taken in the plane of line 21-21 of FIG. 20.

With particular reference now to FIG. 18, the rodent management station 100 is suitably modular to permit a snap trap 170 (e.g., a conventional mouse trap) to be placed in the bait chamber. The snap trap 170 depicted in FIG. 18 is similar in design to one commercially available from Kness Manufacturing Company, Inc. of Albia, Iowa. In such a configuration of the rodent management station 100, bait blocks 156 may be supported on the rear wall of the base 104 as described previously, or the snap trap 170 may be baited in a manner known in the art with the bait blocks omitted. In another embodiment, bait blocks 156 may be supported on either side of the snap trap 170. In one particularly suitable embodiment the snap trap 170 is disposed and oriented in the bait chamber 138 with a portion of the trigger mechanism of the snap trap extending through the bait chamber entryway into the passageway outside the bait chamber (as best seen in FIGS. 20 and 21). In this manner, bait may be placed on the trap 170 (or on the rear wall 116 as in the previous embodiments) to allow the rodent to smell and in some instances see the bait through the through-openings formed in the interior panels 112. As the rodent continues along the passageway in search of the bait, the rodent must cross over the trigger mechanism of the snap trap. In particular, the rodent is prevented from continued travel along the passageway to the opposite entry opening 102 without crossing over the trigger mechanism of the snap trap. While an exemplary snap trap 170 is depicted in FIGS. 18 and 19, it understood that other suitable snap traps may be used within the scope of this invention.

A horizontal frame 172 (broadly, a "trap placement member") such as a wire frame or other suitable frame construction is secured within the rodent management station 100, such as by being mounted to the rear wall 116 in the same manner as the bait supports 158 used to the support the bait in FIGS. 13-17. This facilitates reconfiguration of the rodent management station 100 to incorporate the snap trap 170. The horizontal frame 172 has a plurality of connecting members in spaced relationship with each other and configured for releasable disposition within the slots 132 in the rear wall 116 to releasably connect the horizontal frame to the base. Moreover, the connecting members and the slots 132 are configured for sliding movement of the connecting members within the slots.

The illustrated horizontal frame 172 generally forms a loop having a central opening that coincides with the perimeter of a base 174 of the snap trap 170 for receiving the snap trap within the frame in closely spaced relationship whereby the frame retains the snap trap against sliding or other movement of the trap within the rodent management station 100. In other embodiments the snap trap 170 may be affixed or releasably secured to the frame 172 by suitable fasteners or adhesives. In still other embodiments, the base 174 of the snap trap may have a recess formed into its perimeter. The frame 172 in such an embodiment may then rest in the recess to retain the snap trap in position within the rodent management station.

Figure 22:
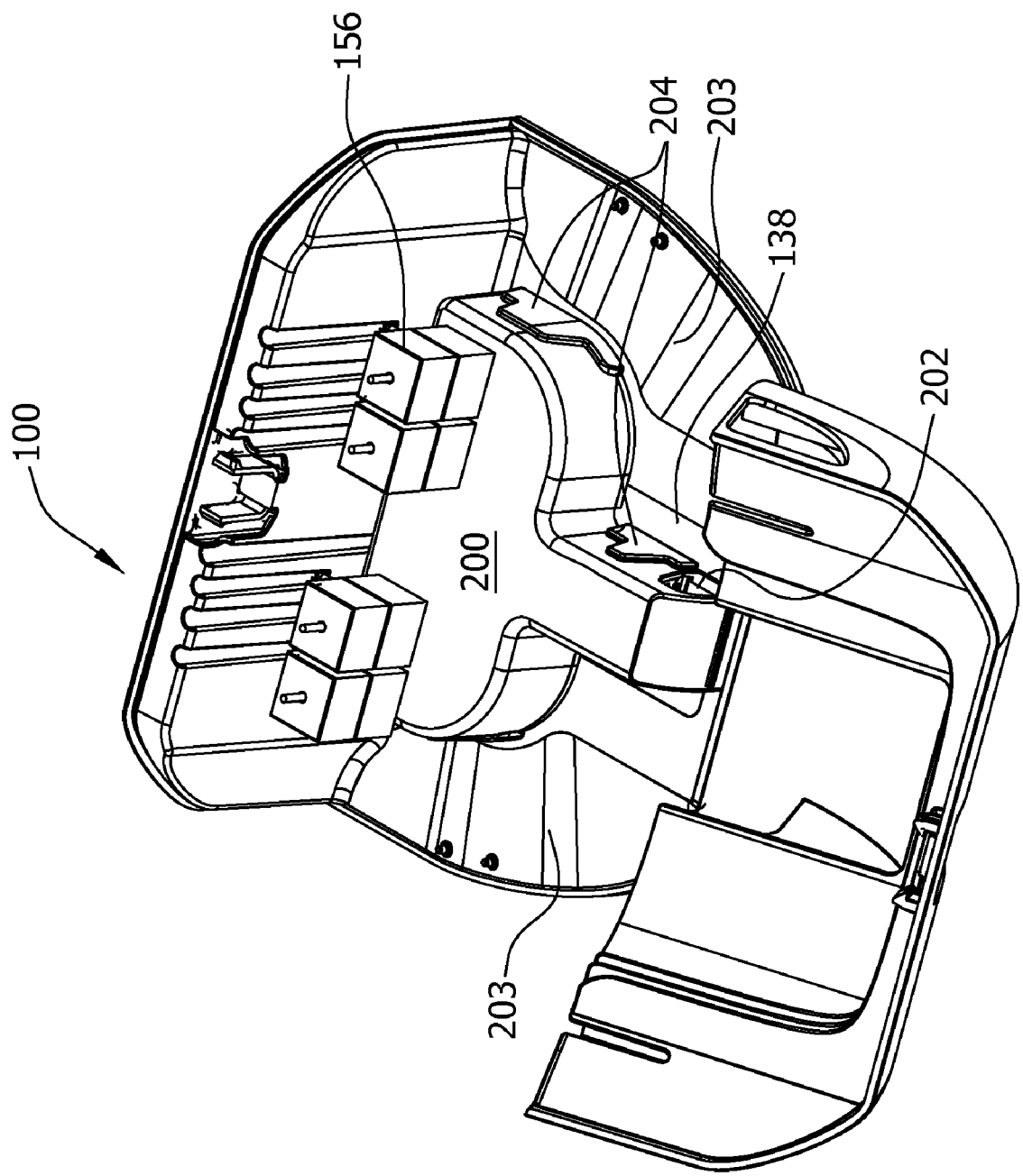
FIG. 22 is a perspective view of the rodent management station of FIG. 1 in an open configuration and with a live trap and bait positioned therein.
Figure 23:
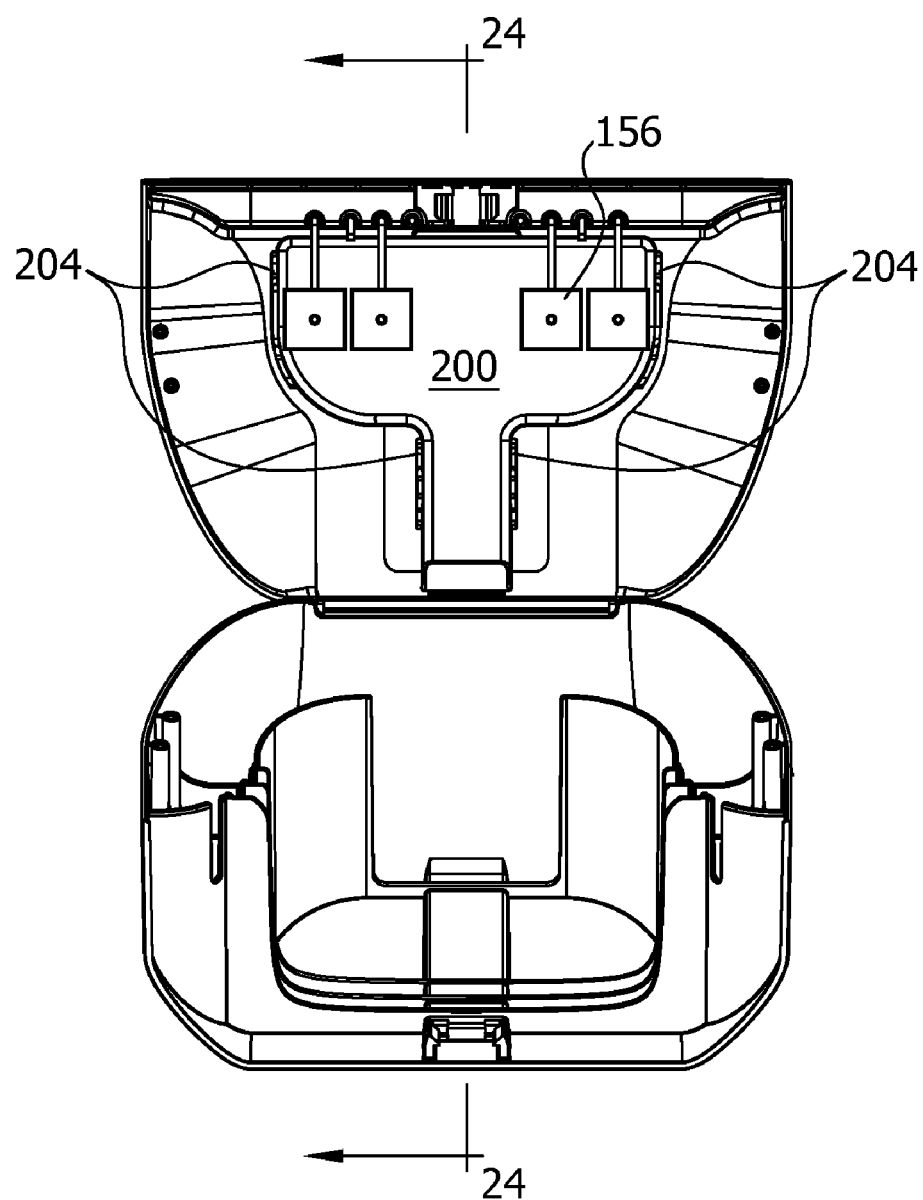
FIG. 23 is a top plan view of the rodent management station arrangement of FIG. 22.
Figure 24:
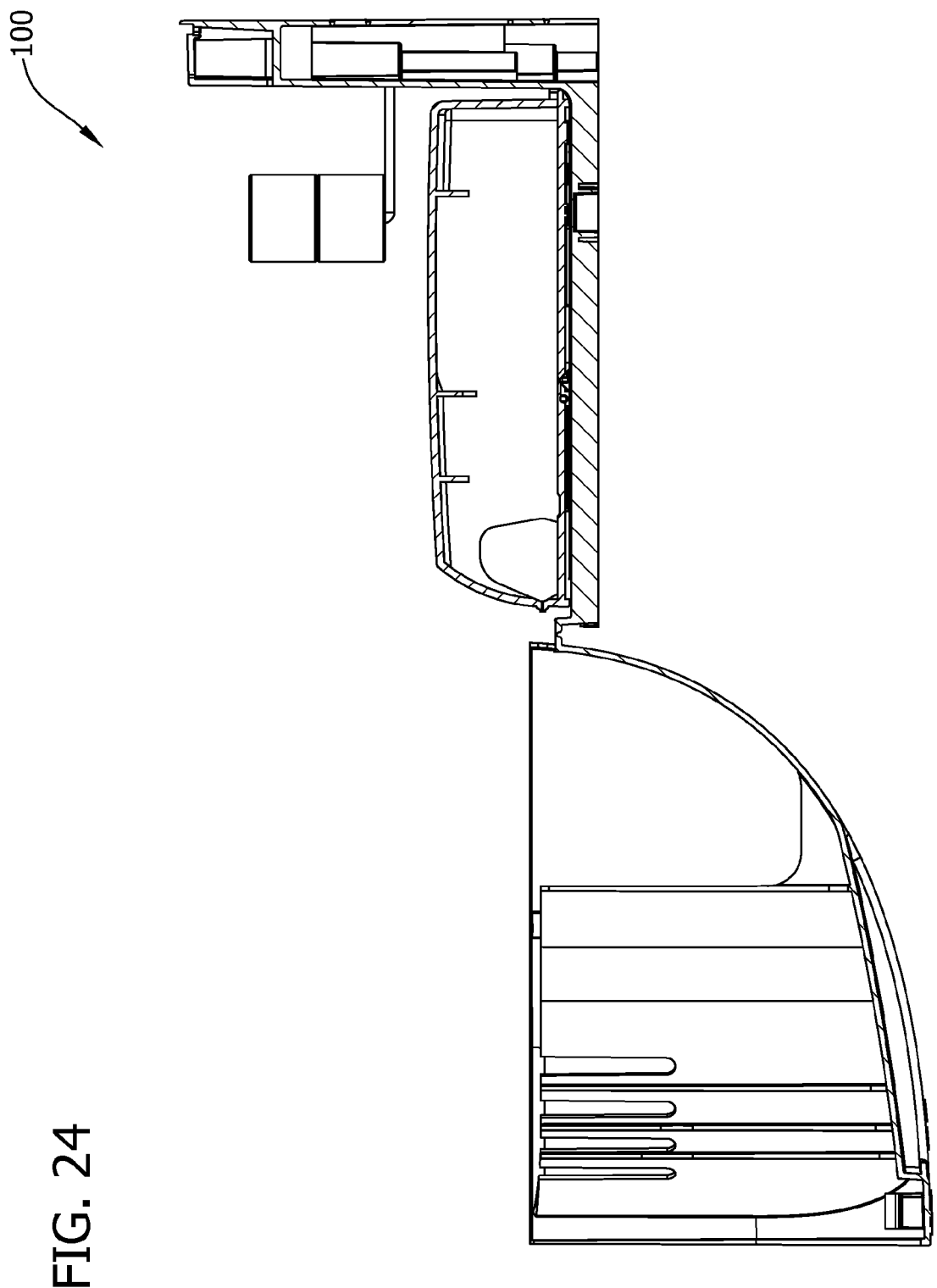
FIG. 24 is a cross-section taken in the plane of line 24-24 of FIG. 23.

The modular configurability of the rodent management station 100 further allows what is commonly referred to as a "live trap" to be placed in the rodent management station instead of (e.g., interchangeably with, although it is contemplated that it may be in addition to) the snap trap 170 of FIG. 20. Live traps are traps designed to trap a rodent, typically a mouse, within an enclosure without having to poison or immediately kill the rodent. One suitable embodiment of a live trap configured for use within the rodent management station 100 is illustrated in FIGS. 22-24 and generally indicated at 200. It is understood, however, that other live trap configurations may be used within the rodent management station and remain within the scope of this invention. Moreover, the live trap 200 is removable from the station 100 when the station is in the opened configuration to permit servicing/cleaning of the station.

The illustrated live trap 200 (as best seen in FIG. 22) has an enlarged chamber portion 201 configured to seat within the bait chamber 138 of the rodent management station 100, and a narrowed entry portion (broadly, an "inlet" or "inlet portion") 203 extending from the chamber portion. While not visible in the drawings, the entry portion 203 may also extend partially into the interior of the chamber portion such that rodents exit the entry portion into the chamber portion more centrally within the interior of the chamber portion 201 of the live trap 200. The live trap 200 suitably has a front generally adjacent or including the entry portion 203 and a rear opposite the front. Thus, with the live trap 200 disposed within the housing of the rodent management station 100, the entry portion 203 of the live trap 100 may extend at least up to and in some embodiments through the bait chamber 138 entryway out into the passageway 109 along which rodents are guided within the rodent management station. At least one and more suitably a pair of entry openings 202 are formed in the entry portion 203 of the live trap 200 to permit entry of rodents such as mice into the trap at a location that is separate (e.g., distally spaced from) the entry openings 106 of the station 100. The entry openings 202 are in a generally opposes, spaced relationship with each other. These entry openings 202 are also out of directional alignment with each of the entry openings 102 of the station 100. Moreover, the pair of entry openings 202 may be positioned such that one entry opening is open to the first pathway 103 section of the passageway 109 (described above) while the other entry opening is open to the second pathway section of the passageway.

In one embodiment, the live trap 200 is located and held in place within the rodent management station by stabilizing members 204 disposed on and more suitably formed integrally with the exterior of the live trap 200 generally along the sides of the chamber portion 201. These stabilizing members 204 abut against the interior panels 112 depending from the lid 106 when the lid is closed to provide stability and support to the live trap 200 against movement within the housing. The contact between the stabilizing members 204 and the interior panels 112 also increases the structural rigidity of the lid 106 and in particular of the interior panels.

Figure 25:
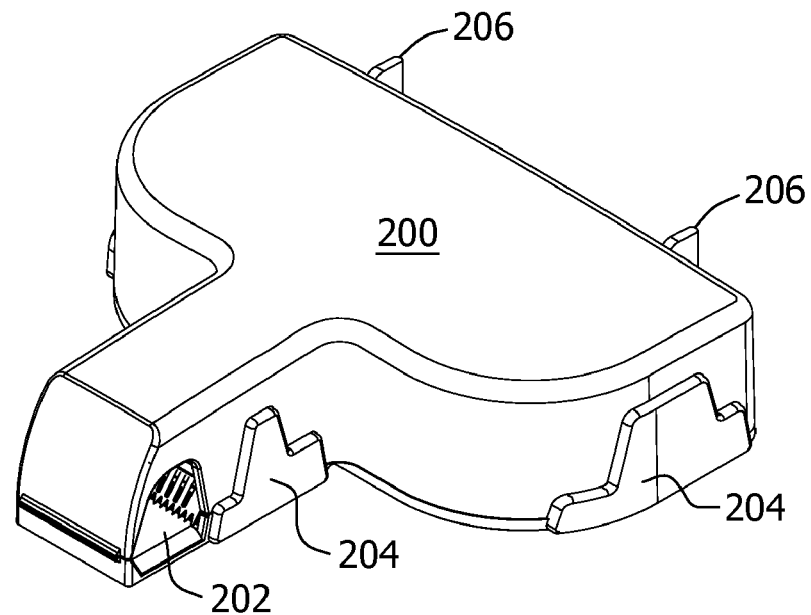
FIG. 25 is a perspective view of the live trap of the rodent management station arrangement of FIG. 23.
Figure 26:
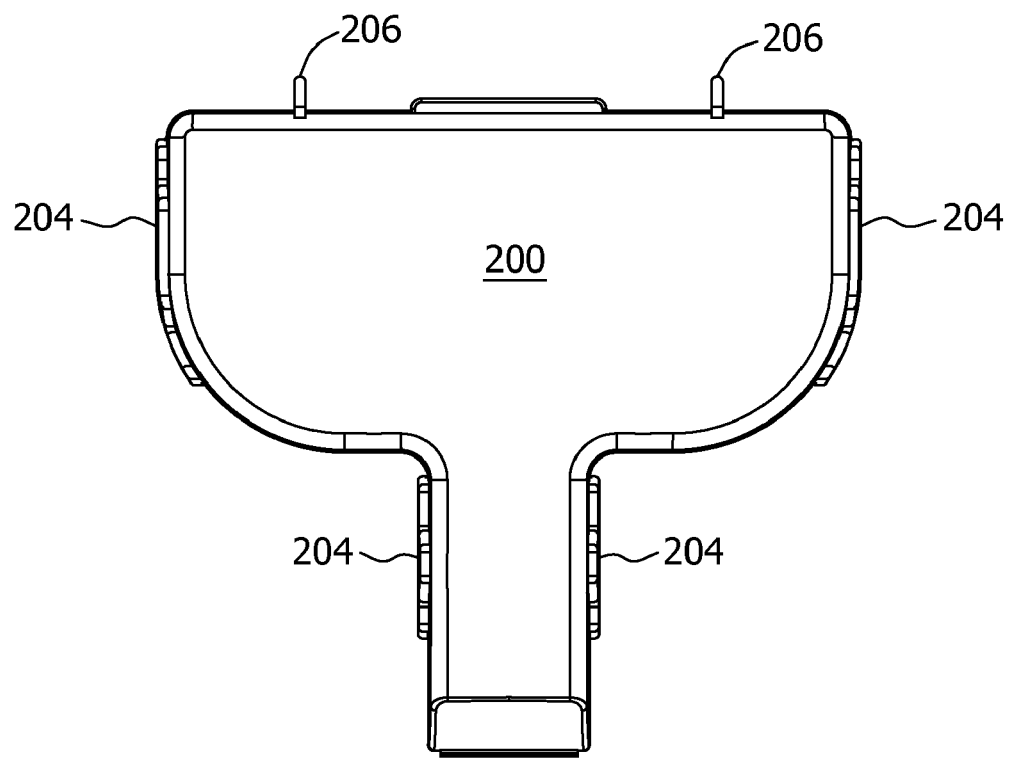
FIG. 26 is a top plan view thereof.

Additionally, or alternatively, the live trap 200 may include guide ribs 206 (FIGS. 25 and 26) (broadly, "connecting tabs) attached to the rearward facing side of the trap. These guide ribs 206 are configured to slide into respective ones of the slots 132 via the open upper ends of the slots in the rear wall 116 of the base 104 for releasably connecting the live trap with the base of the station 100 housing and for accurately positioning the live trap within the bait chamber 138 of the rodent management station. The guide ribs 206 and slots 132 of the rear wall 116 thus each broadly define a connecting member used to connect the live trap with the base of the station 100 housing. It is thus understood that in alternative embodiments suitable slots may be provided on the live trap 200 while guide ribs 206 (i.e., connecting tabs) are disposed on the rear wall 116 of the base 104 to connect the live trap with the base.

A variety of suitable interchangeable internal trap mechanisms may be used within the live trap 200, and in particular in the entry portion 203 of the trap, to trap rodents within the chamber portion 201 of the trap. The variety of trap mechanisms may be interchanged and selectively removed and placed within the live trap 200.

Figure 27:
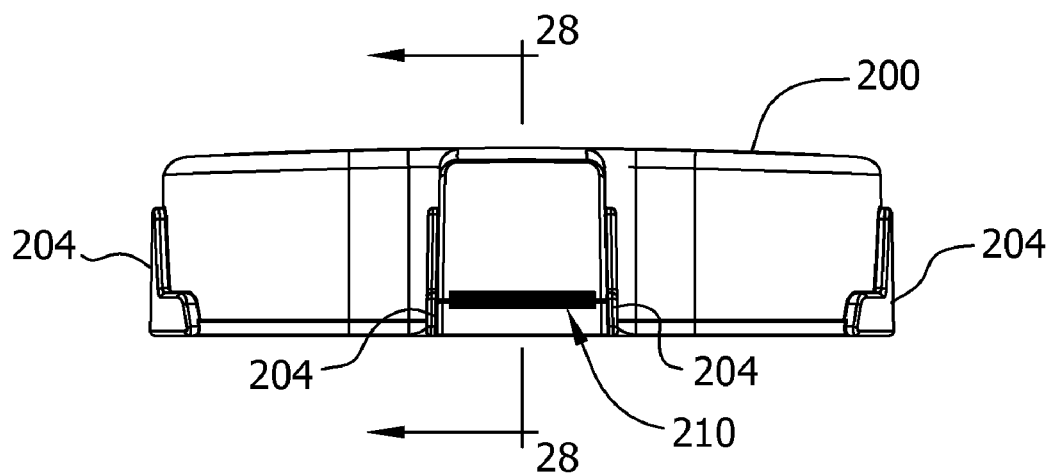
FIG. 27 is a front elevation thereof.
Figure 28:
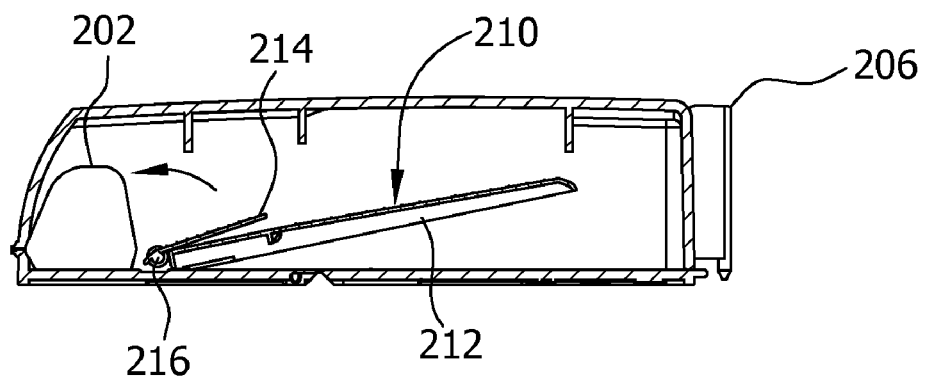
FIG. 28 is a cross-section taken in the plane of line 28-28 of FIG. 27 and illustrating a ramp gate trap mechanism.

For example, in one embodiment the internal trap mechanism may comprise a ramp mechanism 210 as illustrated in FIGS. 27 and 28. The ramp mechanism 210 comprises a ramp 212 extending longitudinally within the entry portion 203 of the live trap 200 and having an entry end nearest the entry openings 202 of the trap and an exit end nearest the chamber portion 201 of the trap. The ramp is mounted on the floor of the live trap for pivoting movement. A trap door 214 is pivotally connected to the ramp 212 generally adjacent the entry end of the ramp by a suitable pivot pin 216. A spring, weight or other device is used to bias the ramp in a position in which the ramp slants upward as illustrated in FIG. 28 with the entry end of the ramp down near the floor of the live trap 200. In this position, the trap door lays generally flat against the ramp to permit a rodent that enters the trap to proceed up the ramp over the trap door.

As the rodent proceeds past the trap door 214, the weight of the rodent causes the ramp 212 to pivot downward (i.e., to pivot the exit end downward). This pivoting of the ramp 212 causes the entry end of the ramp to rise, pushing the trap door 214 to pivot about the pin 216 to an upright position (not shown) within the entry portion of the trap thus preventing the rodent from turning around and exiting the trap. The rodent must therefore continue past the ramp 212 and into the chamber portion 201 of the live trap. Once the rodent is off of the ramp 212, the ramp returns to its initial position (FIG. 28) with the trap door 214 again lying generally flat against the ramp. In particularly suitable embodiments, adhesive such as in the form of a glue board, may be disposed on the floor of the chamber portion 201 of the live trap 200 to inhibit further movement of the rodent once it enters the chamber portion, or at least travels to a particular area within the chamber portion such as away from the entrance to the chamber portion.

Figure 29:
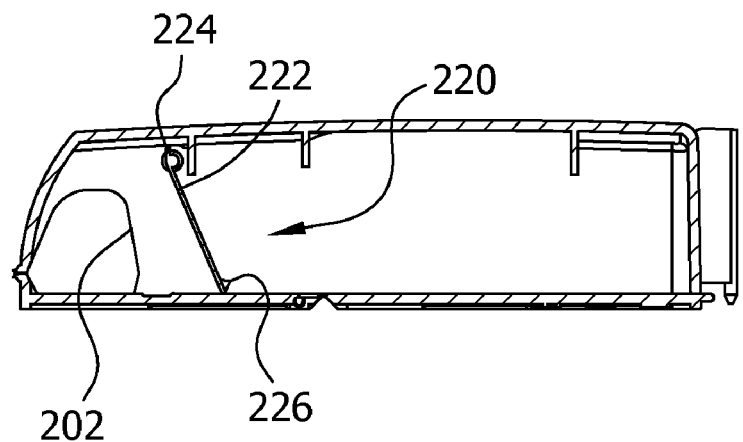
FIG. 29 is a cross-section similar to FIG. 28 with a swinging gate trap mechanism.
Figure 30:
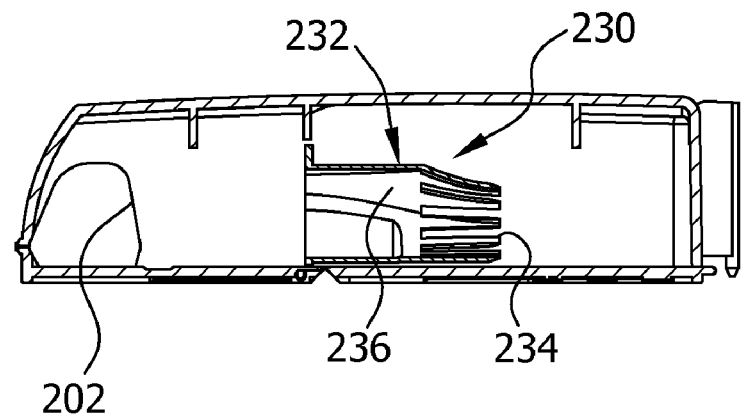
FIG. 30 is a cross-section similar to FIG. 28 but illustrating a funnel trap mechanism.
Figure 31:
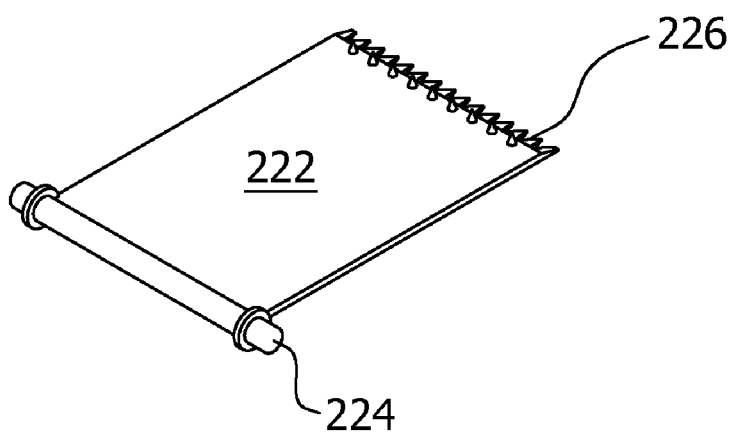
FIG. 31 is a perspective view of the swinging gate of FIG. 29.

FIGS. 29 and 31 illustrate an alternative trap mechanism, referred to herein as a swinging gate mechanism 220. The swinging gate mechanism 220 comprises a gate 222 that is pivotably attached by a pivot pin 224 to the roof of the live trap 200 and depending therefrom within the entry portion 203 of the trap, suitably near the entry openings 202 to the trap. The gate 222 is suitably sized in length longer than the interior height of the entry portion 203 of the trap 200 so that in its initial position it contacts the floor of the trap in a slightly angled orientation of the gate 222. In this manner, the gate 222 is capable of swinging only one way, i.e., inward toward the chamber portion of the trap. In the illustrated embodiment, the gate 222 also has teeth 226 positioned along its free edge. In some embodiments, the gate 222 may have slots disposed therein, thus enabling light to pass through the gate mechanism 220.

As the rodent enters the live trap 200 with the swinging gate mechanism 220 they come into contact with the gate 222 and cause it to rotate upward about the pivot pin 224. If the rodent attempts to retreat from the trap 200 while passing beneath the gate 222, the teeth 226 at the free end of the gate bite into the rodent to discourage such rearward movement. After the rodent has cleared the gate 222, the door pivots back to its initial state, thus blocking any retreat by the rodent. While teeth 226 are depicted in FIGS. 29 and 31 as being positioned along the free edge of the gate 222, they may be positioned along any portion of the swing door.

In other embodiments an additional swing door positioned in front of the gate 222 may be provided. In such an embodiment, the additional swing door does not have teeth and is sized to permit the swinging of the door in both directions within the swinging gate mechanism 220. The rodent is thus able to exit through this additional door before coming into contact with the gate 222. The rodent is encouraged by this additional door that it is capable of retreat from the trap and to thus continue through the next door, which is the gate 222.

The additional swing door and gate 222 generally function in the same manner. Like the gate 222, the additional swing door may have slots positioned in any portion therein.

Figure 32:
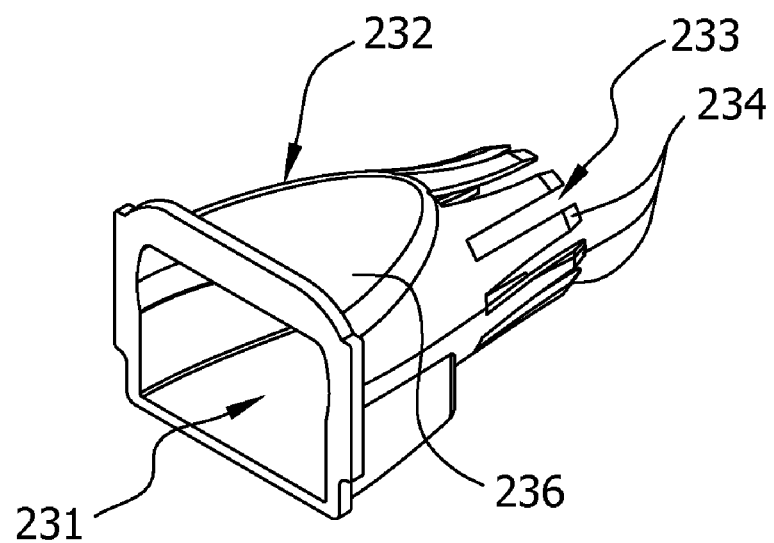
FIG. 32 is a perspective view of the funnel of FIG. 30.

With reference to FIGS. 31 and 32, another live trap mechanism is referred to herein as a funnel trap mechanism 230 comprising a funnel 232 that sits within the entry portion 203 of the live trap 200 and has a first or entry end 231 nearest the entry openings 202 of the trap and an exit end 233 nearest the chamber portion of the trap. The funnel 232 more suitably comprises a rigid segment 236 extending longitudinally downstream from the entry end 231 of the funnel and a flexible segment comprising a plurality of fingers 234 attached to and extending longitudinally downstream from the rigid segment of the funnel to the exit end 233 thereof. The rigid segment 236 of the illustrated funnel 232 is generally cylindrical or rectangular in shape with a constant cross-sectional area along its length. Although it is understood that the rigid segment 236 may be shaped other than cylindrical or rectangular, and may be of non-uniform cross-section, without departing from the scope of this invention.

The fingers 234 are configured to angle inward (relative to the centerline of the funnel) toward each other such that the exit end 233 of the funnel 232 is substantially narrower than the entry end 231 of the funnel. The fingers 234 are suitably flexible and resilient to permit outward bending of the fingers against the bias thereof as the rodent passes through the flexible segment of the funnel to the exit end 233 of the funnel. As a rodent moves through the exit end 233 of the funnel, the bias of the fingers 234 causes the tips of the fingers to remain in contact with the body of the rodent. If the rodent tries to reverse course, the tips of the fingers 234 dig into or otherwise apply pressure to the rodent, thereby encouraging the rodent to continue moving forward to the chamber portion of the trap. Once the rodent exits the funnel 232, the fingers 234 return to their initial position, thus rendering the exit end 233 of the funnel too narrow for the rodent's head to fit through and the rodent is thus discouraged against attempts to move back through the funnel.

As illustrated in the embodiment of FIG. 22, bait such as the bait blocks 156 may be disposed within the bait chamber along with the live trap 200, such as above the chamber portion 201 of the live trap. The bait blocks 156 serve to lure the rodent into the rodent management station and toward the live trap and/or bait chamber 138. In such an embodiment, the live trap 200 may be sized, particularly at the entry openings 202 of the trap, to allow only smaller rodents such as mice to enter the live trap. Larger rodents such as rats will climb over the top of the live trap 200 into the bait chamber 138 and feed on the bait which may be sufficiently toxic to kill the rat. Additionally, non-toxic baits (e.g., monitoring baits) may be used in the rodent management station 100. Monitoring bait is a non-toxic substance that indicates the presence of rodents by virtue of it being consumed by rodents over a period of time.

FIGS. 38-78 illustrate another embodiment of a rodent management station 1100. The rodent management station 1100 is similar to the rodent management station 100, including in general a base 1104 and lid 1106 (together, broadly defining a housing of the rodent management station and an interior space of the housing), transversely opposite entry openings 1102, and interior panels 1112 (broadly, partition structure) that partition the interior space of the housing into a generally central bait chamber 1138 and a passageway 1109 including a pair of pathways 1103 each leading from a respective one of the entry openings 1102 to an entryway of the bait chamber. In the closed configuration of the lid 1106, the lid and base 1104 are releasably held together by a suitable locking mechanism 1142, similar to locking mechanism 142 described above, to inhibit unauthorized or unintended opening of the rodent management station 1100.

The rear wall 1116 (broadly, an upstanding wall) of the base 1104 includes an inner surface having elongate, vertically extending slots 1132 formed therein. The slots 1132 are spaced laterally apart from each other along the inner surface of the rear wall, and may be of uniform length but are more suitably of varying lengths with some of the slots 1132 being longer than others. Each of the slots 1132 is open at the top of the rear wall and extends down to a location generally intermediate the top and bottom of the rear wall (for the shorter slots) or to adjacent the bottom of the rear wall (e.g., just above the inner surface of the bottom panel, for the longer slots). Moreover, the slots 1132 may have varying diameters along their respective lengths, such that the diameter of the slot decreases or tapers as it extends downward toward the bottom panel 1114 of the base 1104. As described in further detail later herein, the slots 1132 are configured to retain one or more bait supports therein for supporting bait within the interior space of the station 1100 housing.

Figure 38:
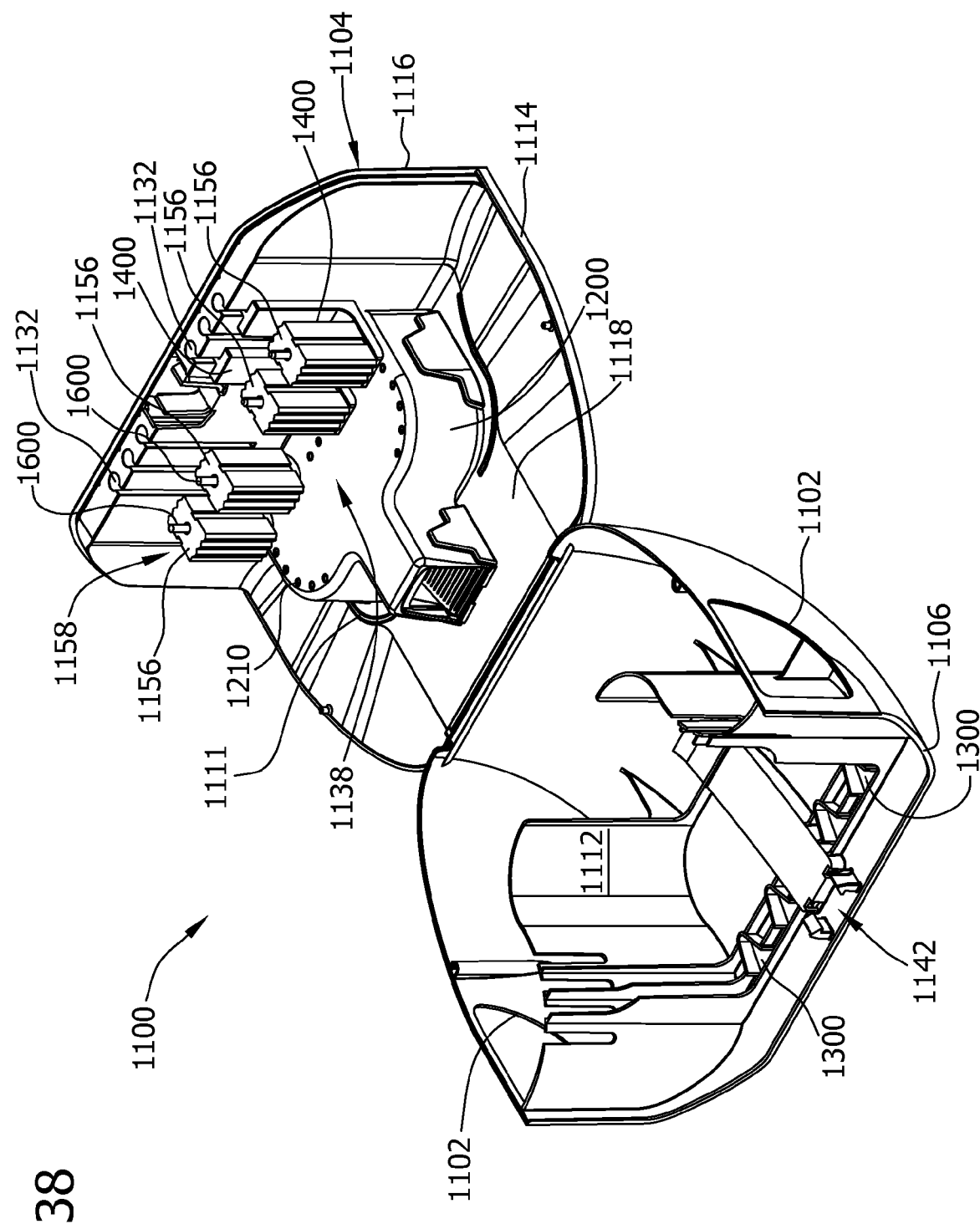
FIG. 38 is a perspective view of another embodiment of a rodent management station in an open configuration.

As best seen in FIG. 38, the lid 1106 of the rodent management station of this embodiment further comprises depending guard structure 1300 configured and located on the lid such that in the closed configuration of the station 1100 the guard structure substantially encloses or otherwise guards the open upper ends of the slots 1132, and the bait supports disposed therein, to inhibit rodents against manipulating the bait supports (e.g., bending or pulling) and removing the bait therefrom. The illustrated guard structure 1300 comprises a plurality of generally V-shaped ribs formed integrally with and depending from the lid 1106 and transversely spaced relationship with each other. For example, in one particularly suitable embodiment the number of V-shaped ribs 1300 corresponds to the number of bait supports (e.g., four in the illustrated embodiment of FIG. 38) used in the rodent management station 1100. It is understood, however, that the guard structure 1300 may be of any suitable configuration without departing from the scope of this invention.

Figure 39:
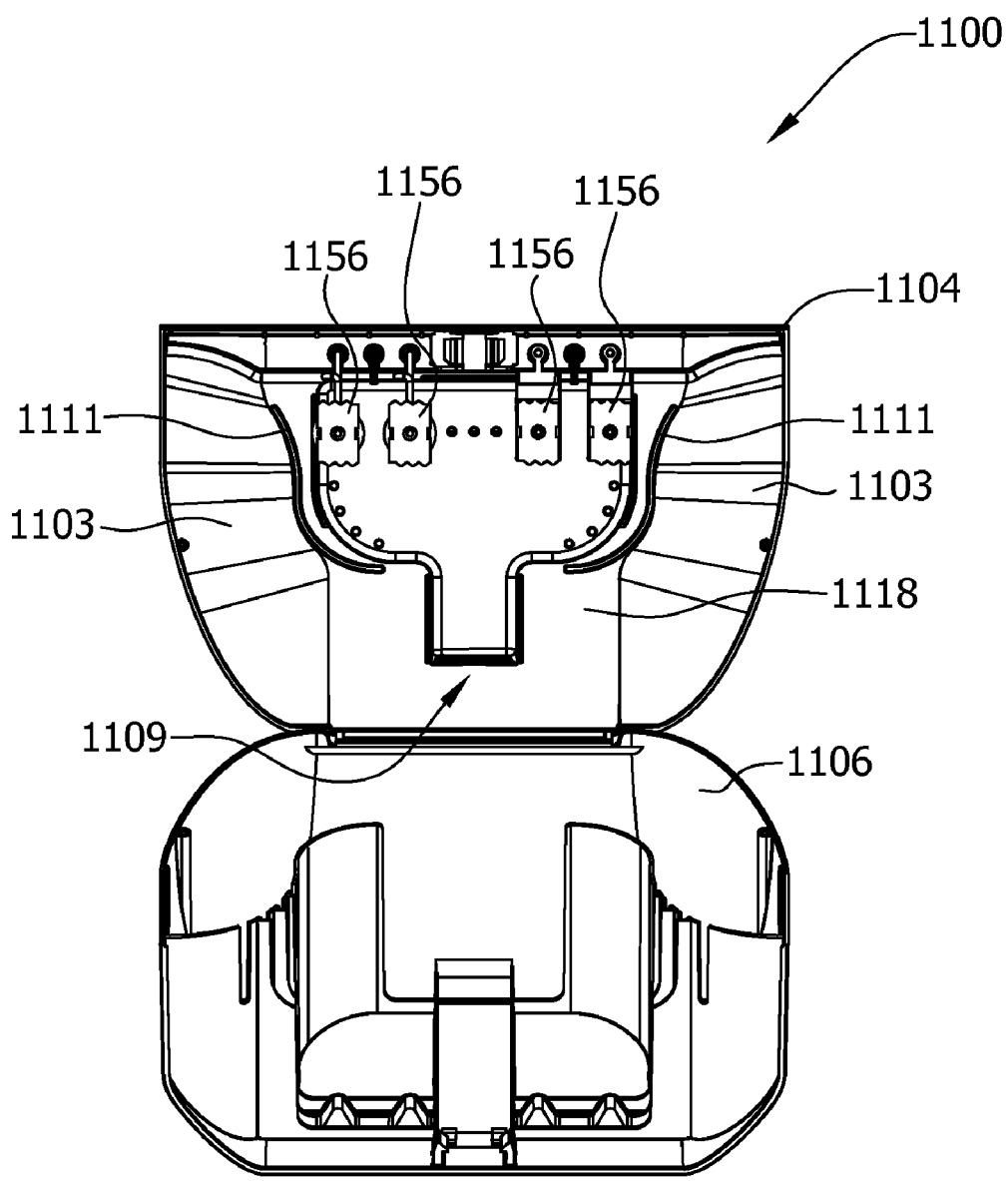
FIG. 39 is a top plan view thereof.
Figure 40:
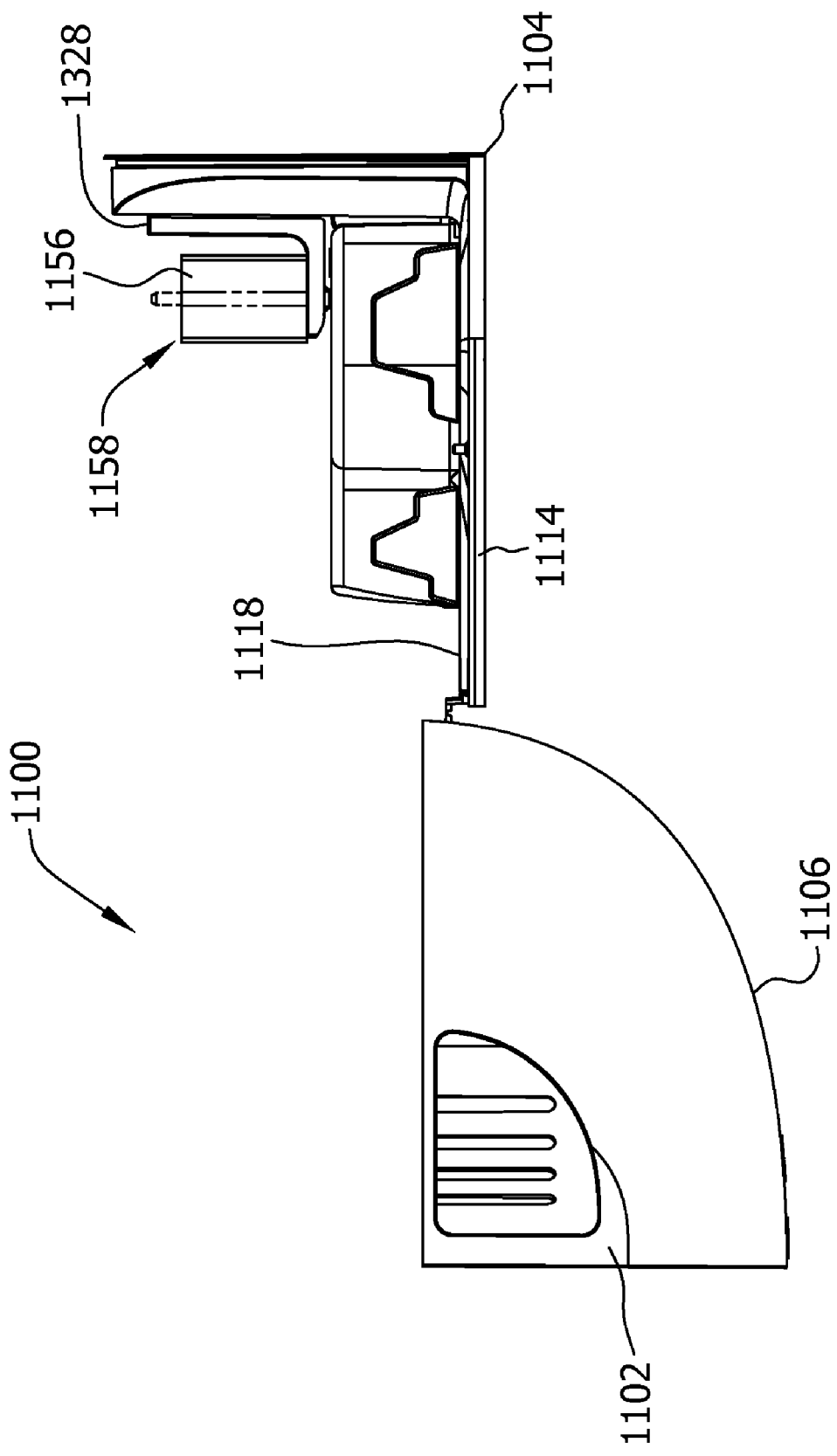
FIG. 40 is a right side elevation view thereof.

While not visible in the drawings, in some embodiments at least a portion of the inner surface 1118 of the bottom panel 1114 of the station 1100 housing (i.e., the floor of the housing) may be textured in the same manner as the inner surface 118 of the bottom panel 114 of the station 100 housing of the first embodiment. As illustrated in FIGS. 38 and 39, one or more demarcations 1111 may be provided on the inner surface 1118 of the bottom panel 1114 to indicate where the interior panels 1112 are located in the closed configuration of the station 1100. The demarcations 1111 facilitate proper alignment of the bait and traps within the bait chamber 1138 of the station 1100 housing to avoid interference with lid 1106 and in particular the interior panels 1112 upon closing the lid. The demarcations 1111 may be in any suitable form such as, without limitation, indicia, different coloring from the inner surface 1118 of the bottom panel 1114, labels, different texturing from the texture of the inner surface of the bottom panel, a raised member, a groove, or other suitable demarcation.

The bait system and in particular the bait supports 1158 of the rodent management station 1100 of this embodiment are also different from the bait supports 158 of the previous station 100. Suitable bait support configurations for this second embodiment are illustrated in FIGS. 38-55, and in particular with respect to such supports for retaining bait blocks 1156 or other bait in generally vertical (e.g., stacked) configurations. It is understood, however, that the bait supports of this embodiment may also be configured to retain bait blocks 1156 or other bait in a general horizontal alignment as in the previous embodiment without departing from the scope of this invention.

Figure 41:
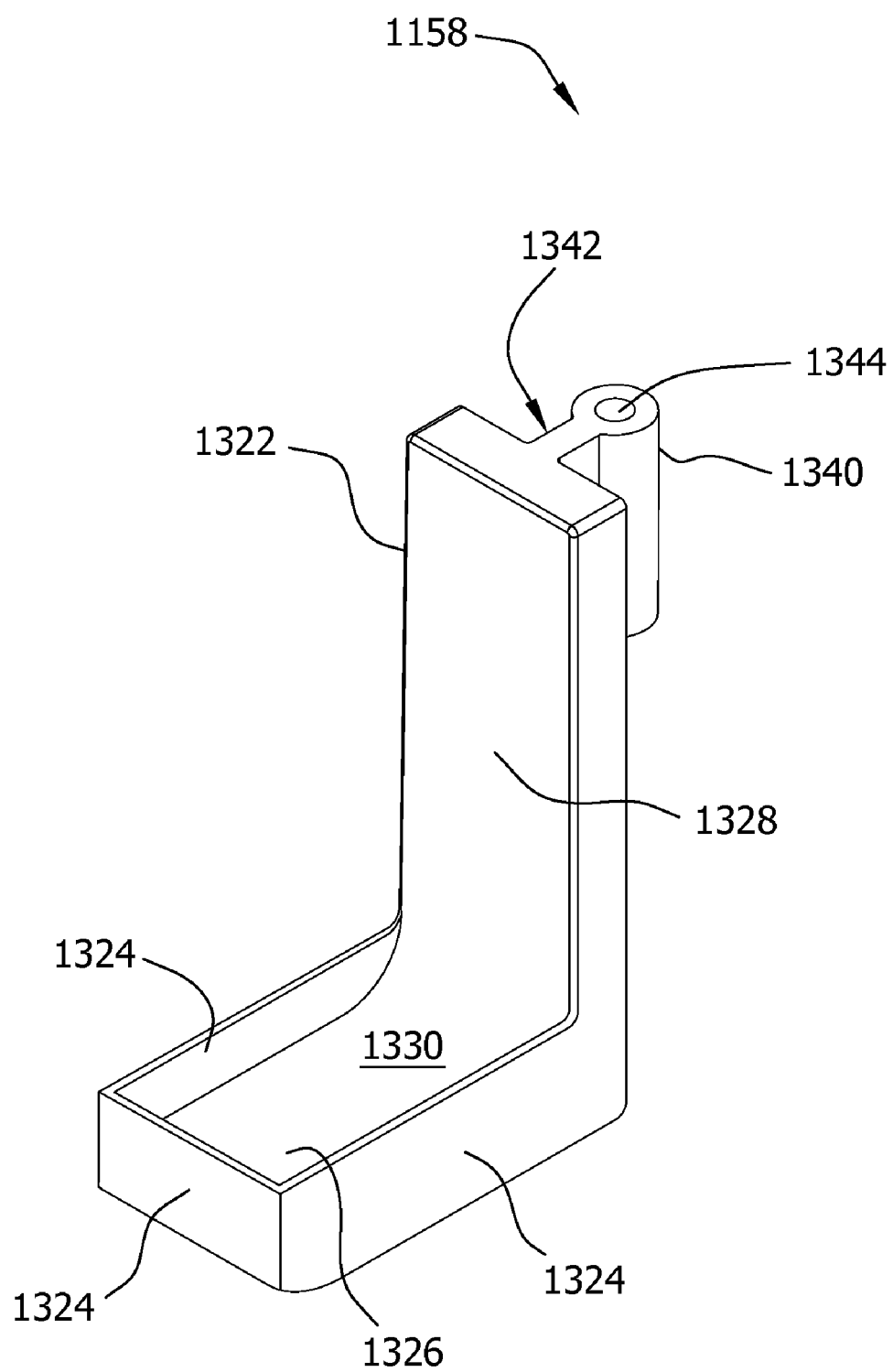
FIG. 41 is a perspective view of a bait support device for use in the rodent management station of FIG. 38.

As one example, with particular reference to FIG. 41, one suitable bait support 1158 is illustrated in the form of a bait tray 1322 having upstanding walls 1324 that extend upwardly from a horizontal bottom 1326 of the bait tray 1322 to form a trough 1330. A vertical wall 1328 is coupled to and extends upward from the bottom 1326. A liquid attractant, bait, or poisonous substance is placed within the trough 1330. In other embodiments, pelletized or other solid forms of attractant, bait, or poisonous substances may be disposed in the trough 1326. In use within the interior space of the station 1100 housing and more particularly within the bait chamber of the housing, the trough 1326 is open to the interior space of the housing so that rodents may feed from the trough.

Figure 38A:
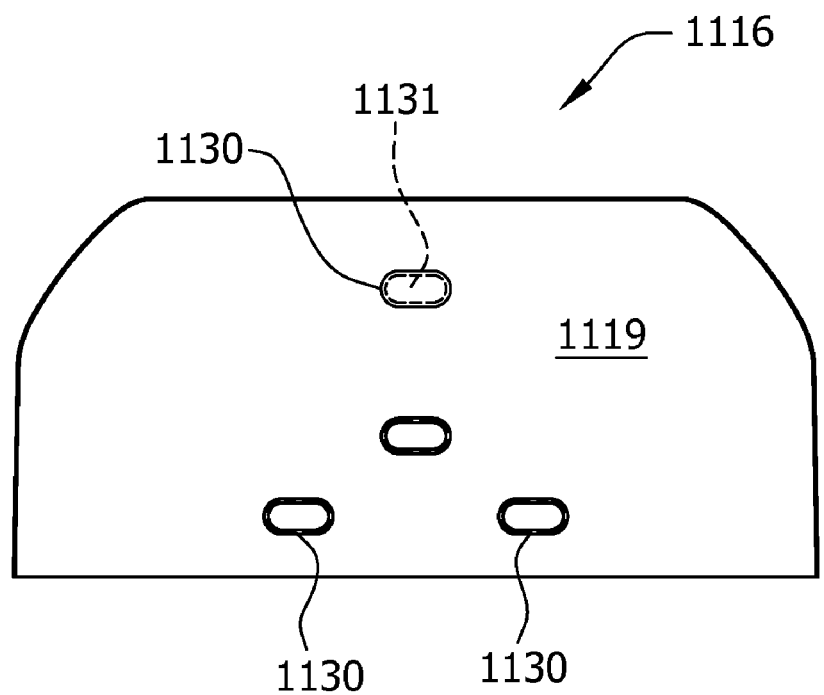
FIG. 38A is a rear elevation view thereof.

With reference now to FIG. 38A, the upstanding rear wall 1116 of the base 1104 and more suitably an outer panel 1119 of the rear wall in the multiple construction of the illustrated embodiment, may include at least one and more suitably two or more mounting ports 1130 separate from the rodent entry openings 1102. As illustrated in FIG. 38A, in one embodiment the outer panel 1119 has two pairs of mounting ports 1130 disposed therein in spaced relationship with each other. One pair of mounting ports 1130 are in vertical alignment with each other, while the other pair is in horizontal alignment. Providing at least a pair of mounting ports 1130 permits strap or cable-type fasteners to be used to secure the base 1104 to a mounting surface such as a post, slat or chain-link fence.

In one particularly suitable embodiment, a movable closure 1131 is removably connected to the outer panel 1119 of the rear wall 1116 at each respective mounting port 1130. For example, the movable closure 1131 is removable from the outer panel 1119 to expose a respective one of the mounting ports 1130. More suitably, the movable closure 1131 comprises a frangible closure such as a knock-out plate. It is understood, however, that the closures 1131 may be omitted such that the mounting ports 1130 are permanently open.

The bait support 1158 further comprises (still referring to FIG. 41) a mounting pin 1340 disposed on the backside of the vertical wall 1328 for releasably connecting the bait support with the rear wall 1116 of the base 1104. The mounting pin 1340 is suitably connected to the vertical wall 1328 by a connecting web 1342. More suitably the mounting pin 1340 and connecting web 1342 are formed integrally with the vertical wall 1328 of the bait support 1158. It is understood, however, that the mounting pin 1340 may be connected to the vertical wall 1328 by any suitable technique and remain within the scope of this invention. The illustrated mounting pin 1340 is suitably generally cylindrical in accordance with the cross-sectional shape of the slots 1132 in the rear wall 1116 of the base 1104. More suitably, the illustrated mounting pin 1340 is generally tubular, having a central bore 1344 extending therethrough for reasons which will become apparent.

In this second embodiment of a rodent management station 1100, the height of the bait above the floor of the housing as supported by the bait support 1158 is suitably adjustable. For example, in one embodiment illustrated in FIGS. 52-55, a riser 1500 (broadly, a height adjustment member) is used to support the bait support 1158 at an increased height within the interior space of the station 1100 housing. The illustrated riser couples the bait tray 1322 to the rear wall 1116 of the rodent management station 1100.

FIGS. 42-51 depict another embodiment of a suitable bait support 1400 for the rodent management station 1100 of this second embodiment. The bait support 1400 is configured for releasable connection with the rear wall 1116 of the station 1100 and for sliding movement within the slots 1132 in the rear wall 1116 of the base 1104. The bait support 1400 suitably includes a generally horizontal platform 1410 configured for a generally horizontal orientation extending outward relative to the rear wall 1116 into the interior space and more particularly the bait chamber of the station 1100 housing. A vertical wall 1420 extends up from the platform 1410 in the same manner as the vertical wall 1328 of the bait support 1158 of FIG. 41. The transition of the platform 1410 to the vertical wall 1420 is suitably rounded, or curved, to inhibit bait particles or other debris from accumulating on the bait support 1158 and to clean the bait support 1400.

The platform 1410 of the bait support 1400 has an opening 1430 disposed therein and sized to releasably retain a bait pin 1450 (or bait rod 1460 as discussed later herein) that extends up from the platform 1410 of the bait support. Both the bait pin 1450 and the bait rod 1460 are broadly referred to herein as "bait mounting pins." The illustrated bait pin 1450 is configured to position and locate bait blocks 1156 in a generally fixed arrangement with respect to the bait support device 1400. The bait pin 1450 has a diameter that is suitably configured so that bait blocks having an opening formed therein may be positioned on the bait pin such that the bait pin passes through the openings formed in the bait blocks 1156. The bait blocks are thus securely positioned and a rodent is unable to carry away a bait block from the rodent management station 1100.

Figure 43:
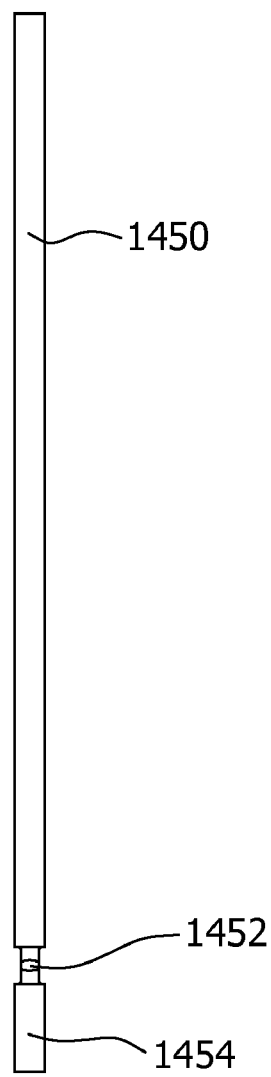
FIG. 43 is a right side elevation view of the bait pin of FIG. 42.
Figure 44:
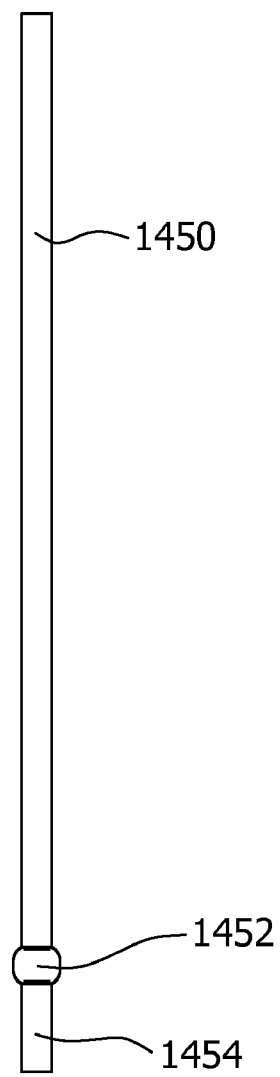
FIG. 44 is a front elevation thereof.

The bait pin 1450 (as best seen in FIGS. 43 and 44) has an expanded portion 1452 at or adjacent a lower segment 1454 of the bait pin to serve as a stop upon insertion of the bait pin in the platform opening 1430. Accordingly, the expanded portion 1452 of the bait pin 1450 suitably has at least one cross-sectional dimension that is greater than a diameter of the opening 1430. The lower segment 1454 of the bait pin 1450 is thus able to fit within the opening 1430, while the expanded portion 1452 inhibits the segment of the bait pin above the expanded portion 1452 from passing therethrough. In one particularly suitable embodiment, the lower segment 1454 of the bait pin 1450 is suitably sized and configured for a general friction or press fit of the lower segment with the platform 1410 within the opening 1430 to permit releasable connection of the bait pin with the bait support 1400. In other embodiments, the bait pin 1450 may be releasably connected with the bait support 1400 by adhesive, mechanical fastening or other suitable technique without departing from the scope of this invention. It is also contemplated that in alternative embodiments the bait pin 1450 may instead be permanently connected to the bait support 1400.

The bait support 1400 further comprises a mounting pin 1440 (FIG. 42) disposed on the backside of the vertical wall 1420 for releasably connecting the bait support with the rear wall 1116 of the base 1104. The mounting pin 1440 is suitably connected to the vertical wall 1420 by a connecting web 1442. More suitably the mounting pin 1440 and connecting web 1442 are formed integrally with the vertical wall 1420 of the bait support 1400. It is understood, however, that the mounting pin 1440 may be connected to the vertical wall 1420 by any suitable technique and remain within the scope of this invention. The illustrated mounting pin 1440 is suitably generally cylindrical in accordance with the cross-sectional shape of the slots 1132 in the rear wall 1116 of the base 1104 to permit the mounting pin to be inserted down through the open upper end and into a respective one of the slots 1132. In a more suitable embodiment, the mounting pin 1440 is generally tubular, having a central bore 1444.

Figure 49:
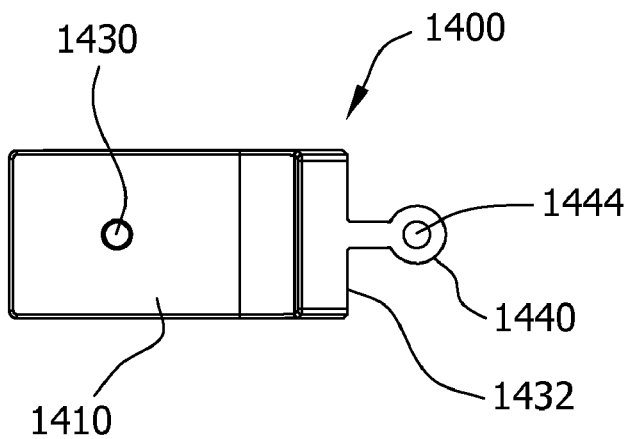
FIG. 49 is a top plan view thereof.
Figure 50:
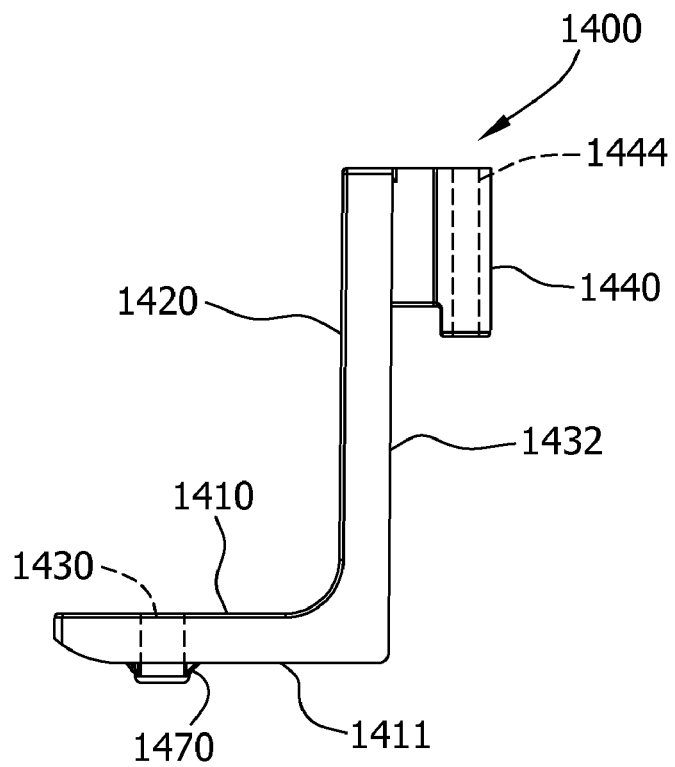
FIG. 50 is a right side elevation view thereof.
Figure 51:
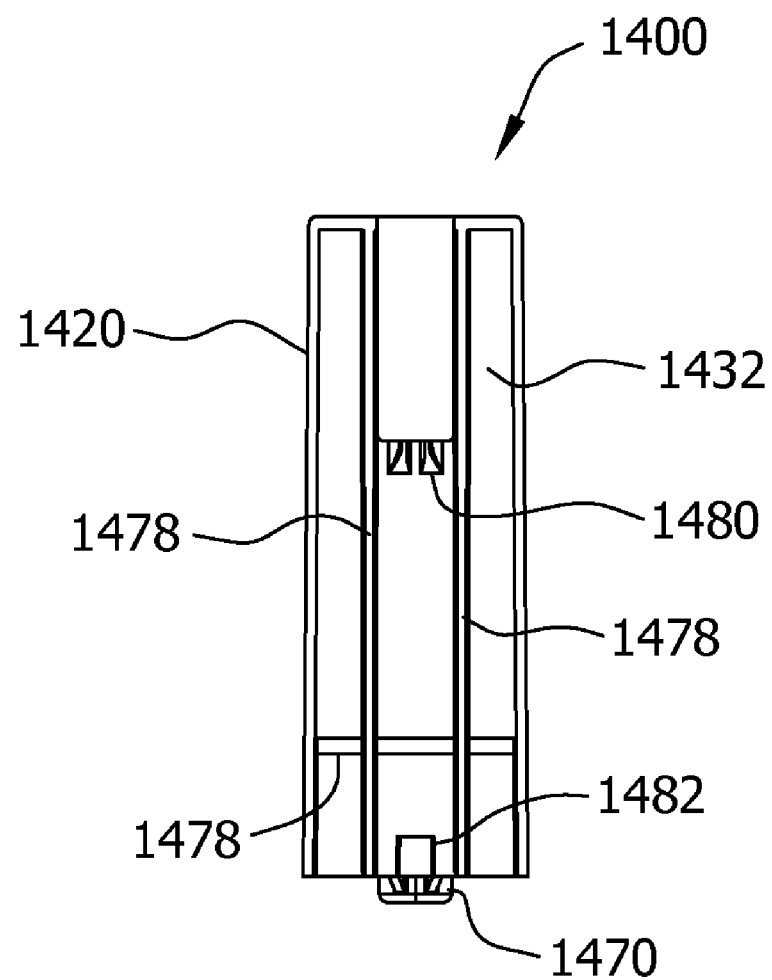
FIG. 51 is a rear elevation view thereof.
Figure 52:
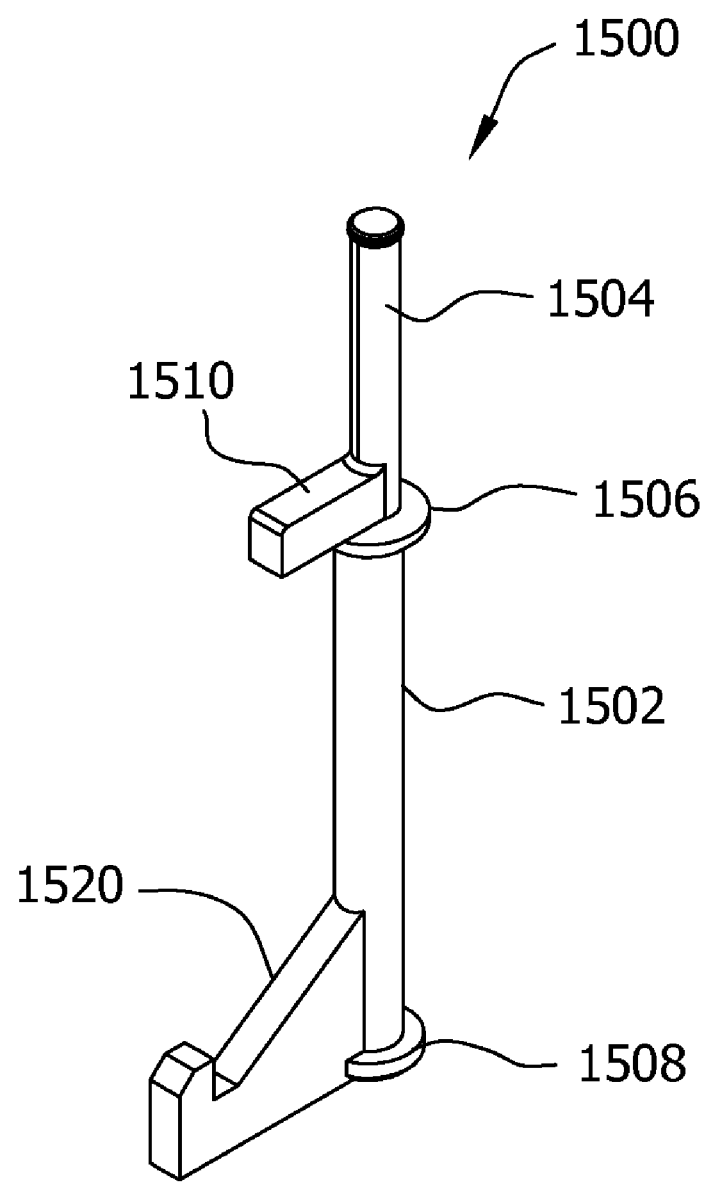
FIG. 52 is a perspective view of a spacer for use with the rodent management station of FIG. 38.
Figure 53:
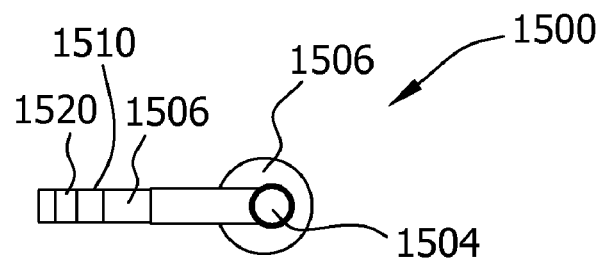
FIG. 53 is a top plan view thereof.
Figure 54:
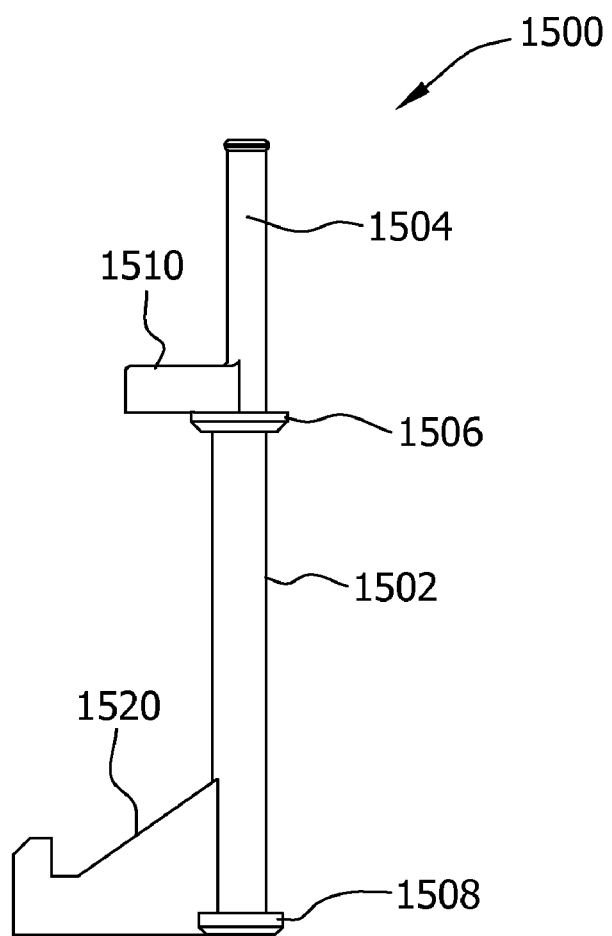
FIG. 54 is a right side elevation view thereof.
Figure 55:
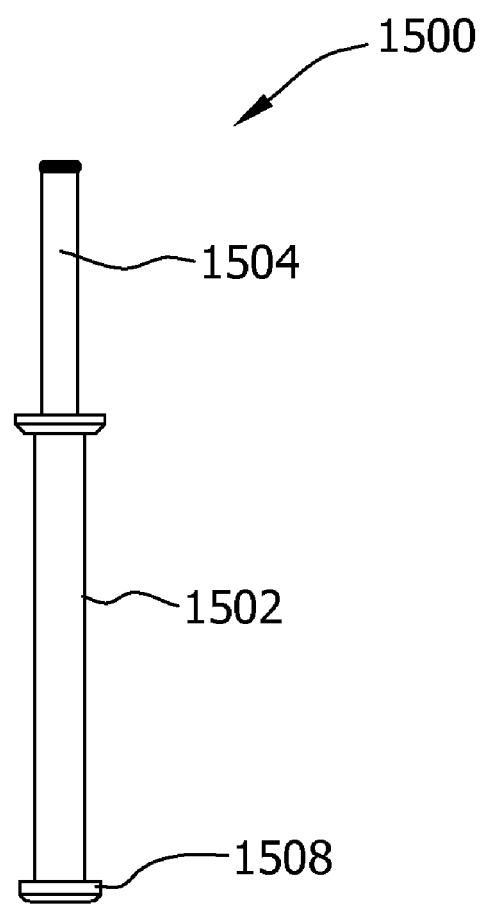
FIG. 55 is a front elevation thereof.

With reference to FIGS. 49-51, an annular protrusion 1470 depends from the underside of the platform 1410 in coaxial alignment with the opening 1430 and having an inner cross-sectional dimension that is substantially the same as that of the opening. While the annular protrusion 1470 has a circular outer cross-section, other embodiments may have differently shaped outer cross-sections (e.g., square, oblong, or rectangular). Moreover, the inner cross-sectional dimension of the circular protrusion 1470 may be either larger or smaller than that of the opening 1430. The annular protrusion 1470 functions at least in part to further support the lower segment 1454 of the bait pin 1450 and the lower segment 1466 of the bait rod 1460.

As illustrated in FIG. 51, the vertical wall 1420 of the bait support 1400 has ribs 1478 formed on a back surface 1432 thereof. The platform 1410 has similar ribs (not shown) formed on a respective under-surface 1411. The ribs 1478 and the ribs on the under-surface 1411 increase the structural rigidity of the bait support device 1400. The bait support 1400 also has an upper notch 1480 and a lower notch 1482 formed therein, as illustrated in FIG. 51 for purposes which will become apparent. In the illustrated embodiment, the notches 1480 and 1482 are formed at least in part by recesses formed into the respective back surface 1432 and under-surface 1411. The notches 1480 and 1482 may also at least in part be defined by the ribs 1478 formed in the back surface 1432 and/or the under-surface 1411. Although not illustrated in FIG. 41, the bait tray 1322 comprises similar notches 1480 and 1482.

With reference to FIGS. 52-55, the height of the bait above the floor of the housing as supported by the bait support 1400 is selectively adjustable. For example, in one embodiment, a riser 1500 (broadly, a height adjustment member) is used to support the bait support 1400 at an increased height above the inner surface of the bottom panel within the interior space of the station 1100 housing. The illustrated riser 1500 is suitably configured for disposition, at least in part, within one of the slots 1132 and beneath the mounting pin 1440 of the bait support 1400 to support the mounting pin higher up within the slot (and hence the bait support within the interior space of the station 1100 housing) than if the riser is omitted. More particularly, the riser 1500 of FIGS. 52-55 comprises an elongate post including a lower segment 1502 having a first diameter and an upper segment 1504 having a second diameter that is less than the first diameter (e.g., of the lower segment). In particular, the second diameter of the upper segment 1504 is sized for insertion in the opening 1444 of the mounting pin 1440 of the bait support 1400 (or, e.g., the opening 1344 in the bait tray 1322) to couple the bait support with the riser. It is understood, however, that the upper segment of the riser post may be omitted without departing from the scope of this invention.

The lower segment 1502 of the riser 1500 post has an upper annular flange 1506 separating the upper segment 1504 from the lower segment, and a lower annular flange 1508 longitudinally spaced-apart from the upper annular flange 1506 and generally at or adjacent the lower end of the riser post. The annular flanges 1506, 1508 are sized in cross-section in accordance with the cross-sectional dimensions of the slots 1132 in the rear wall 1116 of the base 1104 positively seat and retain the riser 1500 within the slot with little translational movement of the riser therein. In a particularly suitable embodiment, the cross-sectional dimension (e.g., the diameter in the illustrated embodiment) of the lower annular flange 1508 is sized to correspond to the cross-sectional dimension of the slot 1132 at a particular depth along the length of the slot (e.g., where the slot dimensions decrease toward the lower end of the slot), thus setting the riser at a predetermined height within the slot.

Figure 47:
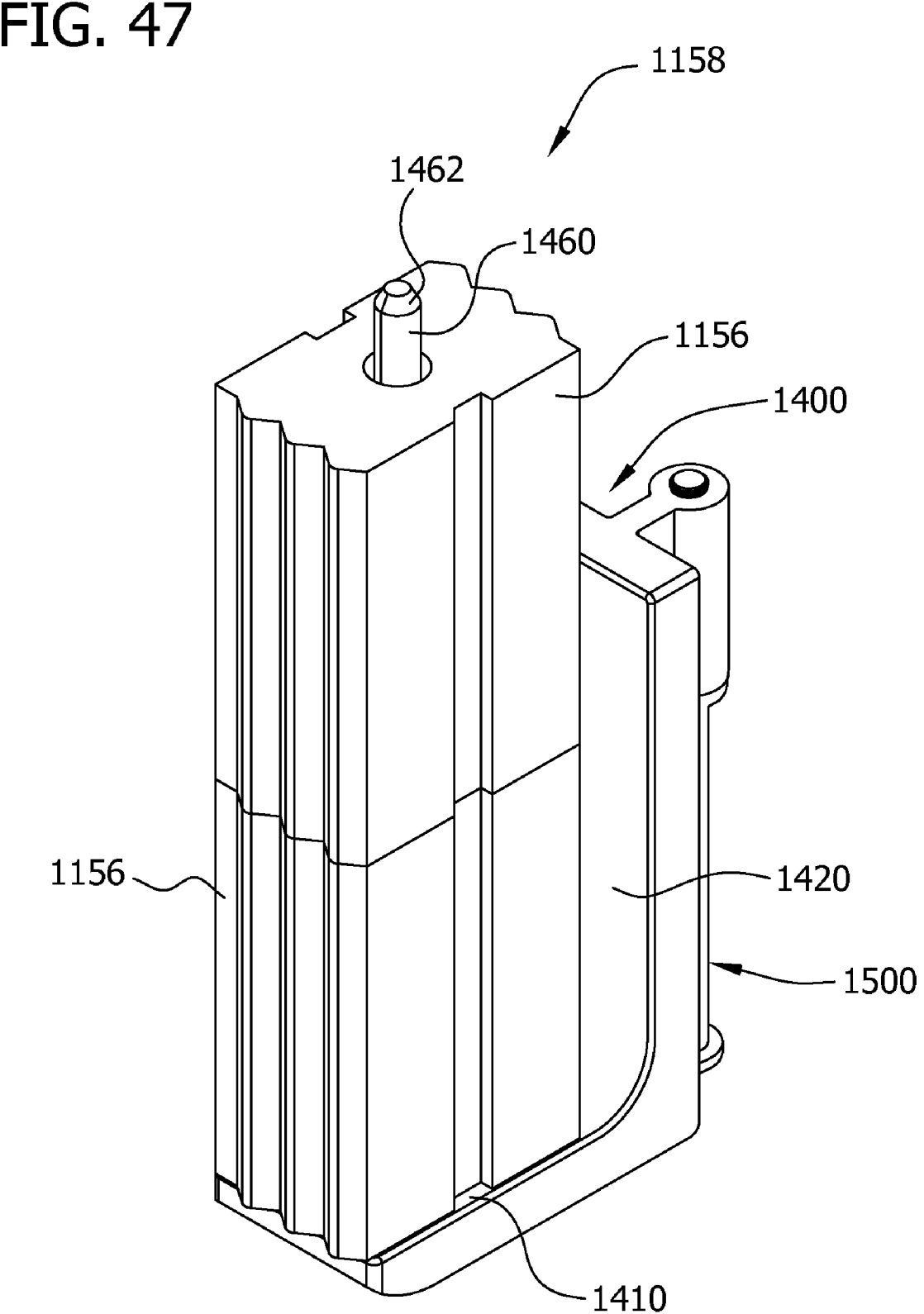
FIG. 47 is a perspective view of the bait support device of FIG. 45 with bait blocks positioned on the bait pin.
Figure 48:
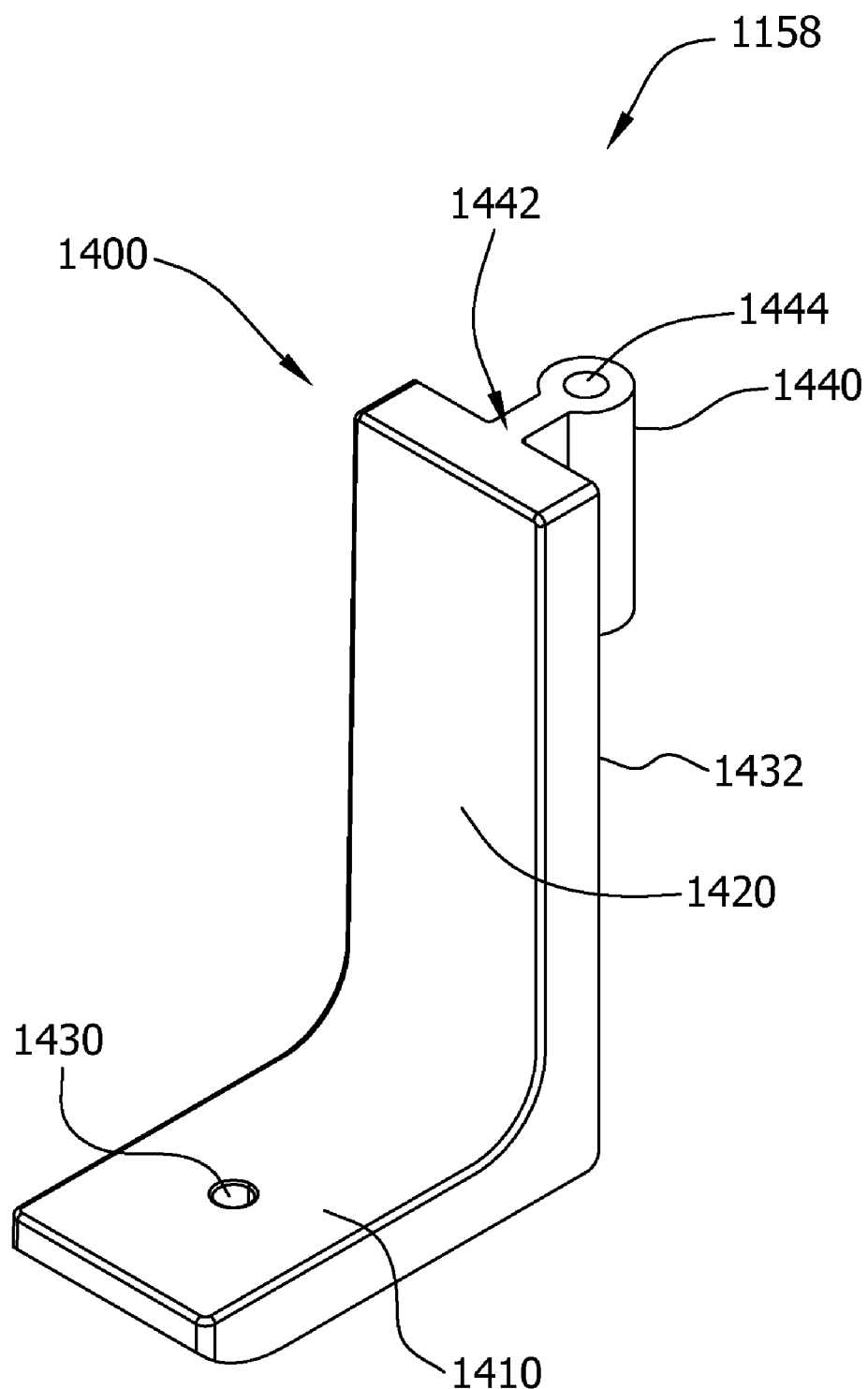
FIG. 48 is a perspective view of the bait support device of FIGS. 42 and 45 with the bait pin omitted.

An upper arm 1510 extends transversely outward from the riser 1500 post and more particularly from the upper segment 1506 thereof just above the upper annular flange 1506. The upper arm is sized in width to seat within the upper notch 1480 of the bait support 1400 to further support the bait support on the riser. A lower arm 1520 also extends transversely outward from the riser 1500 post, for example, at the lower end thereof, and is suitably sized and configured to fit within and/or engage the lower notch 1482 of the bait support 1400. An assembly of the bait support device 1400 and riser 1500 is illustrated in FIG. 47. It is understood, however, that either of the upper arm 1510 and lower arm 1520 may be omitted without departing from the scope of this invention. It is also understood that the riser 1500 may be configured other than as illustrated and remain within the scope of this invention as long it supports the bait support 1400 at a height within the interior space of the station 1100 housing higher than the bait support is disposed absent the riser.

The length of the lower segment 1502 and/or the upper segment 1504 of the riser 1500 post thus dictates the vertical position (i.e., height above the floor of the station 1100 housing) of the bait support 1400 (or bait tray 1322), and by extension the bait blocks 1156 placed thereon, within the rodent management station 1100. The riser 1500 thus functions as a height adjustment member and is configured for selective adjustment of the height of the bait support 1400 above the floor of the station 1100. Accordingly, different risers (not shown) of alternative lengths or different configurations may be provided to permit selective height adjustment of the bait support 1400 (or bait tray 1322). The riser 1500 may be constructed out of any suitable material, such as plastic, metal, or a combination of materials.

Using a riser 1500 that is disposed within one of the slots 1132 allows the bait support 1400 to be supported above the floor of the station 1100 housing in spaced relationship therewith, e.g., without the riser structure being interposed between the bait support and the floor. As such, a live trap may readily seat below the bait support 1400 so that both the live trap and bait may be disposed within the bait chamber. Additionally, with the live trap removed from the bait chamber and the lid 1106 in the opened configuration of the station 1100 the floor of the station is readily cleaned by sweeping or brushing beneath the bait supports 1400 without having to remove the bait supports from the station.

Figure 42:
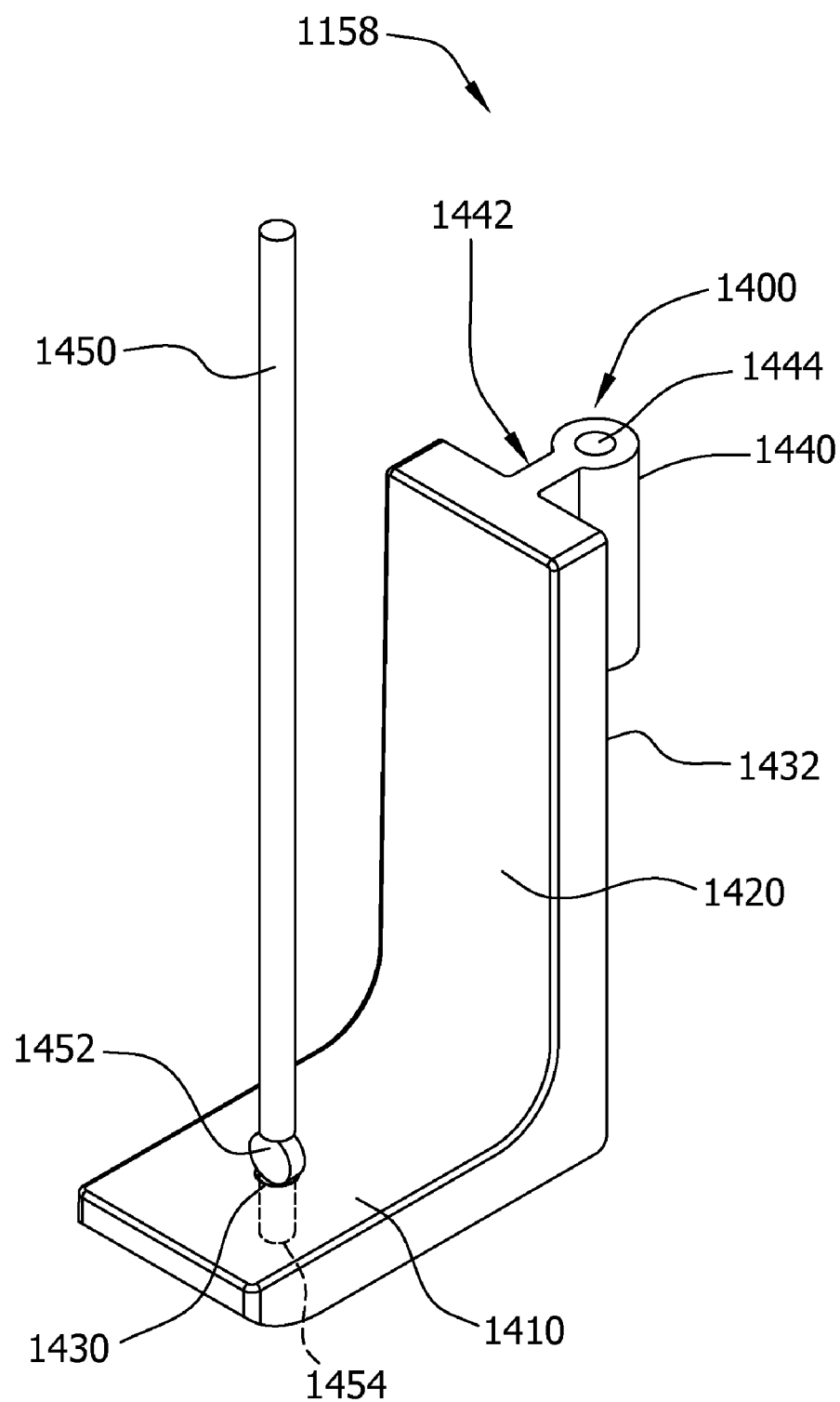
FIG. 42 is a perspective view of another embodiment of a bait support device including a bait pin.
Figure 45:
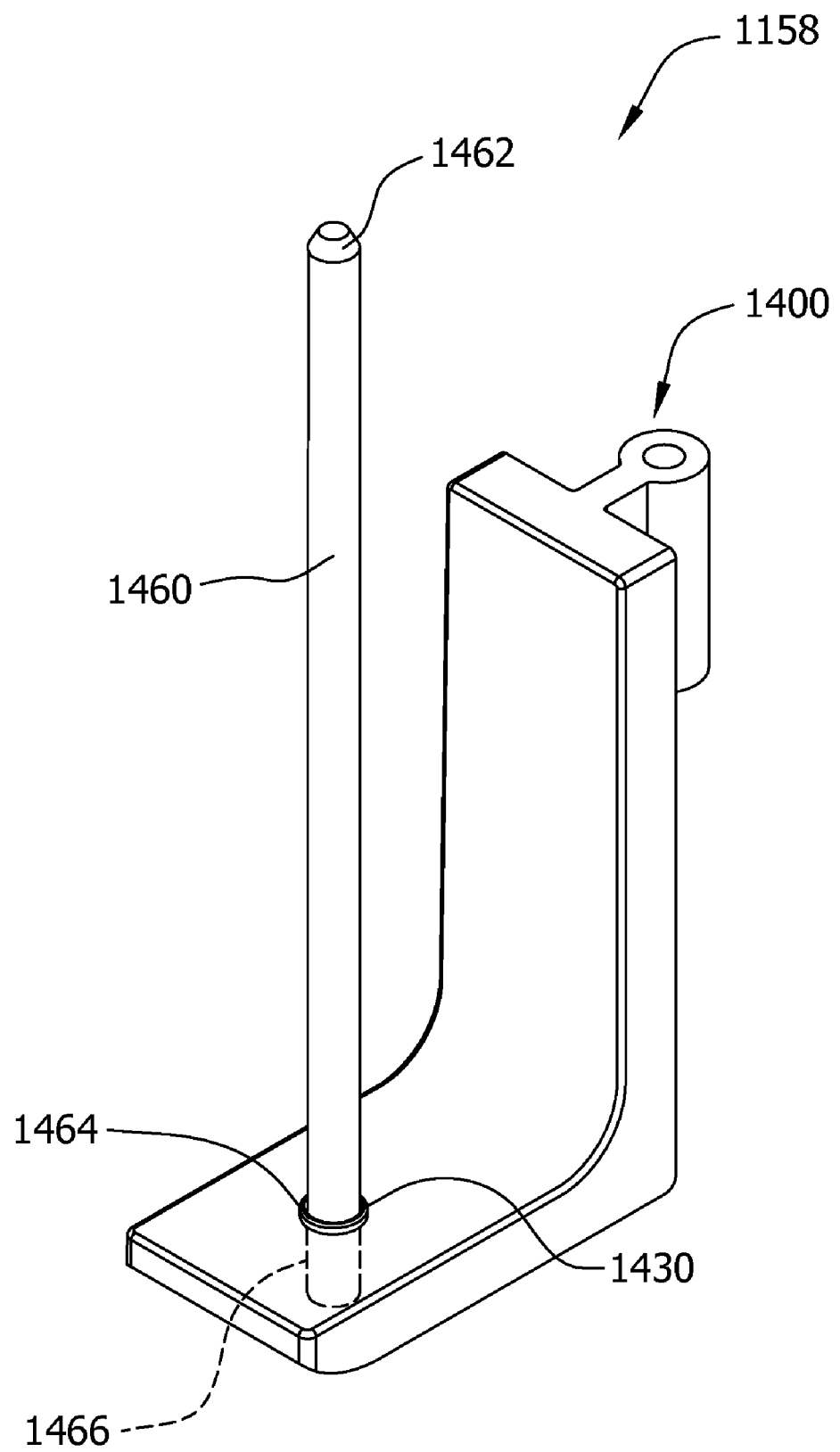
FIG. 45 is a perspective view of the bait support device of FIG. 42 utilizing an alternative bait pin.
Figure 46:
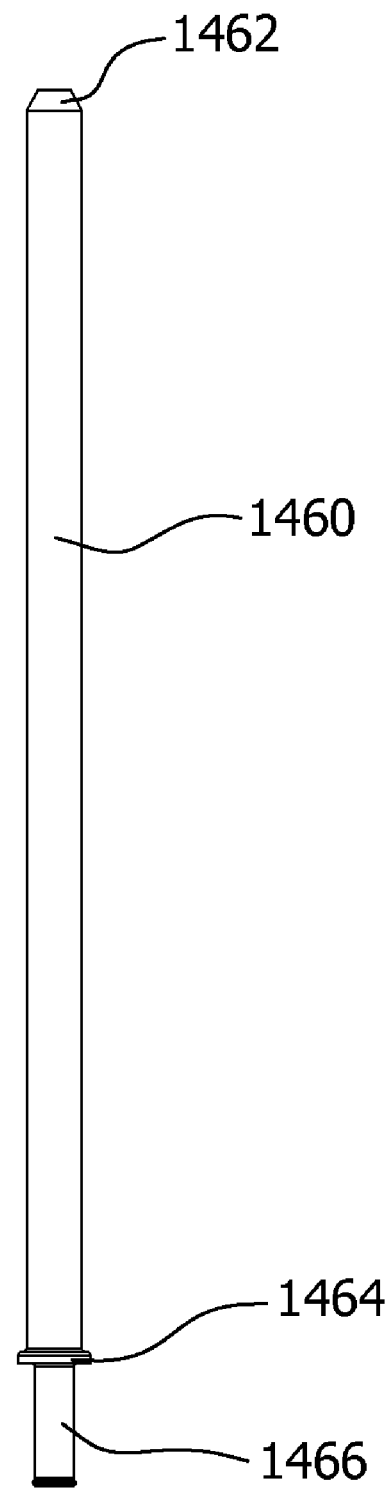
FIG. 46 is a front elevation of the bait pin of FIG. 45.

FIG. 45 depicts the bait support 1400 utilizing a bait rod 1460 instead of the bait pin 1450 of FIG. 42. Like the bait pin 1450, the bait rod 1460 is configured to position and locate bait blocks 1156 in a generally fixed arrangement on the platform of the bait support 1400. The bait rod 1460 has a diameter that is suitably configured so that bait blocks 1156 having an opening formed therein may be positioned on the bait rod such that the bait rod passes through the openings formed in the bait blocks. The bait blocks 1156 are thus securely positioned and a rodent is unable to carry away a bait block from the rodent management station 1100. The bait rod 1460 (as best seen in FIGS. 45 and 46) has an annular collar 1464 positioned at or near a lower segment 1466 of the bait rod to serve as a stop upon insertion of the bait rod into the platform opening 1430. The annular collar 1464 is formed according to any suitable method, such as during the molding or manufacturing of the bait rod 1460. For example, if the bait rod 1460 is formed in an injection molding process, the annular collar 1464 is formed in the same operation. In other embodiments, the annular collar 1464 may be formed as a separate component and suitably fastened or coupled to the bait rod 1460 by press fit, adhesive or other suitable connection.

The bait rod 1460 has a tapered upper end 1462 to facilitate loading of the bait blocks 1156 on the bait rod 1460. It is understood that the upper end 1462 may be tapered other than as illustrated, or remain untapered in the manner of the bait pin 1450, without departing from the scope of this invention.

FIG. 47 illustrates two bait blocks 1156 positioned on the bait support device 1400 using the bait rod 1460. The bait blocks suitably rest on the platform 1410 and be stacked in vertical alignment with support from the bait rod 1460. The platform thus supports the bait blocks and provides substantial support surface for the bait blocks such that in hot environments where bait can become softened the bait does not melt and flow down onto the floor of the station 1100 housing.

Figure 72:
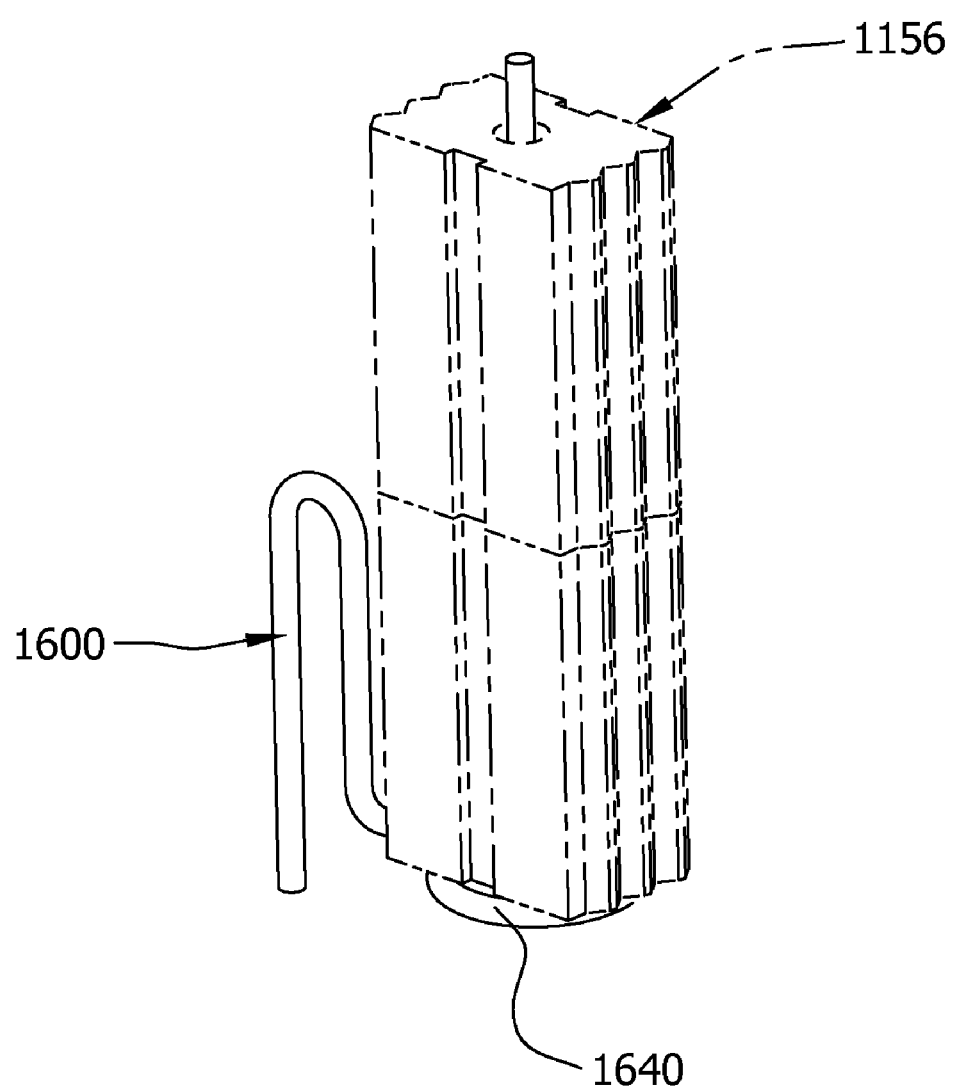
FIG. 72 is a perspective view of another embodiment of a bait support device for use with the rodent management station of FIG. 38, with bait blocks shown in phantom.
Figure 73:
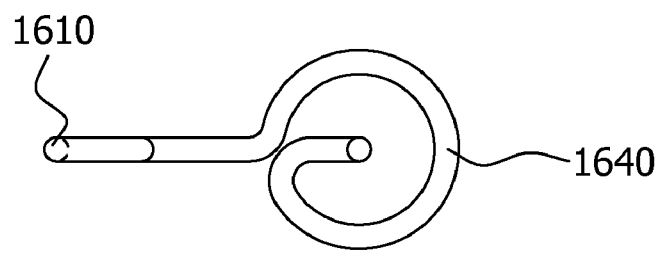
FIG. 73 is a top plan view thereof.
Figure 74:
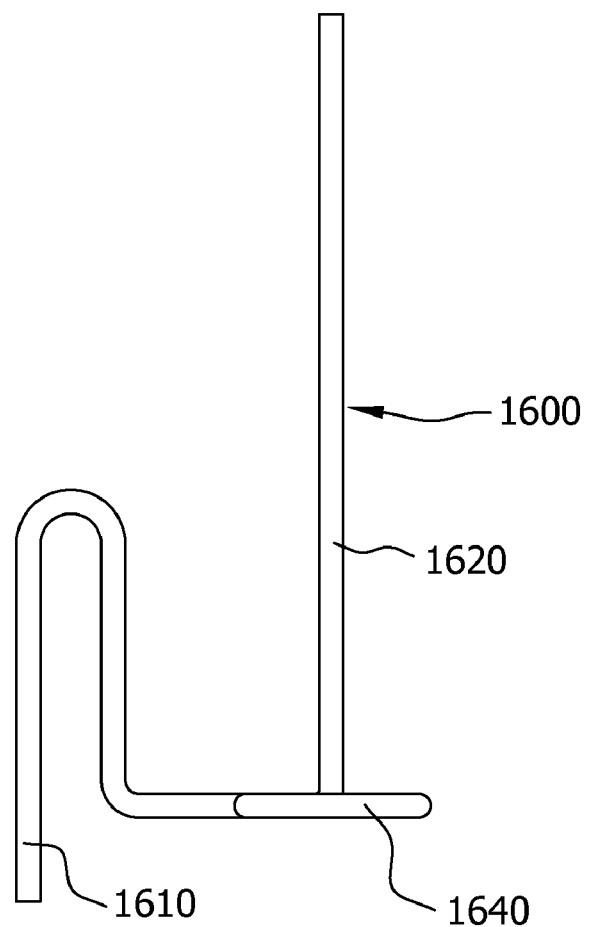
FIG. 74 is a side elevation thereof.

FIGS. 72-74 illustrate another embodiment of a suitable bait support, indicated generally at 1600 for the rodent management station 1100. The bait support 1600 is used to support bait blocks 1156 in a vertically stacked arrangement and has a shaped-wire seat 1640 on which bait is supported in spaced relationship above the floor of the station 1100 housing. The bait support 1600 of this embodiment is formed from a metal or plastic wire and has a circular cross-section, as shown in FIG. 72. In other embodiments, the cross-section of the bait support 1600 may be other than circular, such as square, rectangular, or oblong. Moreover, the cross-sectional shape may be different at different segments along the bait support 1600.

The illustrated bait support 1600 has a mounting end 1610 that slides into and down to the bottom of the slots 1132 in the rear wall 1116 of the base 1104 to releasably connect the bait support with the rear wall. The bait support 1600 extends outward and upward from the mounting end 1610 (i.e., away from the rear wall 1116 of the base panel 1104) and forms a coiled support portion 1640 (i.e., a shaped-wire seat) on which bait blocks 1156 are supported. A vertically oriented post 1620 (broadly, a "wire pin") extends up from the coiled support portion 1640 and is configured to receive the bait blocks 1156. The coiled support portion 1640 is generally circular when viewed from above as in FIG. 73 and accordingly provides an increased surface area for supporting the bait blocks.

Figure 75:
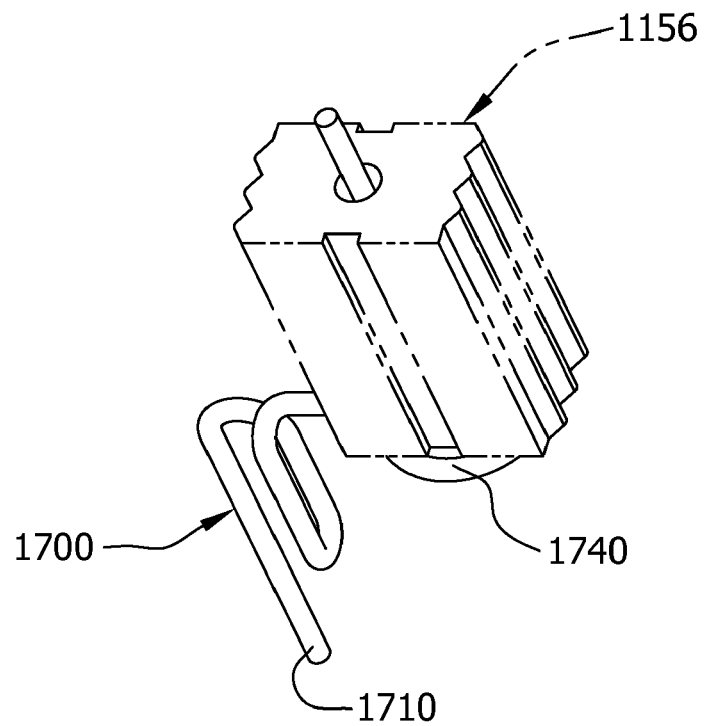
FIG. 75 is a perspective view of another embodiment of a bait support device for use with the rodent management station of FIG. 38, with bait blocks shown in phantom.
Figure 76:
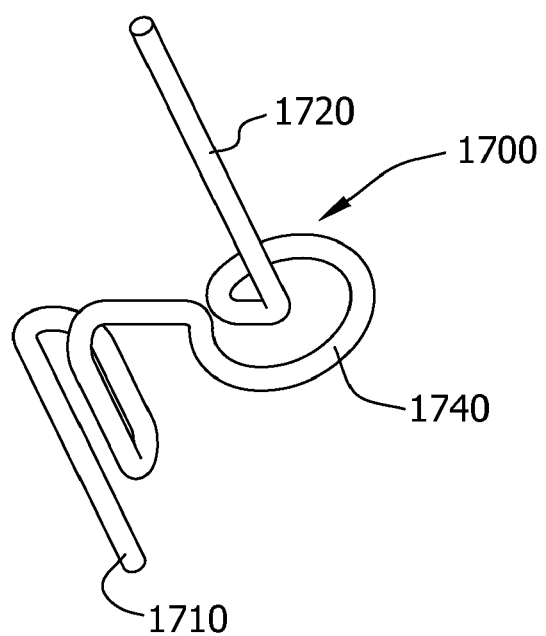
FIG. 76 is a perspective view thereof.
Figure 77:
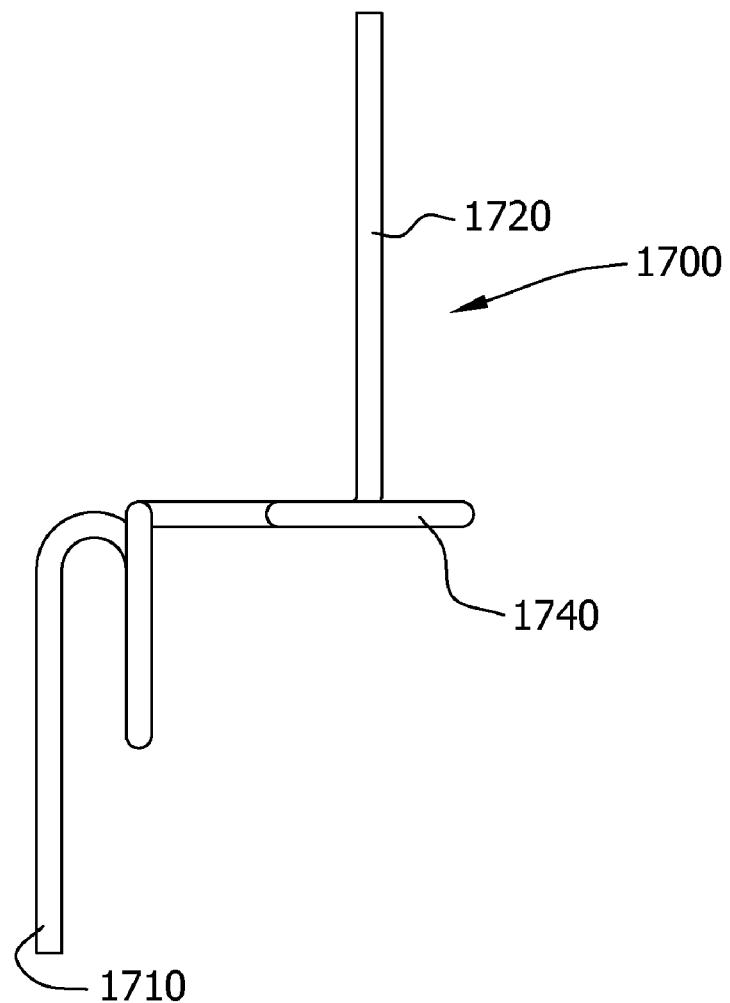
FIG. 77 is a side elevation thereof.
Figure 78:
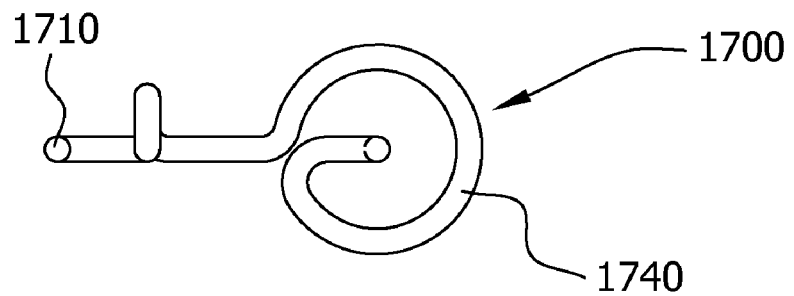
FIG. 78 is a top plan view thereof.
Figure 79:
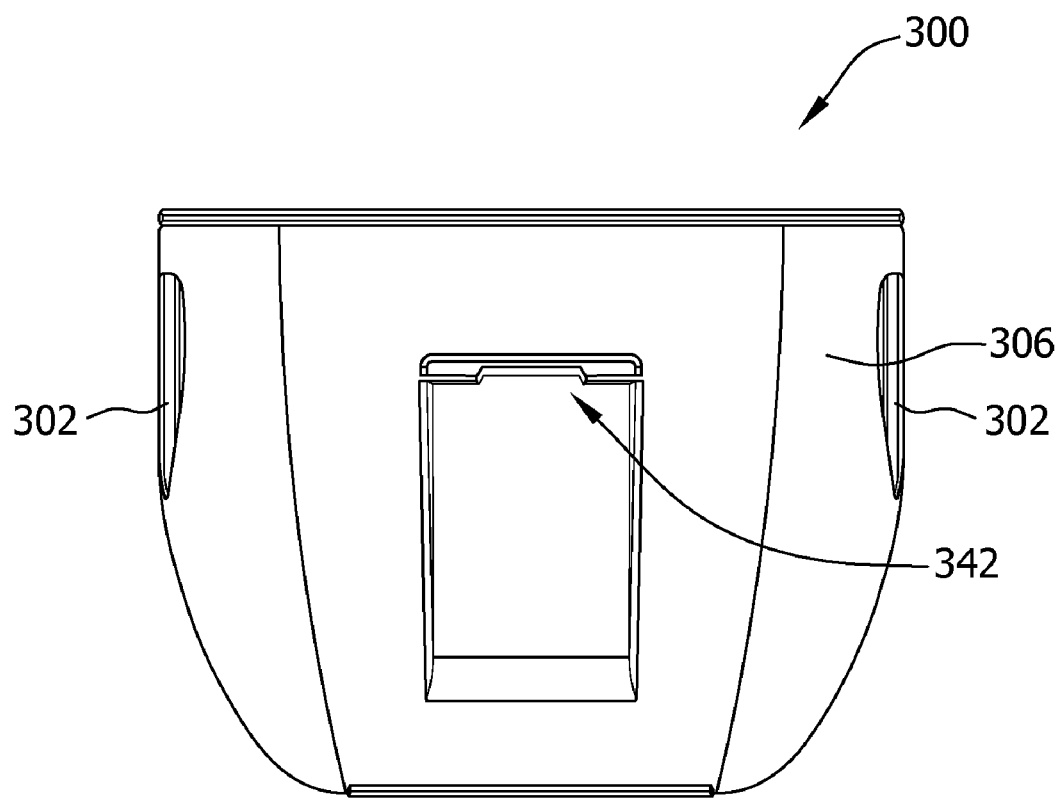
FIG. 79 is a top plan view of a third embodiment of a rodent management station in a closed configuration.
Figure 80:
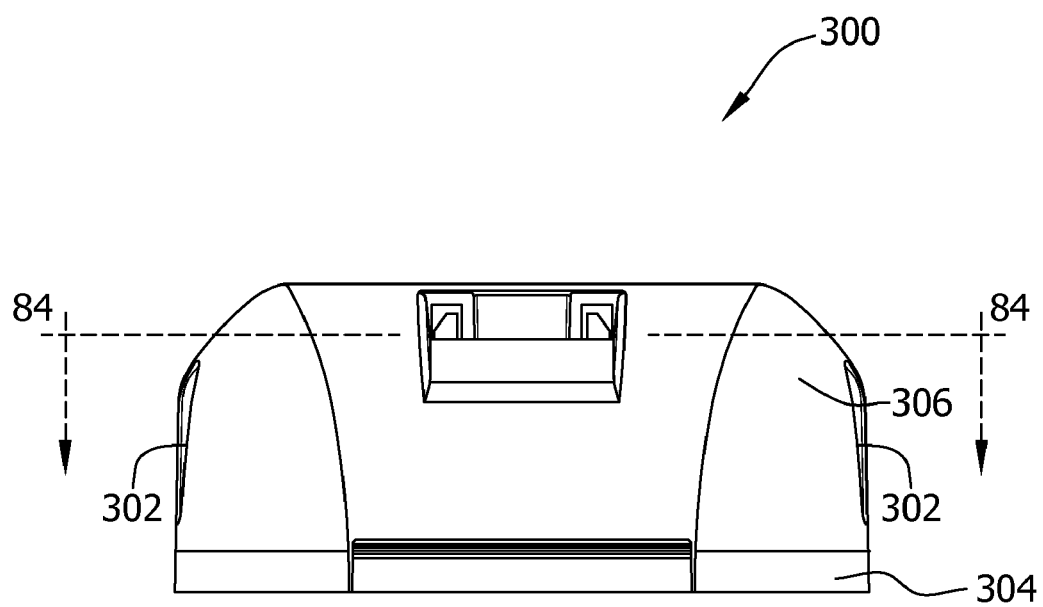
FIG. 80 is a front elevation thereof.

FIGS. 75-78 illustrate yet another embodiment of a suitable bait support, generally indicated at 1700. This bait support is also used for supporting bait blocks 1156 in a vertically stacked arrangement. The bait support 1700 may be formed from a metal or plastic wire and has a circular cross-section, as shown in FIG. 75. In other embodiments, the cross-section of the bait support 1700 may be other than circular, such as square, rectangular, or oblong. Moreover, the cross-sectional shape may be different at different segments along the bait support 1700.

The bait support 1700 has a mounting end 1710 that slides into and down to the bottom of the slots 1132 in the rear wall 1116 of the base 1104 to releasably connect the bait support with the rear wall. The bait support 1700 extends outward and upward from the mounting end 1710 (i.e., away from the rear wall 1116 of the base panel 1104) and forms a coiled support portion 1740 (i.e., a seat) on which bait blocks 1156 are supported. A vertically oriented post 1720 extends upward from the coiled support portion 1740 and is configured to receive bait blocks 1156 thereon. The bait support 1700 is thus configured to support bait blocks 1156 in spaced relationship above the inner surface 1118 of the bottom panel 1114 of the rodent management station 1100. Moreover, when compared to the bait support 1600, the bait support 1700 vertically positions the bait blocks 1156 a greater distance above the inner surface 1118 of the bottom panel 1114. This increased distance permits the live trap 1200 to be positioned in between the coiled support portion 1740 and the bottom panel 1114. Accordingly, the bait support device 1700 may be used either alone or in conjunction with the live trap 1200. In such an embodiment, the live trap may be used to trap mice while the bait is used to treat other rodents (e.g., rats) that are too large to enter the live trap. The coiled support portion 1740 is generally circular when viewed from above as in FIG. 78 and accordingly has an increased surface area for supporting bait blocks 1156.

FIGS. 56-69 illustrate one suitable live trap 1200 for the rodent management station 1100 of this embodiment. The live trap 1200 is generally similar to the live trap 200 of the first embodiment, and it is understood that the live trap of this embodiment may be used in the rodent management station 100 without departing from the scope of this invention. In this embodiment, the live trap 1200 has an enlarged trap portion 1209 configured to seat within the bait chamber of the rodent management station 1100, and a narrowed entry portion (broadly, an "inlet" or "inlet portion") 1208 extending from the trap portion. While not visible in the drawings, the entry portion 1208 may also extend partially into the interior of the trap portion 1209 such that rodents exit the entry portion into the trap portion more centrally within the interior of the trap portion of the live trap 1200. The live trap 1200 suitably has a front generally adjacent or including the entry portion 1208 and a rear opposite the front. Thus, with the live trap 1200 disposed within the housing of the rodent management station 1100, the entry portion 1208 of the live trap may extend at least up to and in some embodiments through the bait chamber entryway out into the passageway along which rodents are guided within the rodent management station.

Figure 56:
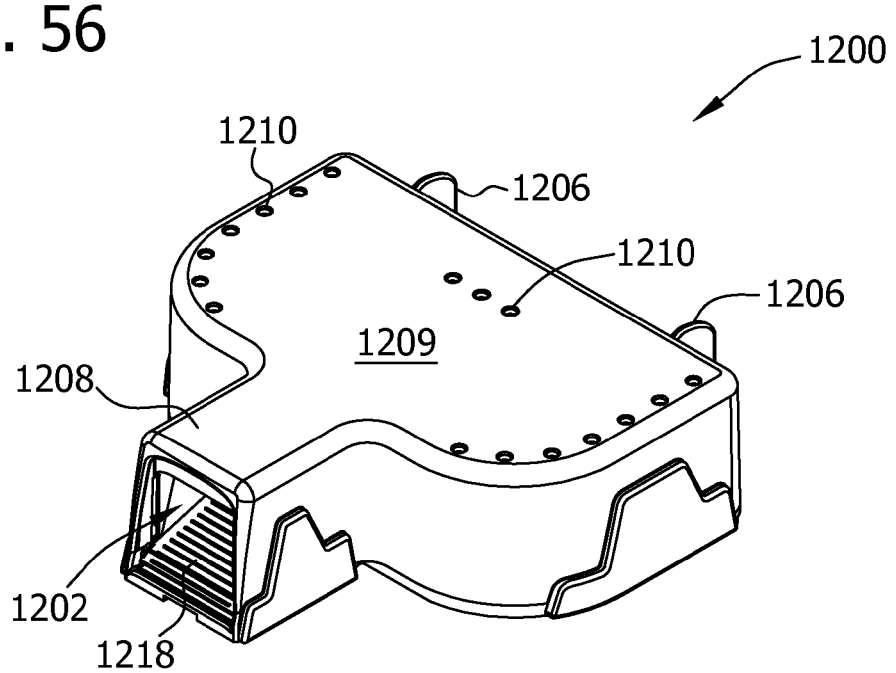
FIG. 56 is a perspective view of another embodiment of a live trap for with the rodent management stations of FIG. 1 and FIG. 38.
Figure 57:
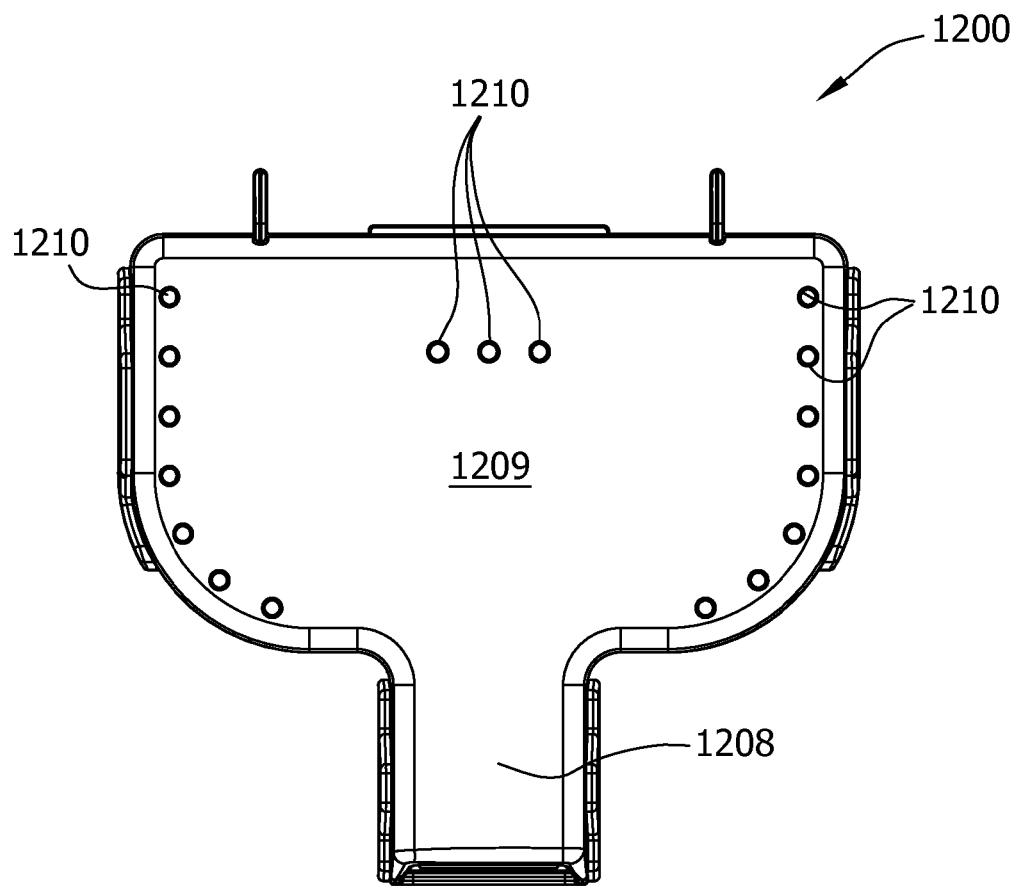
FIG. 57 is a top plan view thereof.

The live trap 1200 of this embodiment has an entry opening 1202 of disposed at the end of the entry portion 1208 of the live trap. Moreover, as seen in FIGS. 56 and 57, the side walls of live trap 1200 curve outward and are substantially rounded where the entry portion 1208 meets or transitions to the remainder of the live trap 1200 (i.e., to the trap portion 1209). The illustrated live trap 1200 of this embodiment also includes vent openings in the form of upper vent holes 1210 (FIG. 63) in an upper surface 1209 of the live trap and side vent holes 1212 (FIGS. 66 and 67) along the rear 1211 of the live trap 1200. The upper vent holes 1210 and side vent holes 1212 are more suitably located at the trap portion 1209 of the live trap 1200 and sized to inhibit the passage of a rodent therethrough and as such are substantially smaller than the entry opening 1202 of the live trap 1200, while still permitting the passage of air, light, and particulates between the interior (i.e., trap portion) of the live trap and fluid communication therebetween. Providing the vent holes in this manner entices rodents (after trapping) to move into the trap portion 1209 and more suitably away from where the entry portion 1208 opens into the trap portion. It is understood, however, that vent openings 1210, 1212 may be located on the live trap 1200 other than as illustrated and remain within the scope of this invention.

Figure 58:
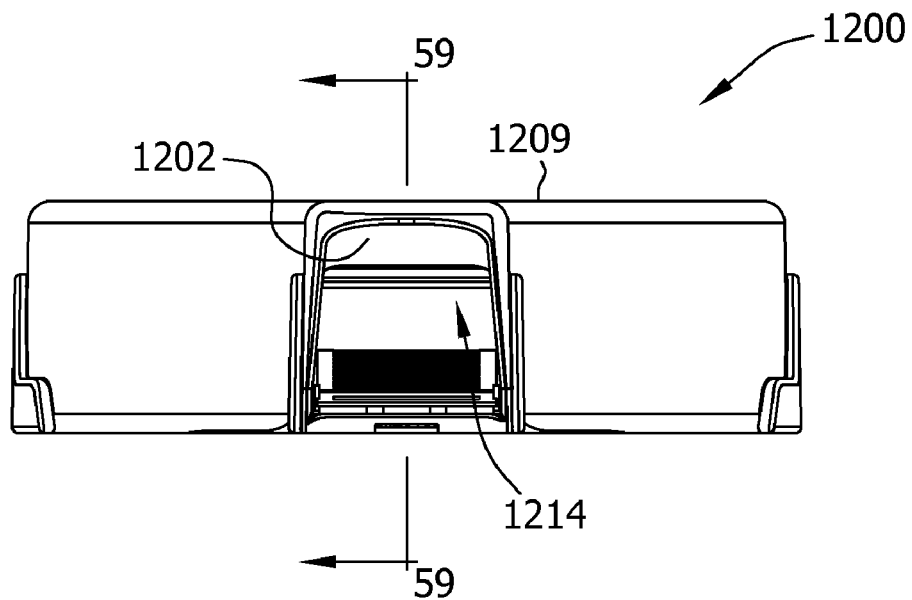
FIG. 58 is a front elevation thereof.
Figure 59:
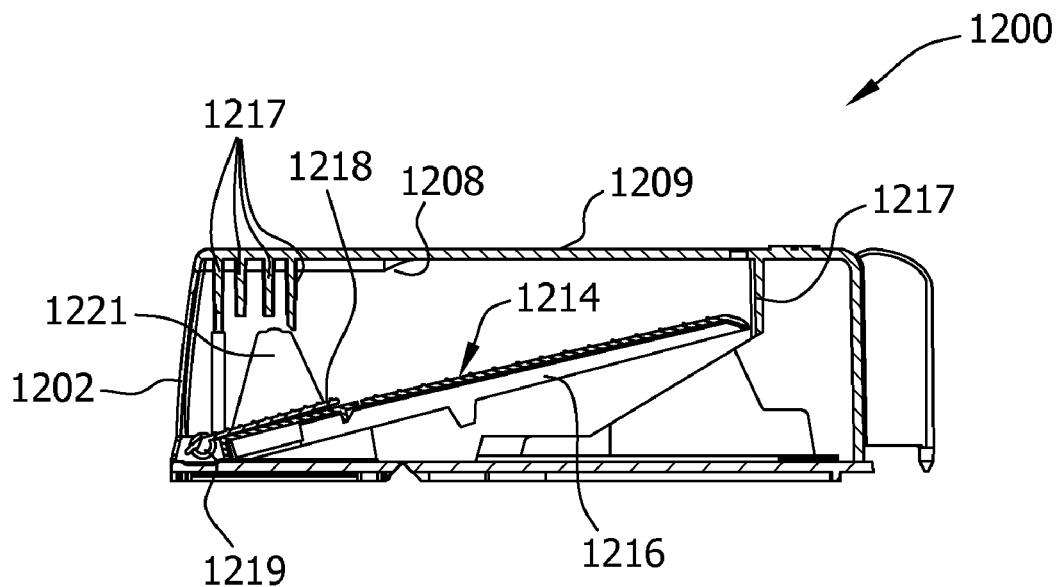
FIG. 59 is a cross-section taken in the plane of line 59-59 of FIG. 58.

A variety of suitable internal trap mechanisms may be used within the live trap 1200, and in particular within the entry portion 1208 of the live trap, to trap rodents within the trap portion 1209 thereof. For example, in one embodiment the internal trap mechanism may comprise a ramp mechanism 1214 as illustrated in FIGS. 56, 58, and 59. The ramp mechanism 1214 comprises a ramp 1216 extending longitudinally within the tunnel portion 1208 of the live trap 1200 and having an entry end nearest the entry opening 1202 of the trap and an exit end nearest the enclosure portion of the trap. The ramp 1216 is mounted on the floor of the live trap 1200 for pivoting movement. A trap door 1218 is pivotally connected to the ramp generally adjacent the entry end of the ramp by a suitable pivot pin 1219. A spring, weight or other device is used to bias the ramp 1216 in a position in which the ramp slants upward as illustrated in FIG. 59 with the entry end of the ramp down near the floor of the live trap 1200. In this position, the trap door 1218 lays generally flat against the ramp 1216 to permit a rodent that enters the trap to proceed up the ramp over the trap door.

As the rodent proceeds past the trap door 1218, the weight of the rodent causes the ramp 1216 to pivot downward (i.e., to pivot the exit end downward). This pivoting of the ramp 1216 causes the entry end of the ramp to rise, pushing the trap door to pivot about the pin 1219 to an upright position (not shown) within the tunnel portion 1208 of the trap 1200 thus preventing the rodent from turning around and exiting the trap. The rodent must therefore continue past the ramp 1216 and into the enclosure portion of the live trap 1200. Once the rodent is off of the ramp 1216, the ramp returns to its initial position (FIG. 59) with the trap door 1218 again lying generally flat against the ramp. In particularly suitable embodiments, adhesive such as in the form of a glue board, may be disposed on the floor of the enclosure portion of the live trap 1200 to inhibit further movement of the rodent once it enters the enclosure portion, or at least travels to a particular area within the enclosure portion such as away from the entrance of the tunnel portion 1208 into the enclosure portion.

Figure 65:
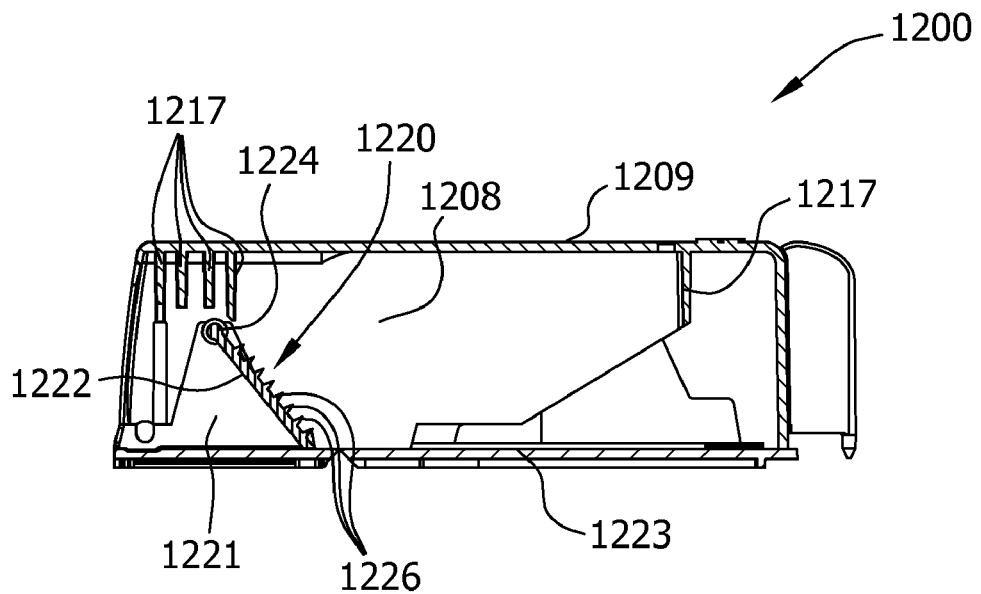
FIG. 65 is a cross-section taken in the plane of line 65-65 of FIG. 64.
Figure 66:
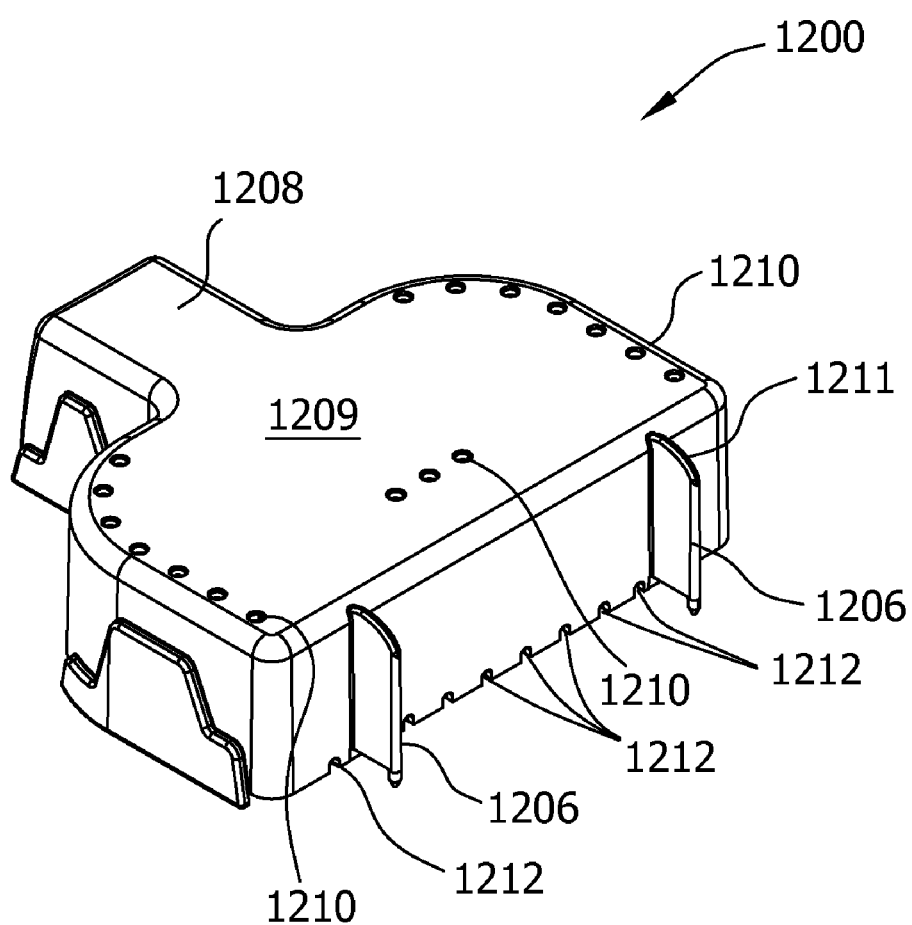
FIG. 66 is a rear perspective view of the live trap of FIG. 56.
Figure 67:
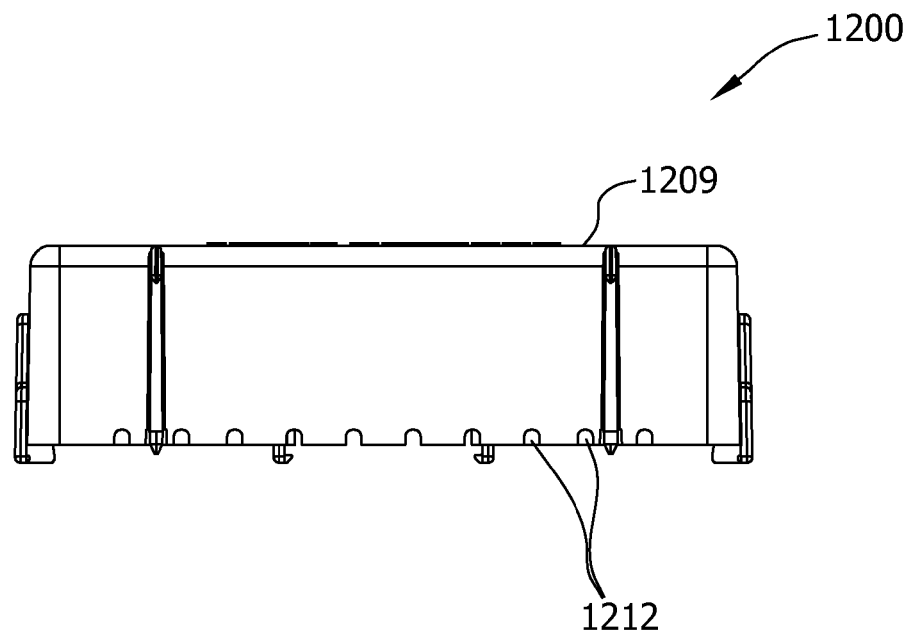
FIG. 67 is a rear elevation thereof.
Figure 68:
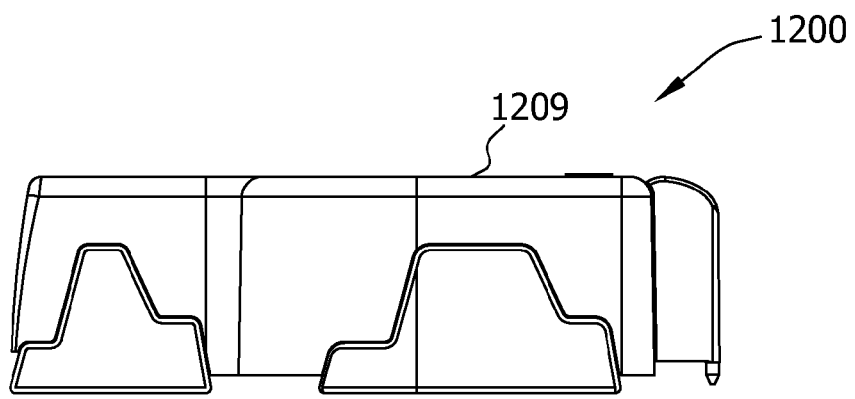
FIG. 68 is a right side elevation thereof.

In some embodiments, the ramp 1216 is not utilized. In these embodiments, the trap door (broadly, a "gate") 1218 is pivotable generally between an up position in which the gate generally closes off the entry opening 1202 of the live trap 1200 from the remainder of the trap and a down position in which a rodent can pass from the entry opening through the tunnel portion 1208 of the trap. FIGS. 59 and 65 illustrate a number of depending protrusions (broadly, "blocking members") 1217 which extend downward from the upper surface 1209 of the live trap 1200. The depending protrusions 1217 prevent a rodent which has reached the enclosure portion of the live trap 1200 from tampering or manipulating the trap mechanism to escape from the live trap. In embodiments utilizing the trap door 1218, the depending protrusions are disposed generally above the trap door in the up position thereof and may be arranged longitudinally along the tunnel portion 1208 from a position intermediate the entry opening 1202 and the trap door 1218 in the up position to location past the trap door in the position. In the embodiments utilizing the ramp 1216, the depending protrusions 1217 prevent the rodent from pivoting the ramp 1216 and opening gate 1218 to a position past the pivot point 1219 where the gate will not close when the rodent steps off of and releases the ramp to return to its natural resting position. Furthermore, the depending protrusions 1217 are suitably used with any of the trap mechanisms discussed herein and function in a similar manner to prevent rodents from manipulating the live trap mechanism after they have passed therethrough.

Figure 60:
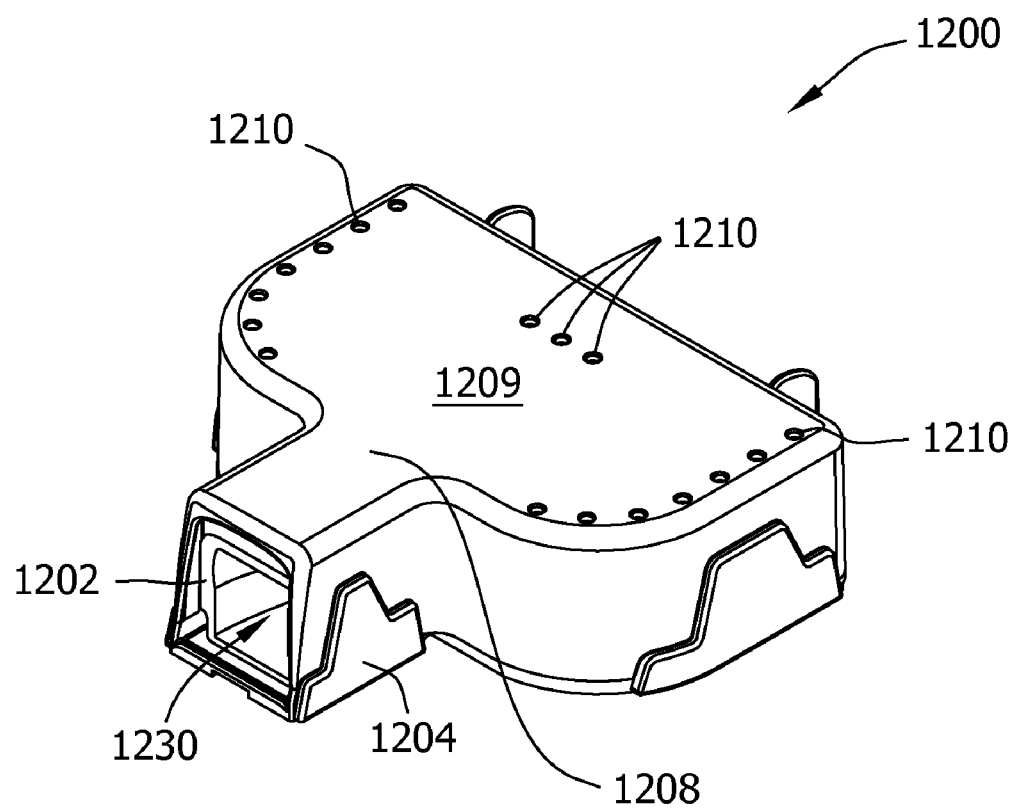
FIG. 60 is a perspective view of the live trap of FIG. 56 with another embodiment of a trap mechanism positioned therein.
Figure 61:
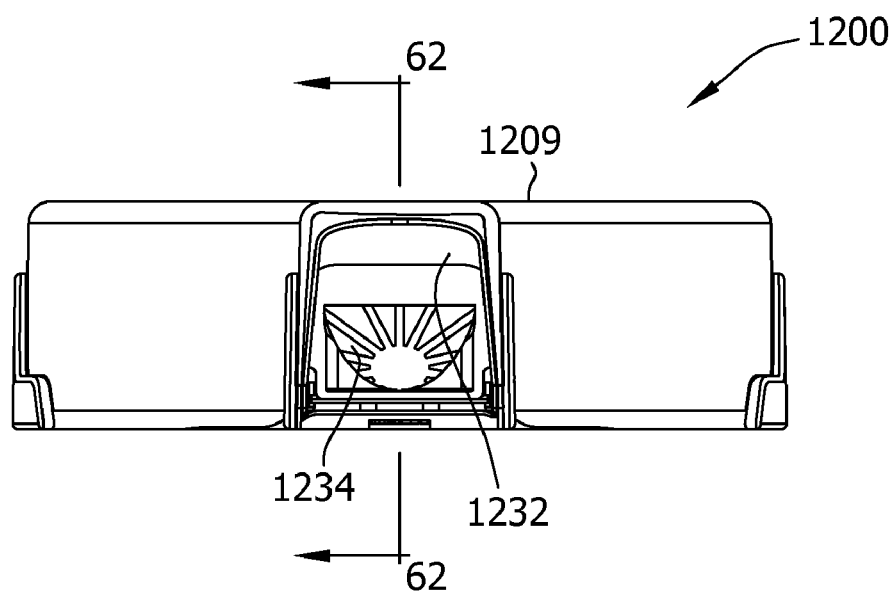
FIG. 61 is a front elevation thereof.
Figure 62:
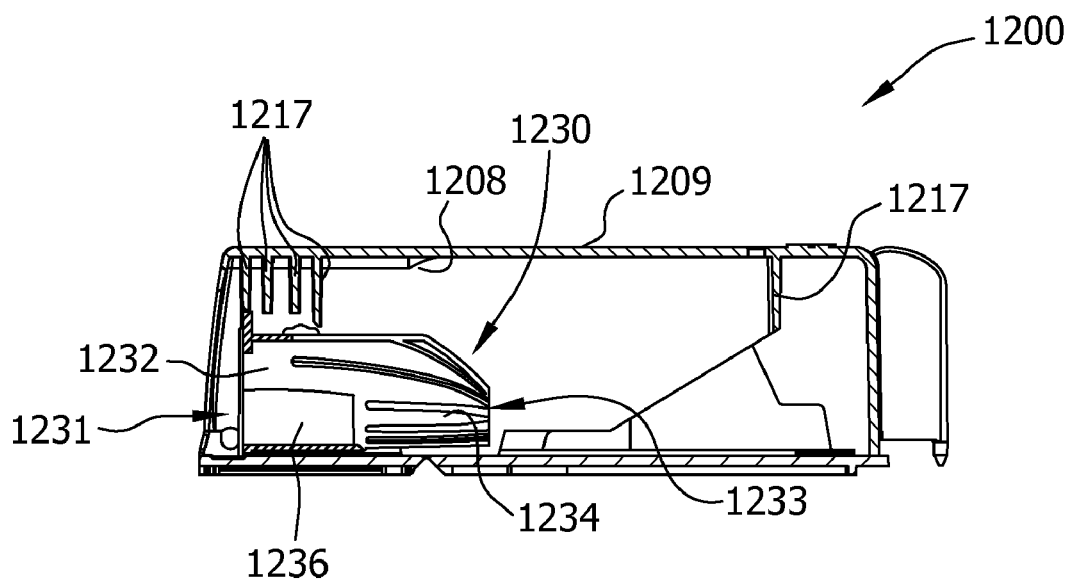
FIG. 62 is a cross-section taken in the plane of line 62-62 of FIG. 61.

With reference to FIGS. 60, 61, and 62, another live trap mechanism is referred to herein as a funnel trap mechanism 1230 comprising a funnel 1232. The funnel 1232 sits within the tunnel portion 1208 of the live trap 1200 and has a first or entry end 1231 nearest the entry opening 1202 of the trap and an exit end 1233 nearest the enclosure portion of the trap. The funnel 1232 more suitably comprises a rigid segment 1236 extend longitudinally downstream from the entry end 1231 of the funnel and a flexible segment comprising a plurality of fingers 1234 attached to and extending longitudinally downstream from the rigid segment of the funnel to the exit end 1233 thereof. The rigid segment 1236 of the illustrated funnel 1232 is generally cylindrical or rectangular in shape with a constant cross-sectional area along its length. Although it is understood that the rigid segment 1236 may be shaped other than cylindrical or rectangular, and may be of non-uniform cross-section, without departing from the scope of this invention.

The fingers 1234 are configured to angle inward (relative to the centerline of the funnel 1232) toward each other such that the exit end 1233 of the funnel is substantially narrower than the entry end 1231 of the funnel. The fingers 1234 are suitably flexible and resilient to permit outward bending of the fingers against the bias thereof as the rodent passes through the flexible segment of the funnel to the exit end 1233 of the funnel. As a rodent moves through the exit end 1233 of the funnel, the bias of the fingers 1234 causes the tips of the fingers to remain in contact with the body of the rodent. If the rodent tries to reverse course, the tips of the fingers 1234 dig into or otherwise apply pressure to the rodent, thereby encouraging the rodent to continue moving forward to the enclosure portion of the trap. Once the rodent exits the funnel 1232, the fingers 1234 return to their initial position, thus rendering the exit end 1233 of the funnel too narrow for the rodent's head to fit through so the rodent cannot move back through the funnel. In addition, the funnel trap mechanism 1230 utilizes the depending protrusions 1217 to prevent the rodent from exiting the live trap 1200 by passing over the funnel trap mechanism 1230.

Figure 63:
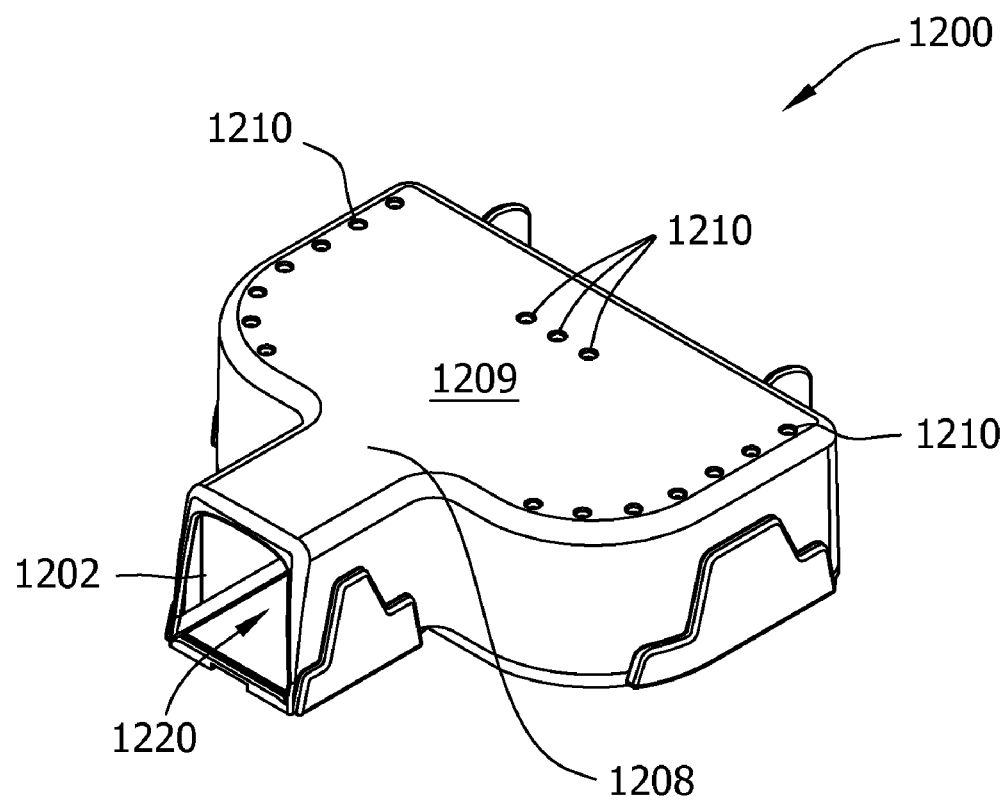
FIG. 63 is a perspective view of the live trap of FIG. 56 with another embodiment of a trap mechanism positioned therein.
Figure 64:
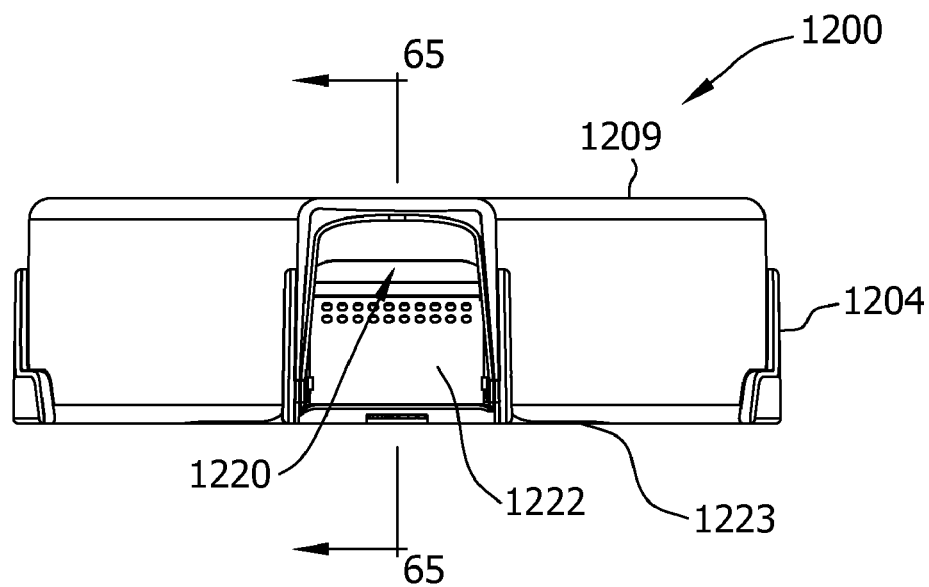
FIG. 64 is a front elevation thereof.

FIGS. 63, 64, and 65 illustrate an alternative trap mechanism, referred to herein as a swing door mechanism 1220. The swing door mechanism 1220 comprises a swing door 1222 that is pivotably attached by a pivot pin 1224 to a base extension 1221 of the live trap 1200 within the tunnel portion 1208 of the trap, suitably near the entry opening 1202 to the trap. The base extension 1221 is coupled to a bottom surface 1223 of the live trap 1200.

The swing door 1222 is suitably sized in length longer than the interior height of the tunnel portion 1208 of the trap 1200 so that in its initial position it contacts the floor of the trap in a slightly angled orientation of the door. In this manner, the door 1222 is capable of swinging only one way, i.e., inward toward the enclosure portion of the trap 1200. In the illustrated embodiment, the swing door 1222 also has teeth 1226 positioned along its free edge and its planar surface facing inwards toward the enclosure portion. In the illustrated embodiment, the swing door 1222 has slots or openings 1223 (FIG. 64) disposed therein, thus enabling light to pass through the swing door.

As the rodent enters the live trap 1200 with the swing door mechanism 1220 they come into contact with the swing door 1222 and cause it to rotate upward about the pivot pin 1224. If the rodent attempts to retreat from the trap 1200 while passing beneath the swing door 1222, the teeth 1226 at the free end and the inward planar surface facing of the swing door bite into the rodent to discourage such rearward movement. After the rodent has cleared the swing door 1222, the door pivots back to its initial state, thus blocking any retreat by the rodent. While teeth 1226 are depicted in FIG. 65 as being positioned along the free edge of the swing door 1222 and planar surface facing inwards towards the enclosure portion, they may be positioned along any portion of the swing door. In addition, the swing door mechanism 1220 utilizes the depending protrusions 1217 to prevent the rodent from exiting the live trap 1200 by passing over the swing door mechanism 1220.

In other embodiments an additional swing door (not shown) may be positioned in front of the swing door 1222 (i.e., prior to the swing door 1222 in the direction of movement of the rodent within the live trap 1200. In such an embodiment, the additional swing door does not have teeth and is sized to permit the swinging of the door in both directions within the swing door trap 1220. The rodent is thus able to exit through this additional door before coming into contact with the swing door 1222. The rodent is encouraged by this additional door that it is capable of retreat from the trap and to thus continue through the next door, which is the swing door 1222. The additional swing door and swing door 1222 generally function in the same manner. Like the swing door 1222, the additional swing door may have slots positioned in any portion therein. The base extensions 1221 extend upward from the bottom surface 1223 and have recesses 1225 formed therein. The base extensions 1221 may be formed integrally with the bottom surface 1223 or they may formed separately and suitably coupled thereto. The recesses 1225 are suitably sized to receive portions of trap mechanisms placed therein. For example, the recesses 1225 are sized and positioned to receive the pivot pin 1224 of the swing door mechanism 1220 as shown in FIG. 65. The recesses 1225 are also sized and positioned to receive the pivot pin 1219 of the ramp mechanism 1214 as shown in FIG. 59 and a portion of either the funnel 1232 or the rigid segment 1236 thereof of the funnel trap mechanism 1230 as shown in FIG. 62.

Figure 69:
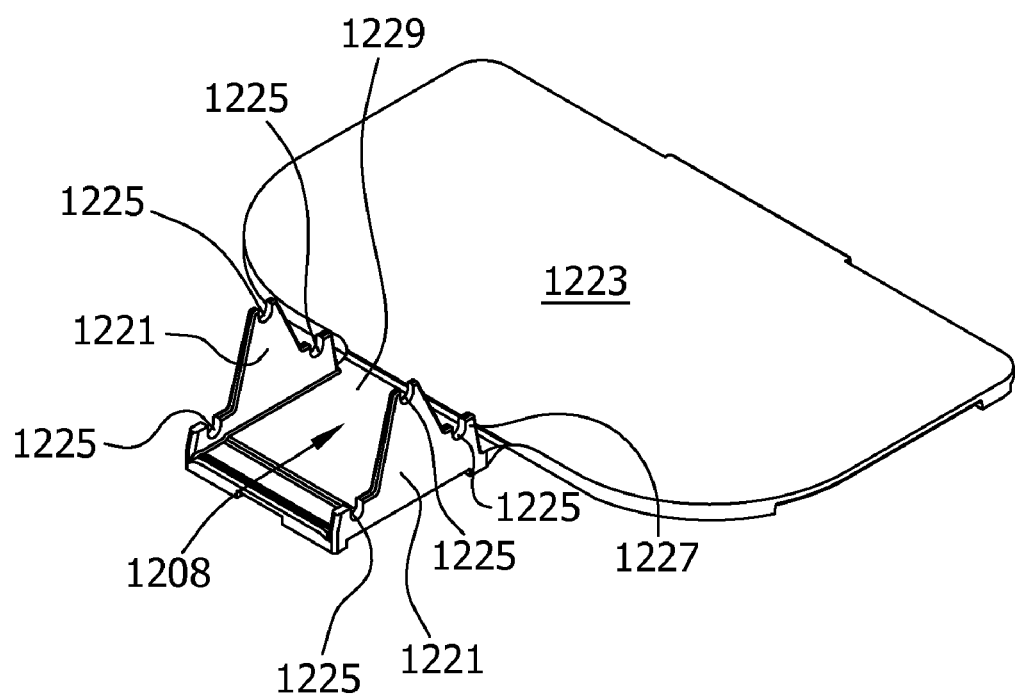
FIG. 69 is a perspective view of a bottom portion of the live trap of FIG. 56.
Figure 70:
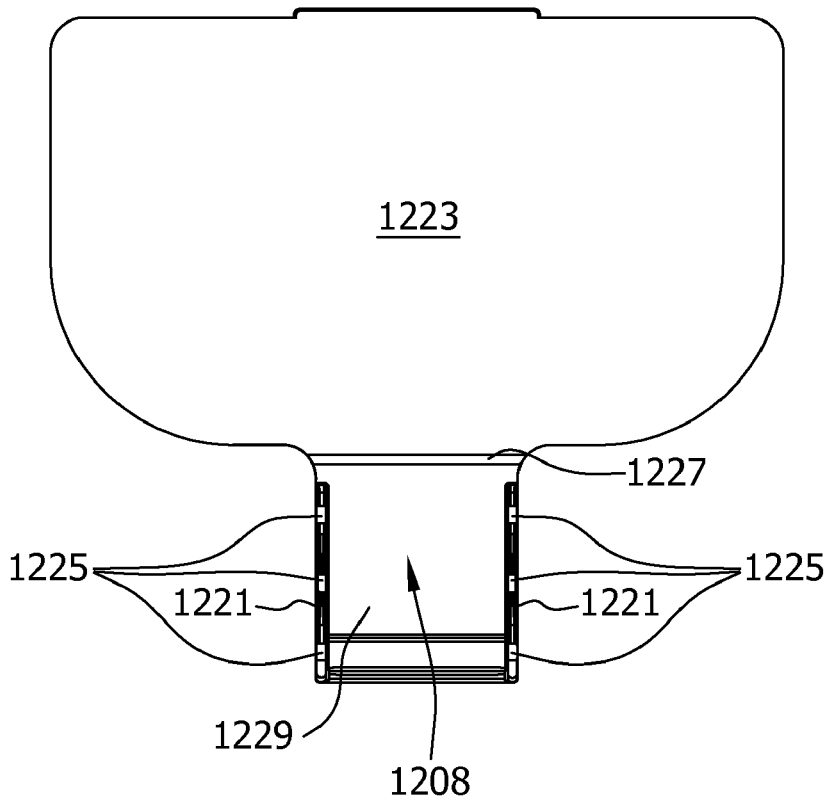
FIG. 70 is a top view thereof.
Figure 71:
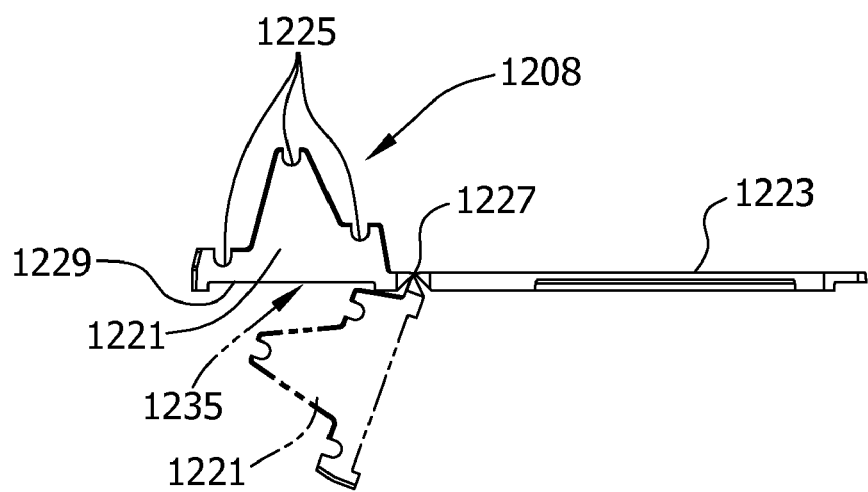
FIG. 71 is a side elevation thereof.

FIGS. 69, 70, and 71 illustrate perspective, top, and side views of the bottom surface 1223 of the live trap 1200. The bottom surface 1223 of the live trap 1200 is positioned adjacent to the bottom panel 1118 of the station 1100 when in operation. The bottom surface 1223 is selectively separable from the remainder of the live trap to permit servicing of the live trap (e.g., removal of rodents and debris therefrom and changing of trap mechanisms). Moreover, according to some embodiments, a living hinge 1227 permits translation of only a portion 1229 (broadly, an "access panel") of the bottom surface 1223 generally disposed adjacent the tunnel portion 1208 away from the remainder of the live trap 1200 to expose an access opening 1235 to permit the servicing and/or replacement of the trap mechanism. The access panel 1229 is thus positionable between a closed position in which the access opening 1235 is closed and an opened position. In the open position, the trap mechanisms, such as glue boards, are insertable, removable, and serviceable through the access opening 1235. An additional trap portion opening (not shown) may be provided separate from the access opening and disposed in a portion of the live trap 1200 near the trap mechanism. A closure panel (not shown) is suitably provided to cover the trap portion opening and is positionable between a closed position in which the trap portion opening is closed and an opened position wherein the interior of the trap portion of the live trap 1200 is accessible for servicing.

FIGS. 79 through 107 illustrate a third embodiment of a rodent management station (indicated generally at 300), which is similar in geometric shape and general configuration to the rodent management station 100 described above in relation to FIGS. 1 through 37 and the rodent management station 1100 described in relation to FIGS. 38 through 78. In this second embodiment, the rodent management station 300 is substantially smaller than (e.g., scaled down from) the rodent management stations 100 and 1100 of the first and second embodiments. For example, the rodent management station 300 illustrated in FIGS. 79-85 is an approximately three-eighths scale of the previously described rodent management stations 100 and 1100.

Like the rodent management stations 100 and 1100, the rodent management station 300 is a multi-sided structure with at least one and more suitably two opposite entry openings 302 formed therein. The rodent management station 300 is of a modular design, permitting a plurality of different bait configurations as will be described in further detail herein. The rodent management station 300 possesses many of the same features as the rodent management station 100, such as, without limitation, the overall geometric shape of the station 300 defining a quarter-dome shape and the locking mechanisms securing the base 304 to the lid 306 when the station 300 is in a closed configuration.

The rodent management station 300 generally comprises a base 304 and a lid 306 that is releasably connectable to the base for configuration between an opened configuration and a closed configuration. In the closed configuration, the lid 306 and base 304 together broadly define a housing having a substantially enclosed interior space with the exception of the openings 302. These entry openings 302 are suitably disposed in opposite sides of the station 300, and more particularly opposite sides of the lid 306 in the illustrated embodiment. In the opened configuration of the station 300 (FIGS. 91, 92), the lid 306 is generally separated at least in part from the base 304 to provide access to the interior space of the rodent management station 300 for maintenance of the station, such as, without limitation, replenishing the bait supply, inspecting the rodent management station 300, and clearing debris from the rodent management station 300.

The base 304 and lid 306 may be suitably fabricated from any number of materials, most suitably plastic or other suitable weather resistant material. For example, the base 304 and lid 306 may be formed in an injection molding process used for producing parts from thermoplastic or thermosetting plastic materials. It is understood, however, that the lid and base may be constructed of metal or other suitable materials, and that the lid and base may be constructed of different materials from each other, without departing from the scope of this invention.

In one particularly suitable embodiment, rodent management station 300 has at least one inspection member to permit inspection of the interior space of the station housing. For example, in the illustrated embodiment at least a portion of the station 300 housing is translucent or more suitably transparent. More particularly, at least a portion of at least one of the rear wall 330 and the bottom panel 322 is translucent or transparent. Even more particularly, the rear wall 330 and bottom panel 322 of the illustrated embodiment are constructed to be substantially entirely translucent and more suitably transparent such that the entire base 304 further defines an inspection member of the rodent management station 300. In such an embodiment, the lid 306 is suitably opaque such that when the station 300 is resting at a predetermined location such as a corner, with the rear wall against a structural wall (e.g., of a building, etc.) and the bottom panel down against a support surface, one cannot see into the interior space of the station housing upon walking by. Rather, the station 300 must be intentionally moved away from its in-use location to allow inspection.

It is understood that only one of the rear wall 330 and bottom panel 322 may be translucent or transparent. It is also understood that less than the entire rear wall 330 and/or bottom panel 322 may be translucent or transparent without departing from the scope of this invention. For example, one or more translucent or transparent windows may be disposed in an otherwise opaque rear wall 330 and/or bottom panel 322. Alternatively, one or more viewing openings or slots may be provided in the rear wall 330 and/or bottom panel 322 for seeing into the interior space of the station 300 housing. While an inspection member is described herein in connection with this third, smaller embodiment of a rodent management station 300 it is understood that one or more inspection members may be provided on either of the rodent management stations 100, 1100 of the previous embodiments, and more particularly on the respective rear wall 116, 1116 and/or bottom panel 114, 1114 thereof.

Although not shown, a removable cover, or covers, may be provided to cover the one or more inspection members to further inhibit unintended viewing therethrough of the interior space of the station 300 housing. The removable cover may a removable film, sticker, panel or other suitable structure.

In the illustrated embodiment, the lid 306 is suitably entirely separable from the base 304 (e.g., not hinged thereto as in the rodent management station 100 of the first embodiment). It is understood, however, that the lid 306 may be hinged (e.g., as by a living hinge or suitable mechanical hinge) as in the first embodiment described previously. In the closed configuration of the station 300, the lid 306 and base 304 are releasably held in assembly by a suitable locking mechanism 342 (similar to or the same as locking mechanism 142 described above) to inhibit unauthorized or unintended opening of the rodent management station 300. Additionally, more than one locking mechanism may be used to releasably hold together the lid 306 and the base 304, according to other embodiments.

The rear wall 330 (broadly, the upstanding wall) of the base 304 is again of two wall construction having an inner panel and an outer panel spaced from each other and connected by a suitable top panel and end panels. The lid 306 is relatively flat along the edge margin wherein the lid overlays the top panel of the rear wall 330 so that the lid lays flat against the top panel of the rear wall. Such an arrangement provides increased resistance to crushing of the lid 306 by a downward directed force, such as by someone inadvertently stepping on the rodent management station 300 or dropping a heavy object thereon. As in the previous embodiments, the outer panel of the rear wall 330 extends above the top panel and outward of the end panels so that when the lid is closed the edge of the lid abuts or is in closely spaced relationship with the outer panel to inhibit the ability of the lid to be pried open. Additionally, while in the previous embodiments the bottom edge of the lid 106 extends down into abutting or closely spaced relationship with the inner surface 118 of the bottom panel 114 about the periphery of the bottom panel, in this embodiment the lid extends down around the outside of the bottom panel (except at the rear wall 116), such as about a peripheral skirt 318 of the bottom panel 322 and more suitably terminates generally flush with the bottom of the station 300 to further inhibit the lid from being pried open. It is understood that such an arrangement may also be provided on the rodent management stations 100, 1100 of the previous embodiments, or that the lid arrangement of the previous embodiments may used for the station 300 of this embodiment without departing from the scope of this invention.

Figure 91:
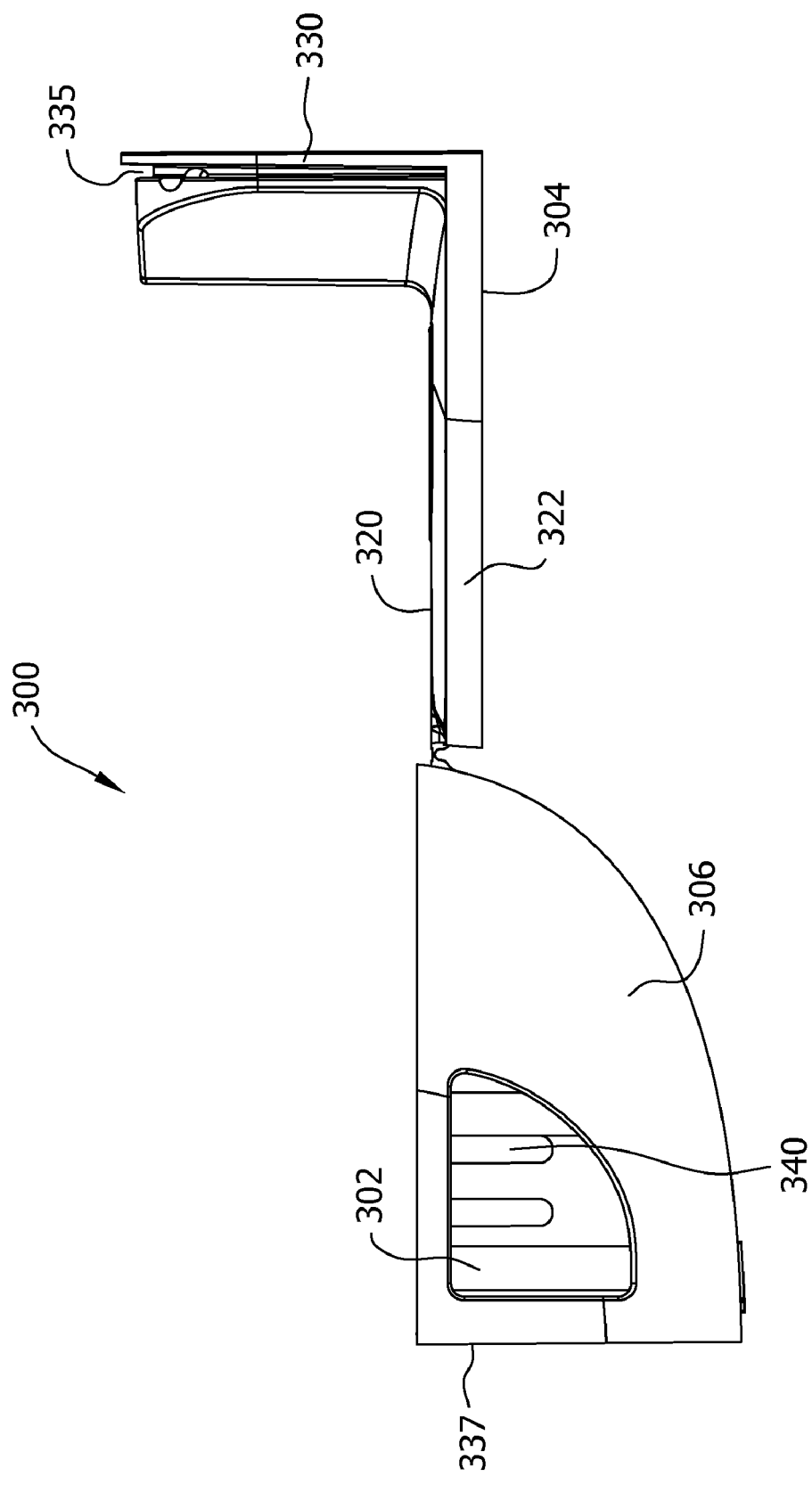
FIG. 91 is a right side elevation thereof.
Figure 92:
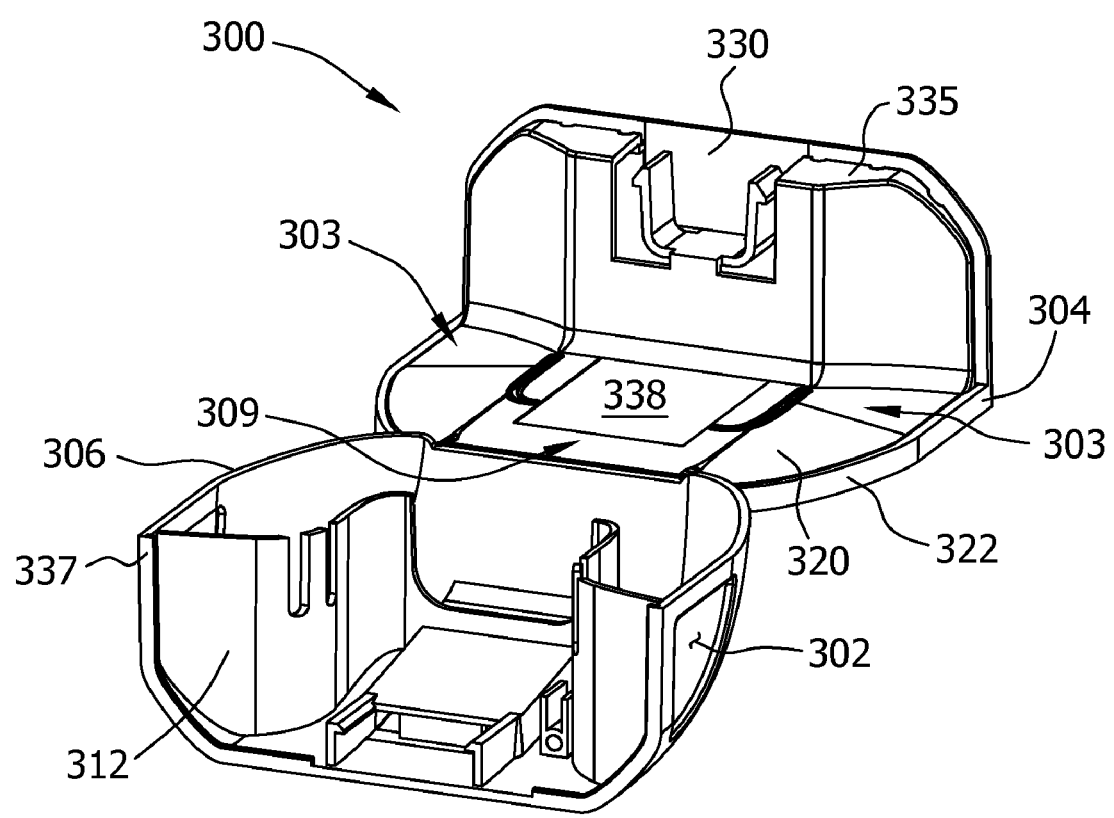
FIG. 92 is a perspective view thereof.
Figure 93:
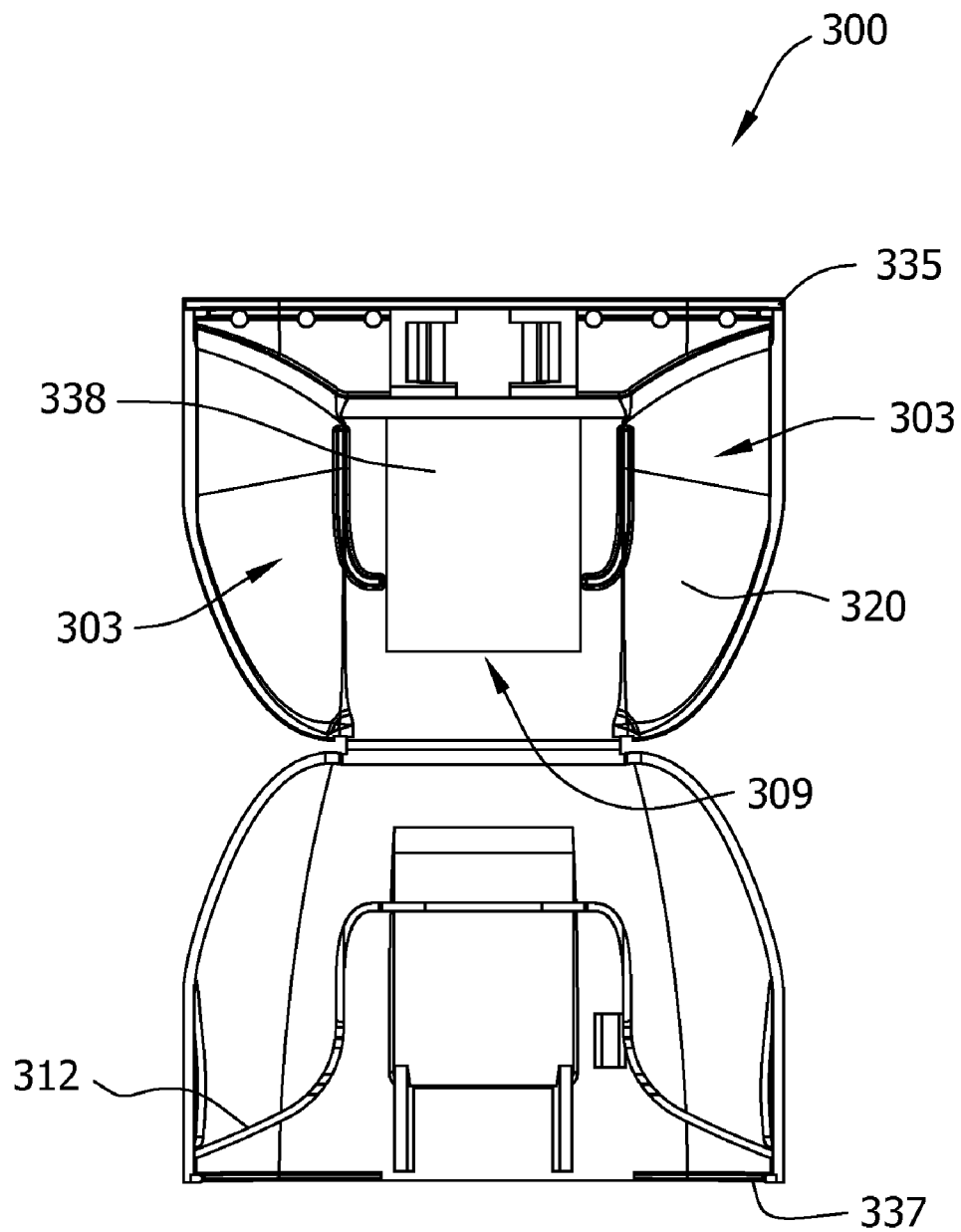
FIG. 93 is top plan view thereof.
Figure 98:
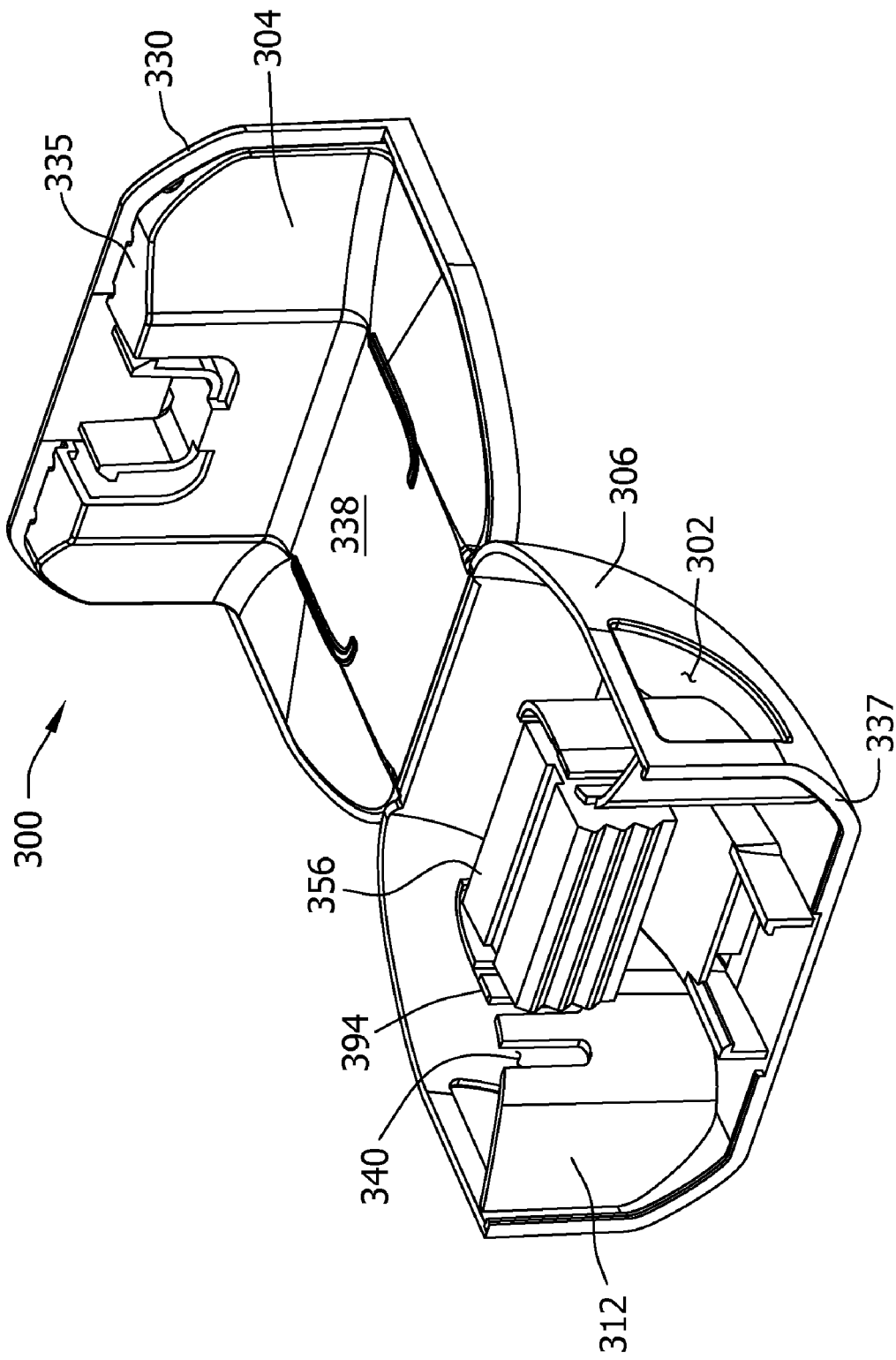
FIG. 98 is a perspective view of the rodent management station of FIG. 96.
Figure 99:
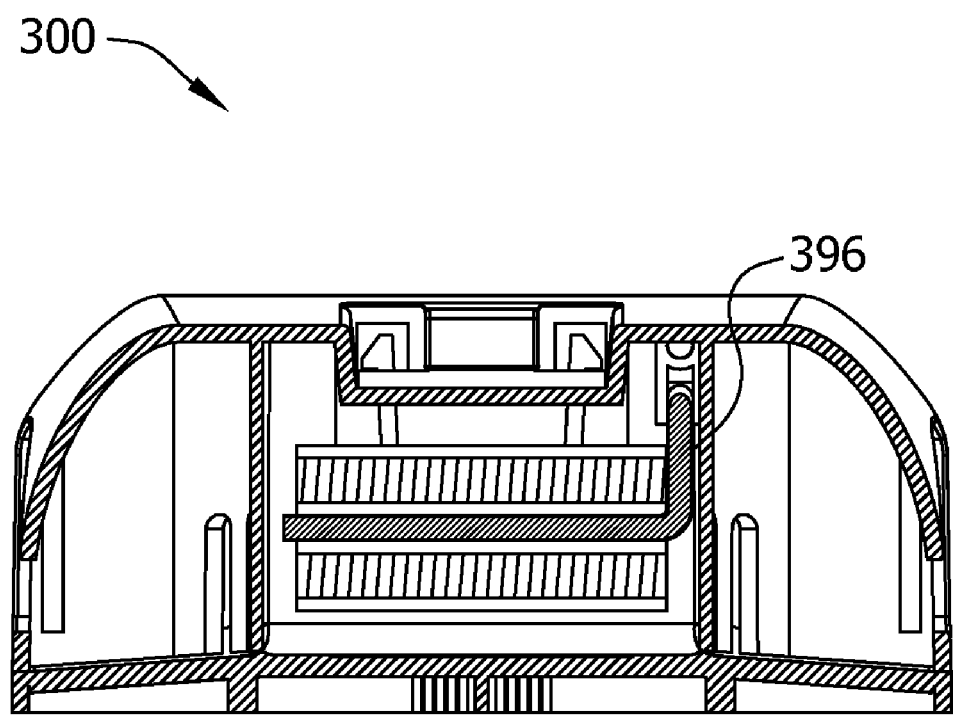
FIG. 99 is a cross-section of a fourth embodiment of a rodent management station.
Figure 100:
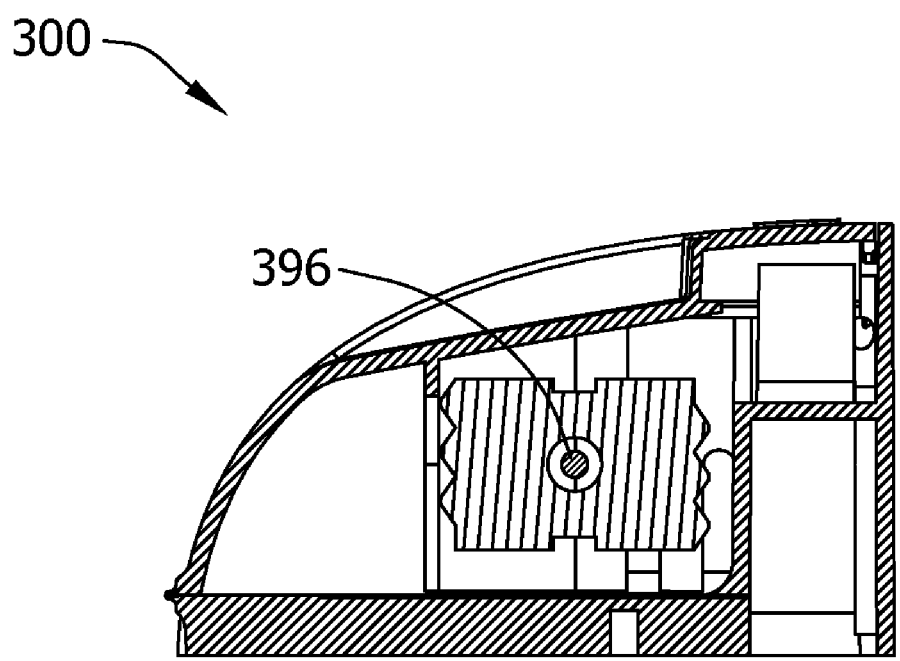
FIG. 100 is a cross-section taken in the plane of line 100-100 in FIG. 99.
Figure 101:
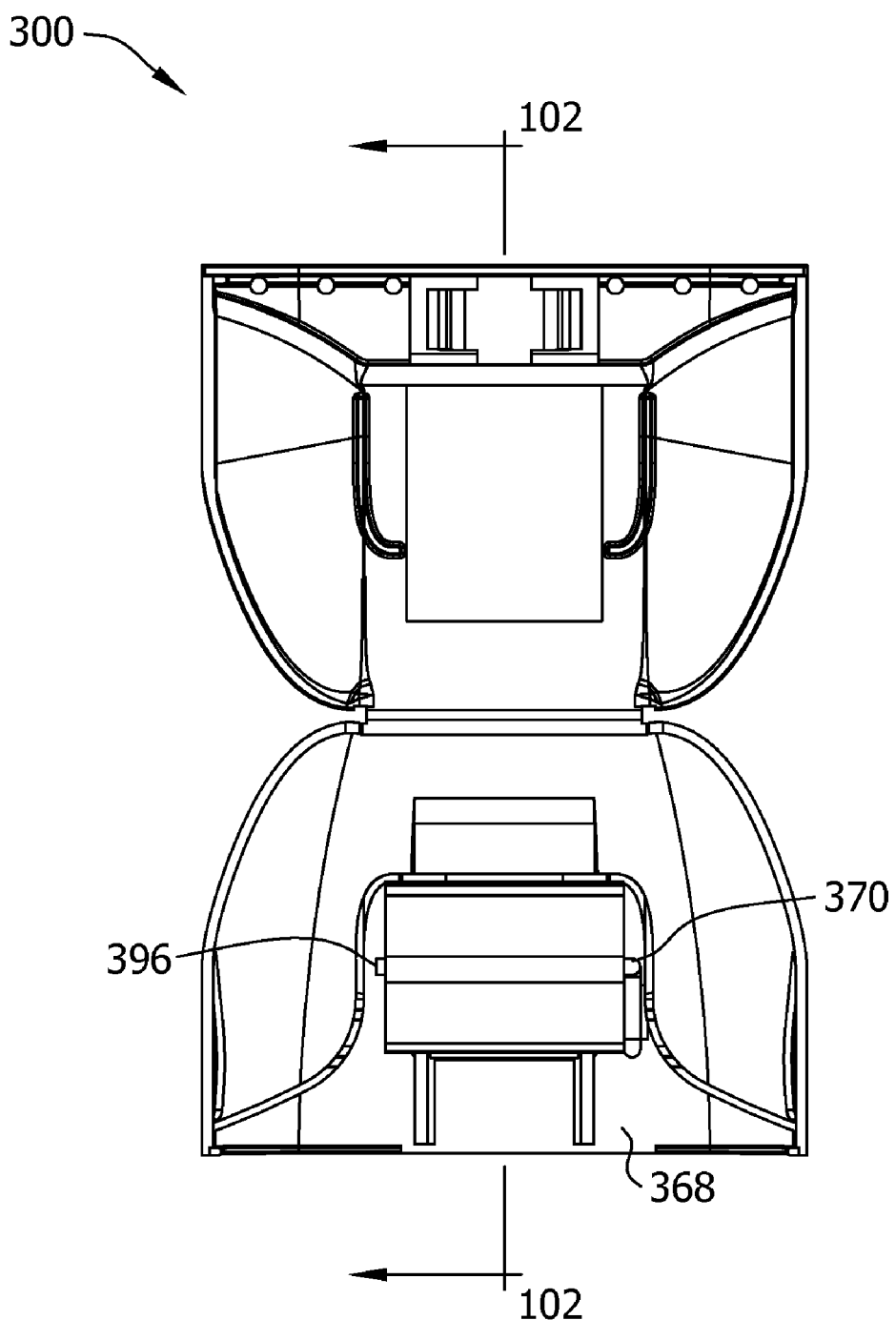
FIG. 101 is a top plan view of the rodent management station of FIG. 99 in an open configuration.
Figure 102:
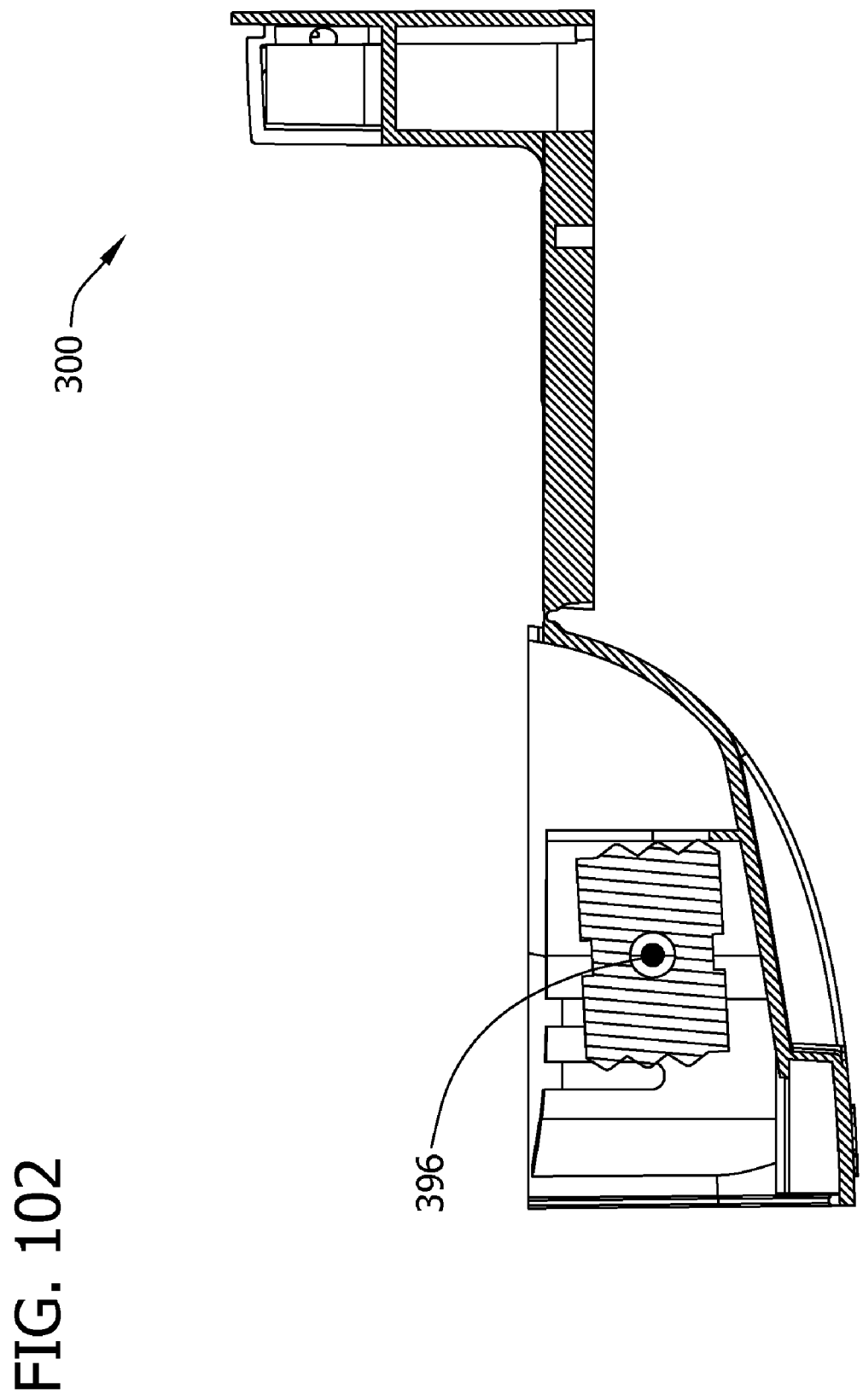
FIG. 102 is a cross-section taken in the plane of line 102-102 in FIG. 101.
Figure 103:
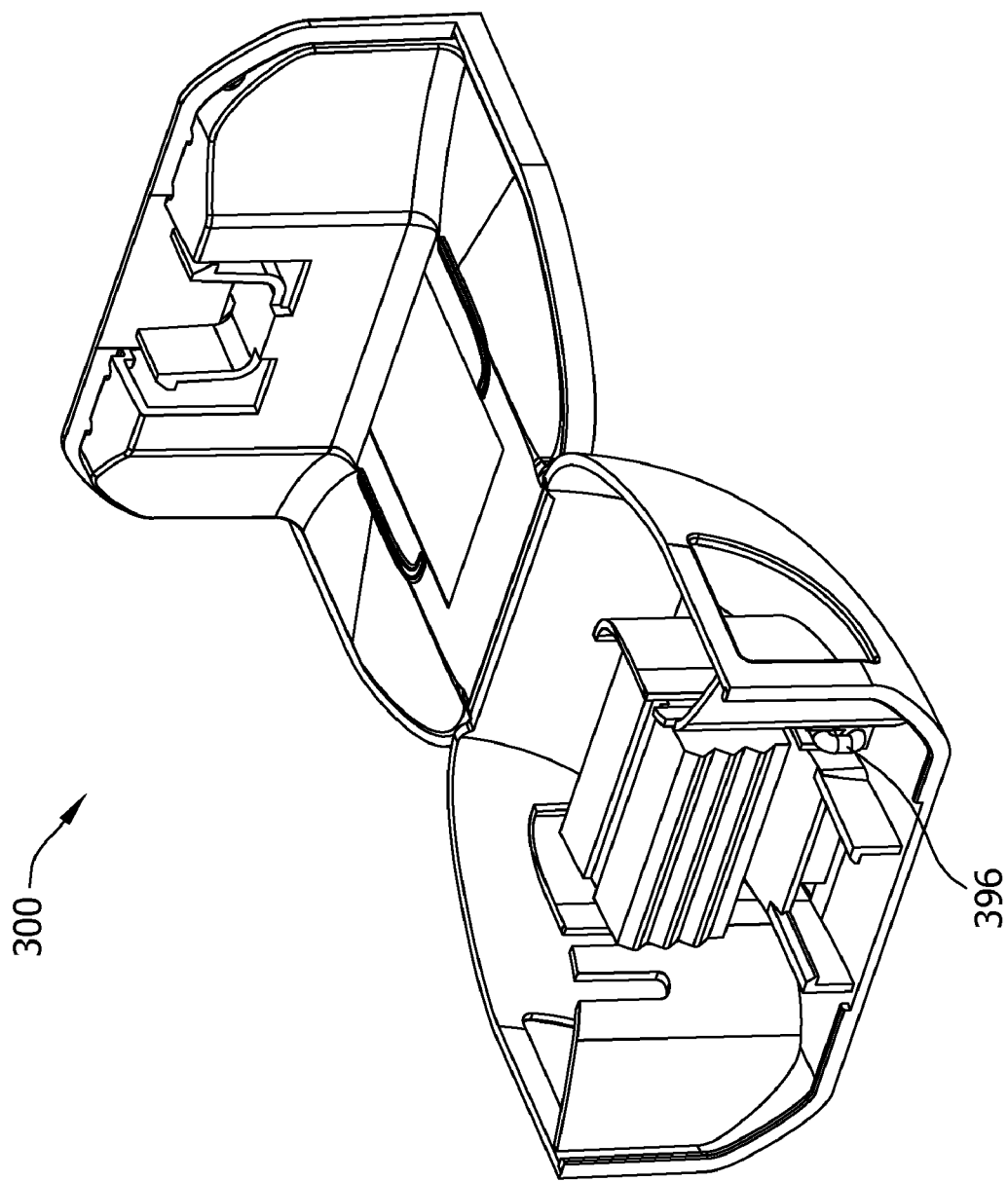
FIG. 103 is a perspective view of the rodent management station of FIG. 99.
Figure 104:
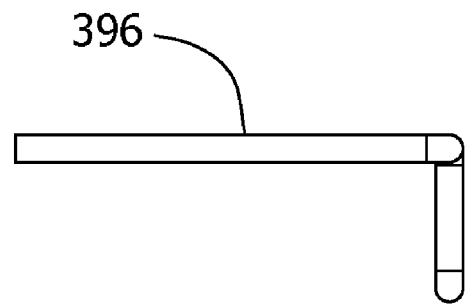
FIG. 104 is a right side elevation of a bait support in the form of a wire for supporting bait blocks in either the third or fourth embodiments of the rodent management station.
Figure 105:
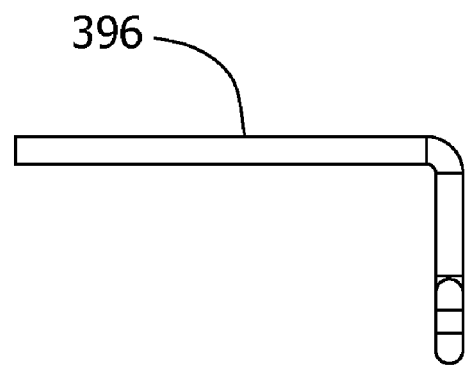
FIG. 105 is a left side elevation thereof.
Figure 106:
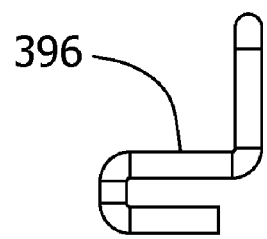
FIG. 106 is a rear elevation thereof.
Figure 107:
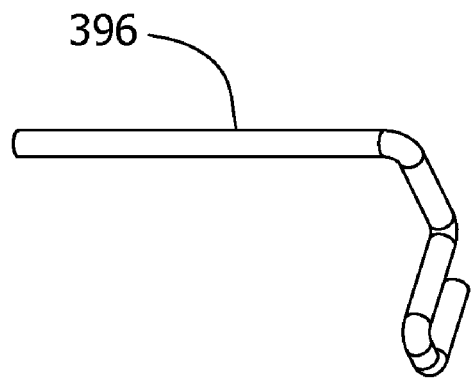
FIG. 107 is a perspective view thereof.

A rain gutter (e.g., a groove) 335, as best seen in FIGS. 91 and 98, is formed in the rear wall 330 and extends from each lateral side of the locking mechanism 342 along the to panel and down along the end panels to where the rear wall meets the bottom panel 322. This gutter 335 arrangement facilitates the run-off of water that gets into the station 300 via the locking mechanism 342 or between the lid 306 and the rear wall 330. As illustrated in FIG. 92, the lid 306 of the station 300 of this embodiment further comprises flange members 337 extending inward from each edge of the lid generally along the sides of the lid and across a portion of the top of the lid. These flange members 337 are sized for slidable receipt within the groove 335 (e.g., in the manner of a tongue-ingroove arrangement) as the lid is lowered onto the base 304 to facilitate alignment on and placement of the lid 306 down onto the rear wall 330 and over the rest of the base 304.

Figure 82:
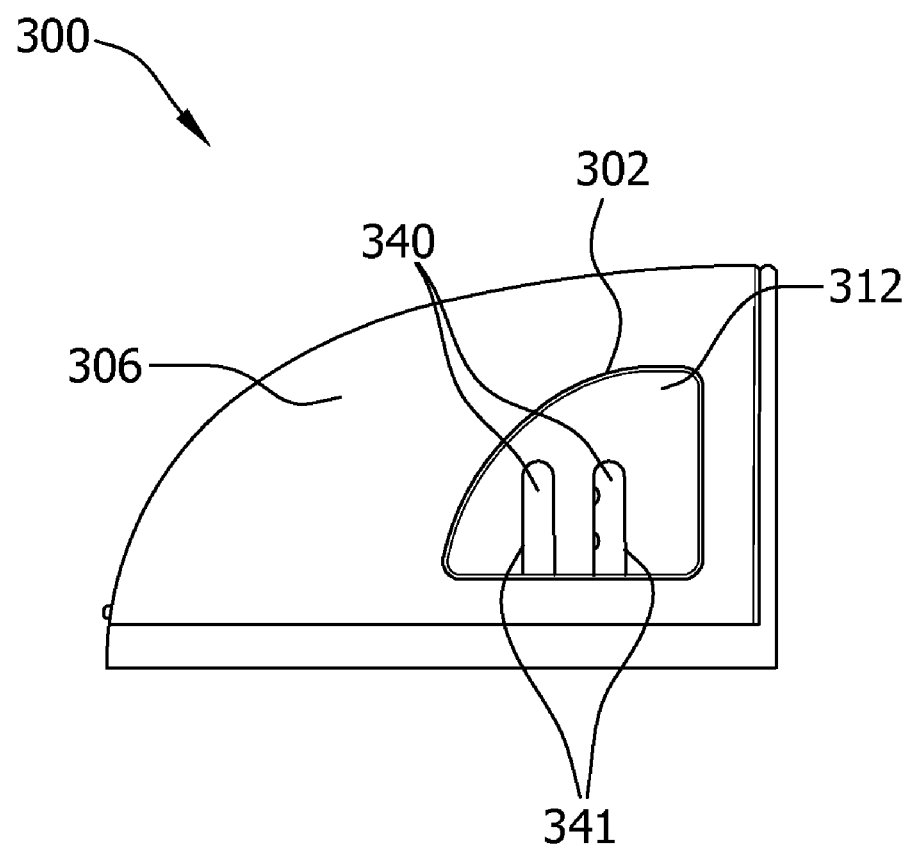
FIG. 82 is a side elevation thereof.
Figure 83:
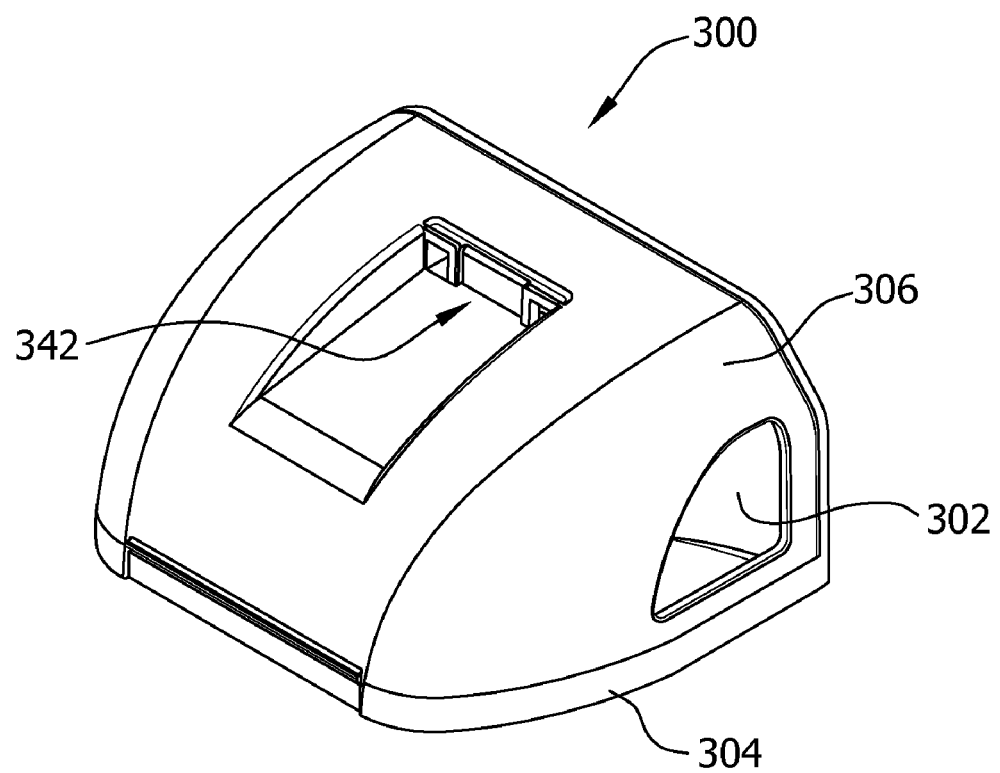
FIG. 83 is a perspective view thereof.
Figure 84:
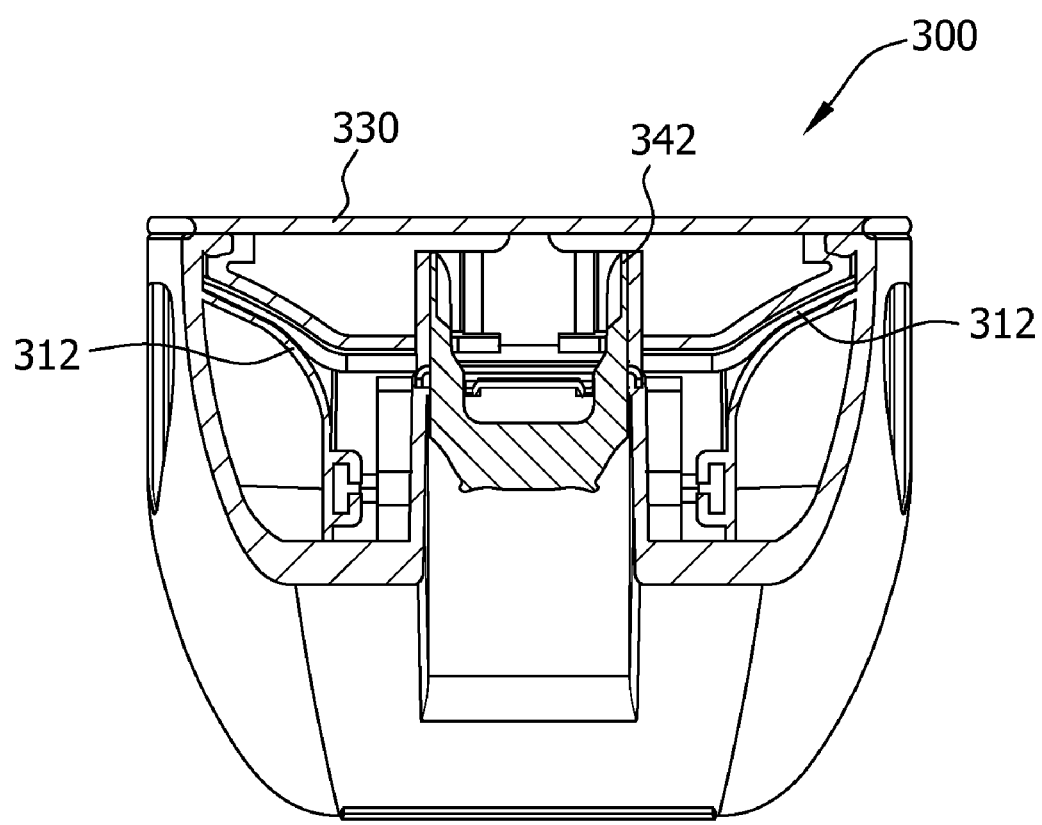
FIG. 84 is a cross-section taken in the plane of line 84-84 of FIG. 80.

The lid 306 of the station 300 (in a manner similar to the lid 106 of the station 100) includes laterally opposite walls 310 broadly defining the opposite sides of the station 300, a front wall broadly defining the front of the station 300 and a top wall broadly defining the top of the station 300. As illustrated in FIGS. 82 and 84, the lid 306 further comprises interior panels 312 (broadly, partition structure) depending therefrom to partition the interior space of the station 300 housing into a desired layout for rodent management. The interior panels 312 may be molded together with other lid components or formed separate therefrom and joined thereto by adhesive, welding, fastening, or other suitable attachment technique.

Figure 81:
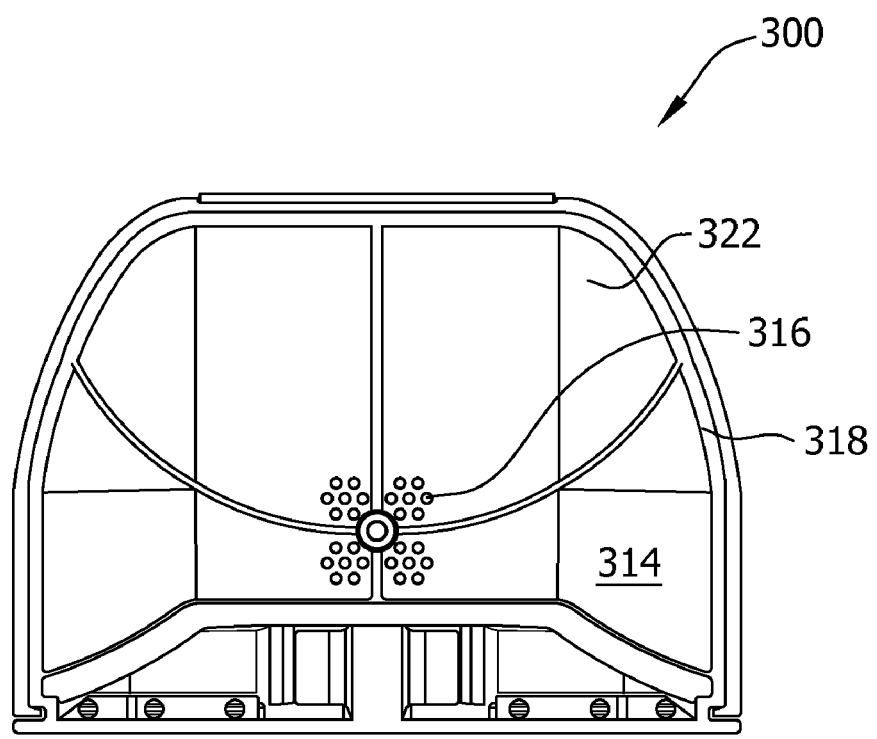
FIG. 81 is a bottom plan view thereof.
Figure 94:
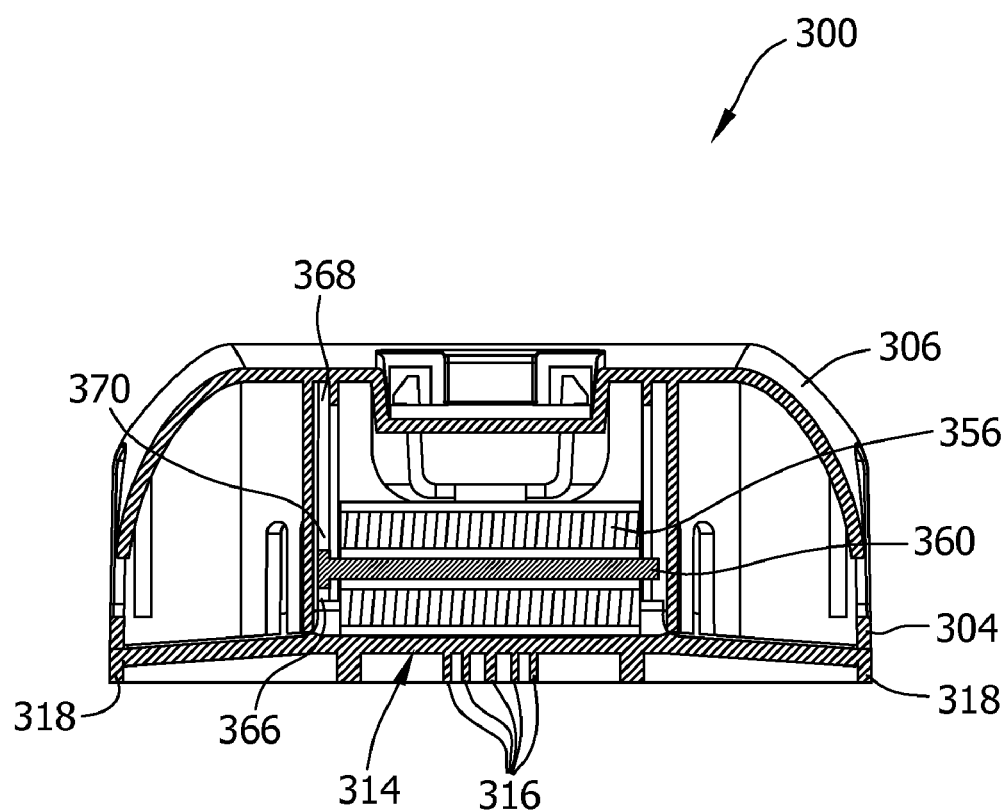
FIG. 94 is a cross-section taken in the plane of line 94-94 in FIG. 82.
Figure 95:
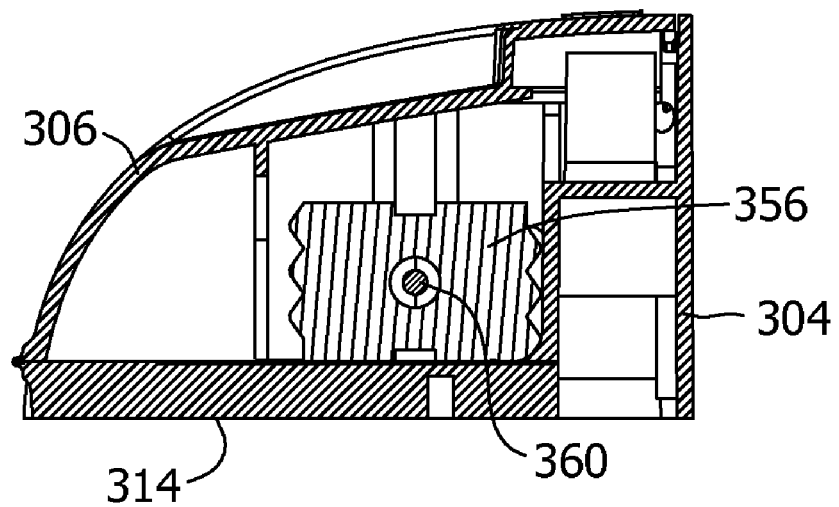
FIG. 95 is a cross-section taken in the plane of line 95-95 in FIG. 94.

As seen in FIGS. 81 and 94, an outer surface 314 of the bottom panel 322 of the base 304 has a plurality of protrusions 316 depending therefrom. These protrusions 316 function in a manner similar to the plurality of ribs 126 shown in the embodiment of FIG. 7 and discussed above. The protrusions 316 each have a length that results in the terminal ends of the protrusions 316 lying generally in the same horizontal plane as the lower edge of the skirt 318 (e.g., the bottom of the station 300). Adhesive may be placed on a mounting surface (to which the station is to be mounted) or directly onto the protrusions 316. Upon mounting of the station 300 down onto the mounting surface, adhesive more readily spreads up into the protrusions 316 to the enhance the bonding between the base and the mounting surface. That is, the protrusions 316 provide an increased surface area for contact with the adhesive, resulting in a strengthened bond between the adhesive, the rodent management station 300, and the mounting surface. In the illustrated embodiment, the protrusions 316, are grouped together at a central location on the bottom surface 314 of the base 304. However, in other embodiments a variety of configurations of the protrusions 316 may be utilized. Alternatively, a rib and groove pattern such as that present in the first embodiment may be provided on the station 300 of this second embodiment without departing from the scope of this invention.

With reference to FIGS. 92-94 and 98, the interior panels 312 depending from the lid 306 are configured to extend into abutting or closely spaced relationship with an inner surface 320 of the bottom panel 322 of the base 304 when the lid is closed to partition the interior space of the station 300 housing into a generally central bait chamber 338 and a pair of pathways 303 each extending from opposite one of the entry openings 302 along the lid to an entryway to the bait station with the entryway also defined by the interior panels. The pathways 303 together define a single passageway 309 that extends from one entry opening 302 to the opposite entry opening, around the bait chamber 338. The passageway 309 prevents rodents entering the rodent management station 300 at the openings 302 from traveling straight through the rodent management station and instead direct rodents along the passageway 309 towards the front of the rodent management station and the entryway to the bait chamber 338. Accordingly, it will be seen that the interior panels 312 restrict access to the bait chamber 338 (and hence bait disposed therein), i.e., by omitting access to the bait chamber from openings 302 in the rodent management station 300. Thus, non-targeted animals (e.g., dogs or cats) and unauthorized individuals (e.g., children) cannot reach the bait in the bait chamber when the lid 306 is closed.

The interior panels 312 in one suitable embodiment have one or more through-openings 341 formed therein, and more suitably disposed in directional alignment with each of the entry openings 302. For example, in the illustrated embodiment the one or more through-openings 341 comprise a plurality of elongate, vertically extending slots formed in the interior panels 312 to define a plurality of slats, or baffles 340 in directional alignment with the entry openings 302. The slots are suitably sized large enough to permit light to enter the rodent management station 300 while still sized substantially smaller than the entry openings so as to inhibit rodents from passing through the slots. In the illustrated embodiment in which the rodent management station 300 has two laterally opposite entry openings 302, the slots also allow light to pass through the entire rodent management station 300 so that a rodent can see straight through the station through the entry openings.

These slots also provide open communication between the pathways and the central bait chamber 338 so that the rodent is able to better smell (due to air flow through the rodent management station) bait in the bait chamber from the exterior of the station 300 and upon entry into the station as the rodent is routed along the pathway. It is understood that additional through-openings 341 may be provided along a longer segment of the pathway from the entry opening 302 to the entryway of the bait chamber 338, including along the entire pathway. It is also understood that the through-openings may be other than in the form of slots, such as perforations, holes or other suitable openings that may or may not extend to the bottom edge of the interior panels 312. The interior panels 312 may also include a plurality of gussets or webs (not shown) where the interior panels 312 adjoin the lid 306 to provide additional strength and rigidity to the lid and interior panels.

The locking mechanism 342 used to releasably secure the base 304 to the lid 306 operates in the same or similar manner as the locking mechanisms 142 and 1142 described above in relation to the rodent management stations 100 and 1100, respectively. The locking mechanism 342 thus functions to prevent unauthorized or unintended opening of the rodent management station 300. Accordingly, the locking mechanism 342 is unlocked by a key similar to and more suitably identical to the key 152 described above. In one embodiment, a rodent management system may comprise two rodent management stations of different size, such as the rodent management station 100 and the rodent management station 300, with a single key 152 configured for use with both of the stations.

In addition to the differences in overall dimensions between the stations 100 and 300, the rodent management station 300 differs in one aspect from the previously described embodiments in that the bait is positioned differently within the station 300. For example, in this third embodiment bait is instead supported by bait support structure depending from the lid 306 above the bait chamber 338.

One or more bait supports 358 may be utilized for positioning and retaining bait within the bait chamber 338. FIGS. 85-89 illustrate two different types of exemplary bait supports 358. The bait supports 358 function in the same general manner and are coupled at one or both of their ends to the lid 306. The bait supports in turn pass through a hole in each of the bait blocks (or a hole in a single bait block)—the hole being centrally located in the bait block although the hole need not be centrally located to remain with the scope of the invention. It is also understood that the bait may be other than in the shape of a block or cube without departing from the scope of this invention. The bait supports 358 are sized to extend longitudinally outward beyond the opposite ends of a row of bait blocks 356.

Upon separation of the lid 306 from the base 304 for servicing of the rodent management station 300, the bait blocks 356 are retained on the bait support 358 which is in turn coupled to the lid 306. Accordingly, the base 304 is free from protrusions or other obstructions and is easily swept clean of debris.

Figure 85:
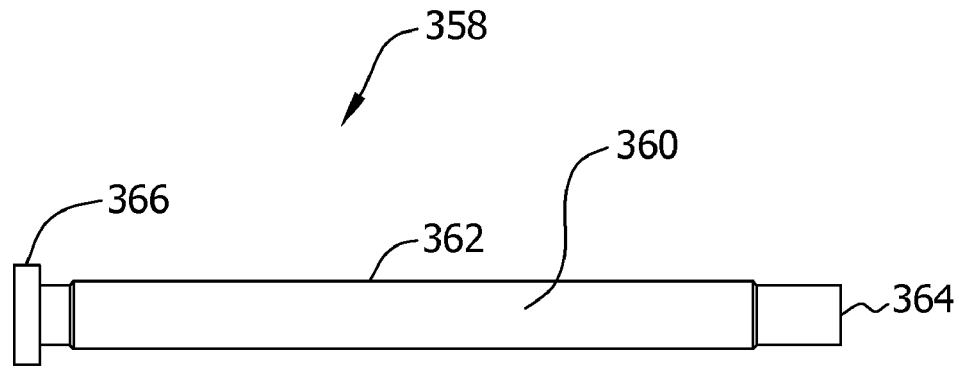
FIG. 85 is a top plan view of a bait support device for use with the rodent management station of FIG. 79.
Figure 86:
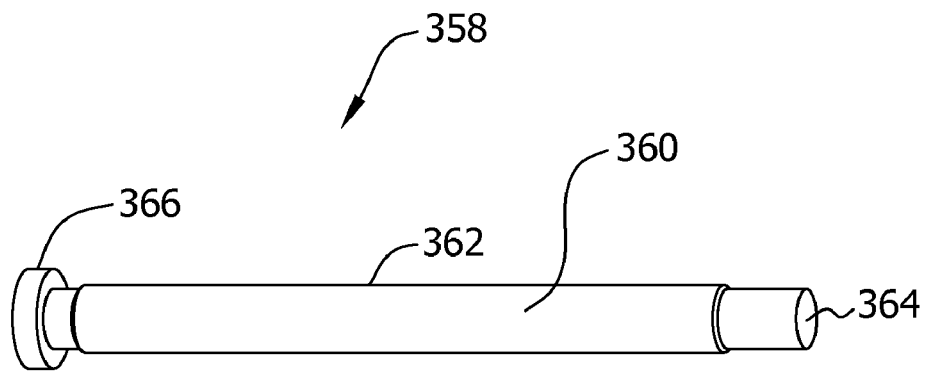
FIG. 86 is a perspective view thereof.
Figure 96:
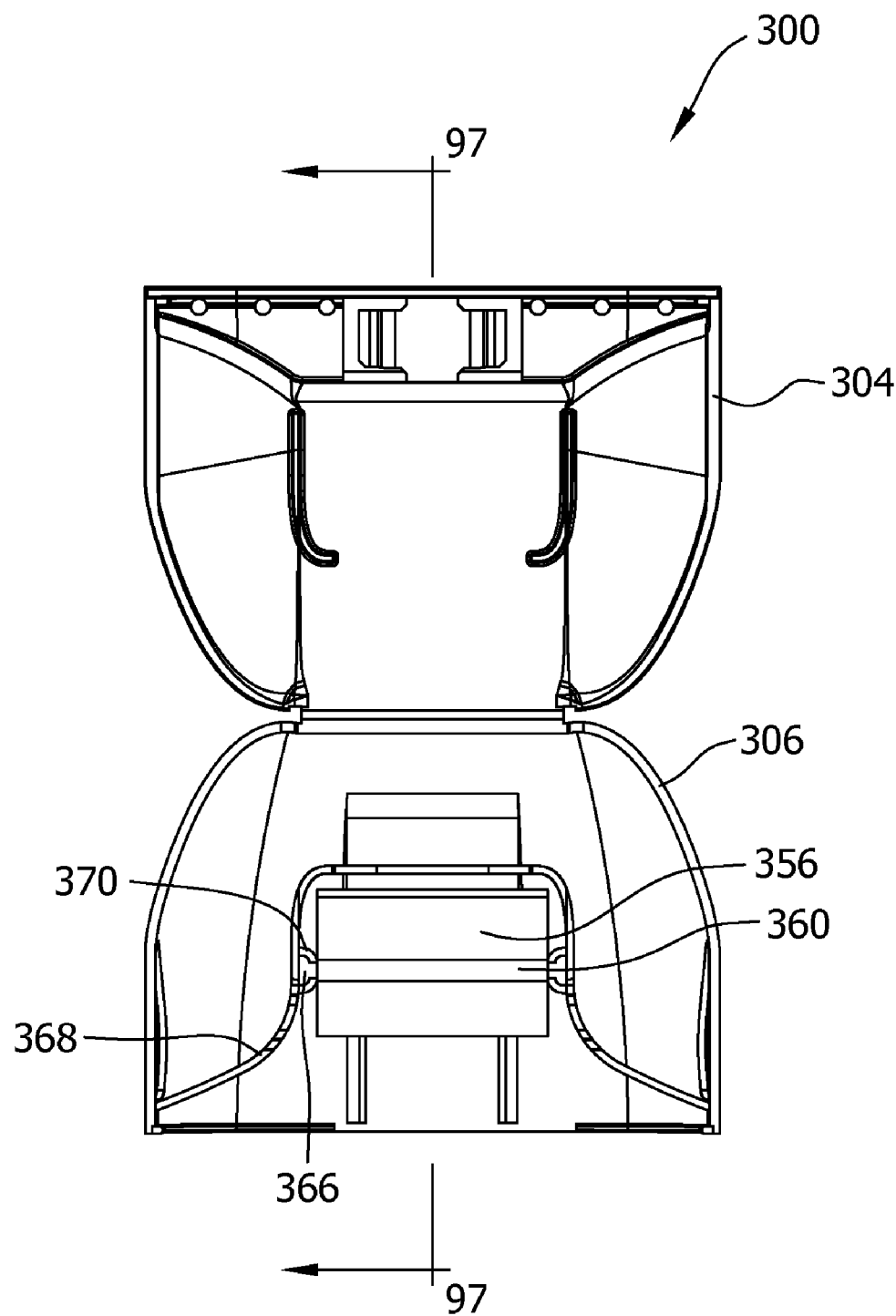
FIG. 96 is a top plan view of the rodent management station of FIG. 79 in the open configuration.
Figure 97:
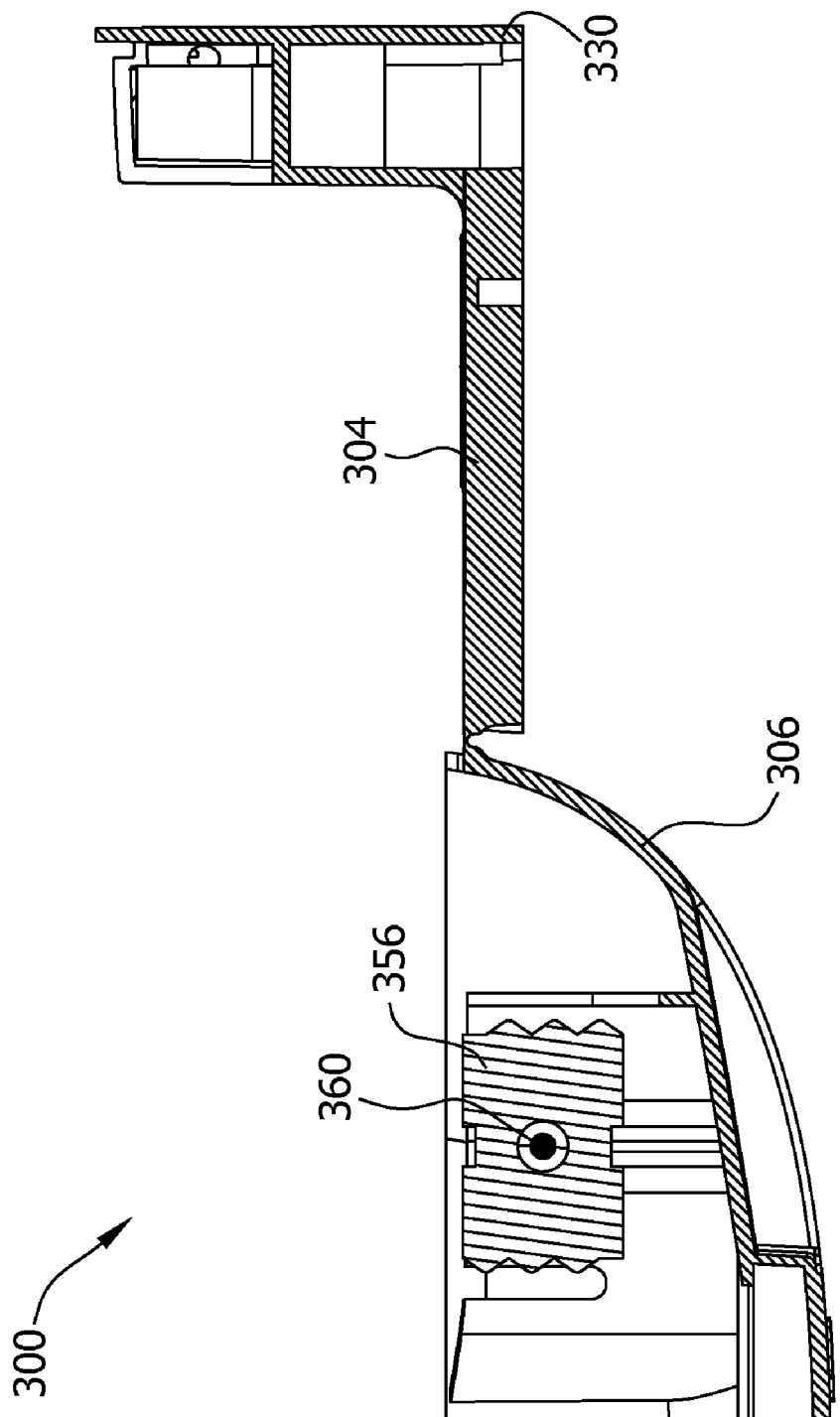
FIG. 97 is cross-section taken in the plane of line 97-97 in FIG. 96.

In the illustrated embodiment of FIGS. 85 and 86, the bait support 358 is in the form of a first bait pin 360. The first bait pin 360 has a generally round shaft 362 extending along its longitudinal axis. At one end of the shaft 362, the diameter thereof is reduced, resulting in a tapered end 364. The reduced diameter of the tapered end 364 provides for easier mounting of bait blocks 356 on the bait pin 360. At the opposite end of the shaft 362, the diameter of the body is increased, resulting in an expanded or enlarged end 366. The enlarged end 366 is receivable within a recess 370 formed into (or suitably attached thereto) an interior surface 368 (as best seen in FIGS. 94 and 96) of the lid 306. The outer diameter of the enlarged end 366 and the recess 370 are preferably sized relative to each other to provide a snap or friction fit therebetween. Alternatively, or in addition thereto, a suitable securement mechanism may be used to couple the first bait pin 360 to either the lid 306 or recess 370.

Figure 87:
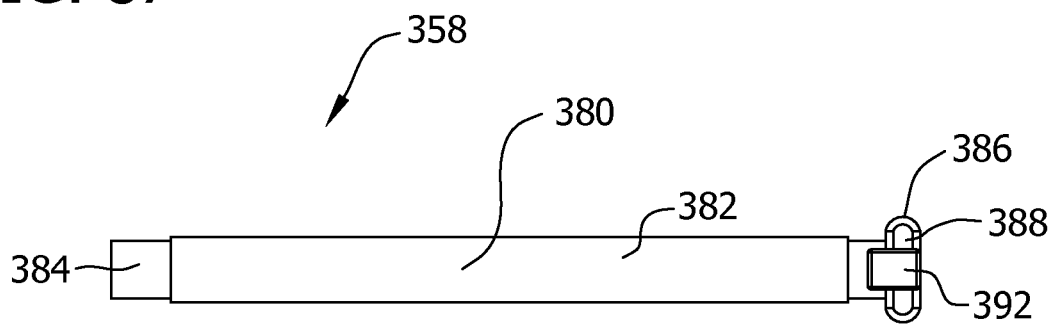
FIG. 87 is a top plan view of another embodiment of a bait support device for use with the rodent management station of FIG. 79.
Figure 88:
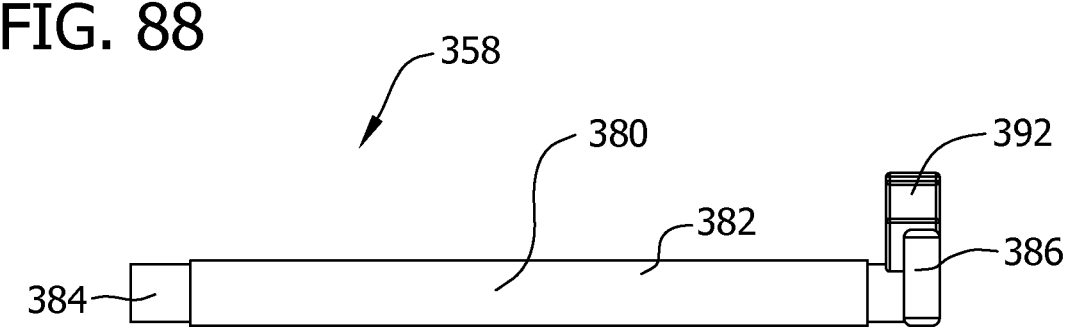
FIG. 88 is a side elevation thereof.
Figure 89:
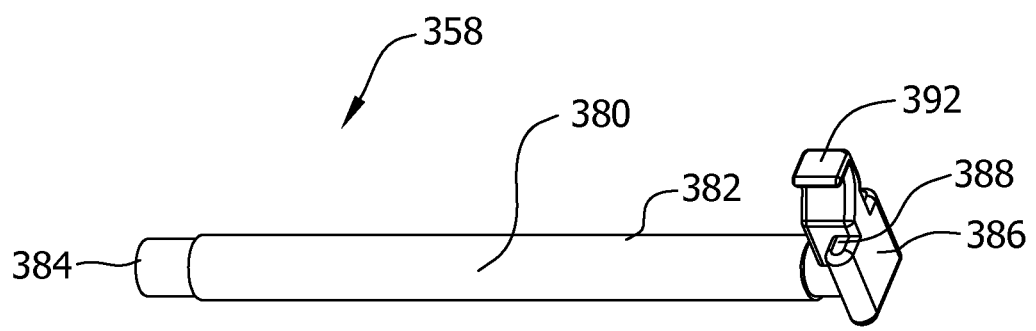
FIG. 89 is a perspective view thereof.
Figure 90:
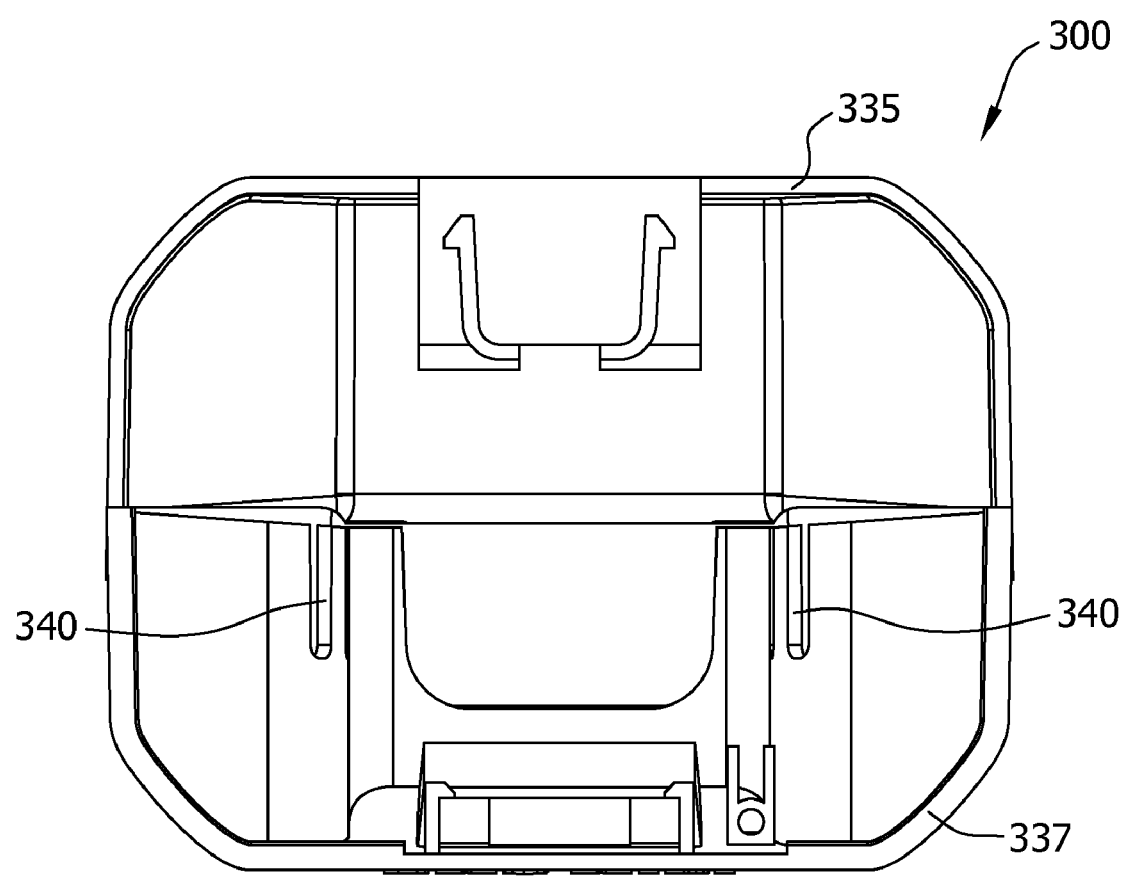
FIG. 90 is a front elevation of the rodent management station of FIG. 79 in an open configuration.

In another embodiment, a second bait support 358 (i.e., a second bait pin 380) is provided as illustrated in FIGS. 87-89. The second bait pin 380 has a generally round shaft 382 extending along its longitudinal axis. At one end of the shaft 382, the diameter of the shaft is reduced, resulting in a tapered end 384. The reduced diameter of the tapered end 384 provides for easier mounting of bait blocks 356 on the second bait pin 380. An oblong-shaped member 386 is disposed at the opposite end of the shaft 382. The oblong-shaped member 386 has a central opening 388 located therein. A post (not shown) or other suitable structure is formed into (or suitably attached thereto) the interior surface 368 of the lid 306. The central opening 388 and post are preferably sized relative to each other to enable a snap or friction fit therebetween. The oblong-shaped member 386 also includes an extension 392 sized to fit within a corresponding channel 394 (as best seen in FIG. 98) formed into (or suitably attached thereto) the interior surface 368 of the lid 306. The extension 392 and the channel 394 are preferably sized relative to each other to enable a snap or friction fit therebetween. Alternatively, or in addition thereto, a suitable securement mechanism may be used to couple the second bait pin 380 to the either the lid 306 or post.

FIGS. 99-107 illustrate a fourth embodiment of the rodent management station. This embodiment differs from the previously described rodent management stations in that a different type of bait support 358 is utilized. In particular, a bait support in the form of a bait support wire 396 is utilized to support the bait blocks 356. The bait support wire 396 has a generally round (in cross-section) shaft extending along its longitudinal axis. One end of the shaft is receivable in the recess 370 formed into (or suitably attached thereto) a seat formed in the interior surface 368 of the lid 306. Alternatively, or in addition thereto, a suitable securement mechanism may be used to couple the bait support wire 396 to either the lid 306 or recess 370.

The bait support wire 396 has one or more bends formed therein, and descends into the bait chamber 338 from the end which is received in the recess. FIGS. 104-107 illustrate various views of the bait support wire 396. The configuration of the bait support wire 396 is provided for illustrative purposes, and a variety of different configurations may be utilized without departing from the scope of the embodiments of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A rodent management station comprising:
a housing having an interior space and including a base and a lid together at least in part defining the interior space of the housing, the lid being positionable relative to the base between a closed configuration of the station in which the interior space is substantially enclosed, and an opened configuration of the station in which the interior space is accessible for servicing, said housing having an entry opening through which rodents enter the interior space of the housing, said housing further having internal partition structure configured to partition the interior space of the housing into a bait chamber having an entryway spaced from the entry opening of the housing, and a pathway defined at least in part by the partition structure and extending from the at least one entry opening to the entryway of the bait chamber, the partition structure having at least one through-opening therein other than at the bait chamber entryway to provide open communication between the pathway and the bait chamber other than at said bait chamber entryway, said at least one through-opening being sized substantially smaller than the housing entry opening and the bait chamber entryway to inhibit rodents against entering the bait chamber at the at least one through-opening.

2. The rodent management station of claim 1 wherein the at least one through-opening is disposed in generally directional alignment with the entry opening of the housing.

3. The rodent management station of claim 1 wherein the at least one through-opening comprises at least one elongate slot disposed in the partition structure.

4. The rodent management station of claim 3 wherein the at least one elongate slot comprises a plurality of elongate vertically extending slots disposed in the partition structure.

5. The rodent management station of claim 1 wherein the base comprises a floor panel having an inner surface, the partition structure being connected to the lid of the housing for conjoint movement with the lid relative to the base upon movement of the lid to the opened configuration of the station, in the closed configuration of the station at least a portion of the partition structure being in closely spaced relationship with the inner surface of the floor panel to inhibit rodents from moving beneath said portion of the partition structure.

6. The rodent management station of claim 2 wherein the housing has a pair of entry openings through which rodents enter the interior space of the housing, the internal partition structure being configured to partition the interior space of the housing into a bait chamber having an entryway spaced from each of the entry openings of the housing, a first pathway defined at least in part by the partition structure and extending away from one of the entry openings to the entryway of the bait chamber and a second pathway separate from the first pathway and extending away from the other one of the entry openings to the entryway of the bait chamber, the partition structure having at least one through-opening in generally opposed relationship with one housing entry opening, and at least one other through-opening in generally opposed relationship with the other housing entry opening.

7. The rodent management station of claim 6 wherein the entry openings of the housing are in spaced relationship with each other along a straight line from one entry opening to the other entry opening.

8. A rodent management station comprising:
a housing having an interior space and including a base and a lid together at least in part defining the interior space of the housing, the base comprising a floor panel having an inner surface, the lid being positionable relative to the base between a closed configuration of the station in which the interior space is substantially enclosed, and an opened configuration of the station in which the interior space is accessible for servicing, said housing having an entry opening through which rodents enter the interior space of the housing, said housing further having internal partition structure configured to partition the interior space of the housing into a bait chamber having an entryway spaced from the entry opening of the housing, and a pathway defined at least in part by the partition structure and extending away from the at least one entry opening to the entryway of the bait chamber, the partition structure being connected to the lid of the housing for conjoint movement with the lid relative to the base upon movement of the lid to the opened configuration of the station, in the closed configuration of the station at least a portion of the partition structure being in closely spaced relationship with the inner surface of the floor panel to inhibit rodents from crawling under said portion of the partition structure, in the opened configuration of the station the inner surface of the floor panel being free from contact with the partition structure.

9. The rodent management station of claim 8 wherein the housing has a front, a rear and opposite sides, the partition structure being spaced transversely from at least one of the front, the back and the opposite sides of the housing to define said pathway between the partition structure and the housing.

10. The rodent management station of claim 9 wherein said at least one of the front, the back and the opposite sides of the housing is defined by the lid of said housing such that the pathway is disposed transversely between the partition structure and the lid.

11. The rodent management station of claim 8 wherein the housing has a pair of entry openings through which rodents enter the interior space of the housing, the internal partition structure being configured to partition the interior space of the housing into a bait chamber having an entryway spaced from each of the entry openings of the housing, a first pathway defined at least in part by the partition structure and extending away from one of the entry openings to the entryway of the bait chamber and a second pathway separate from the first pathway and extending away from the other one of the entry openings to the entryway of the bait chamber.

12. The rodent management station of claim 11 wherein the entry openings are in directional alignment with each other along a straight line from one of said entry openings to the other.

13. The rodent management station of claim 8 wherein the partition structure is formed integrally with the lid.

14. The rodent management station of claim 8 wherein the partition structure is generally curved along the length of the pathway.

15. A rodent management station comprising:
a housing having an interior space and including a base and a lid together at least in part defining the interior space of the housing, the lid being positionable relative to the base between a closed configuration of the station in which the interior space is substantially enclosed, and an opened configuration of the station in which the interior space is accessible for servicing, said housing having a generally triangular entry opening through which rodents enter the interior space of the housing, in the closed configuration the entry opening having a bottom, a top, a height and a width, the width of the entry opening being substantially greater at the bottom of the opening than at the top thereof, the rodent management station further comprising at least one of a trap and a bait positionable within the interior space of the housing.

16. The rodent management station of claim 15 wherein the width of the entry decreases as the openings extends upward from the bottom of the entry opening to the top thereof.

17. The rodent management station of claim 15 wherein in the closed configuration of the station the entry opening has the general shape of one of a one-quarter circle and a one-quarter ellipse.

18. The rodent management station of claim 15 wherein the entry opening has a maximum width and a maximum height, in the closed configuration of the station the maximum width of the entry opening being greater than the maximum height thereof.

19. The rodent management station of claim 15 wherein the entry opening is disposed entirely in the lid of the housing.

20. The rodent management station of claim 15 wherein the housing comprises a pair of entry openings in spaced relationship with each other and aligned along a generally straight line, the entry openings having substantially the same shape.

21. The rodent management station of claim 16 wherein the maximum height of the housing is in the range of about 10 cm to about 25 cm and the maximum width of the housing is in the range of about 15 cm to about 35 cm.

22. The rodent management station of claim 16 wherein the maximum height of the housing is in the range of about 2.5 cm to about 10 cm and the maximum width of the housing is in the range of about 5 cm to about 15 cm.

\* \* \* \* \*